United States Patent
Nishi et al.

(10) Patent No.: US 8,314,648 B2
(45) Date of Patent: Nov. 20, 2012

(54) POWER SUPPLY CIRCUIT AND DISPLAY DEVICE INCLUDING THE SAME

(75) Inventors: Shuji Nishi, Osaka (JP); Sachio Tsujino, Osaka (JP); Yuhichiroh Murakami, Osaka (JP); Yasushi Sasaki, Osaka (JP); Seijirou Gyouten, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 252 days.

(21) Appl. No.: 12/734,394

(22) PCT Filed: Sep. 1, 2008

(86) PCT No.: PCT/JP2008/065638
§ 371 (c)(1),
(2), (4) Date: Apr. 29, 2010

(87) PCT Pub. No.: WO2009/084278
PCT Pub. Date: Jul. 9, 2009

(65) Prior Publication Data
US 2010/0259529 A1   Oct. 14, 2010

(30) Foreign Application Priority Data
Dec. 28, 2007 (JP) ................................. 2007-341156

(51) Int. Cl.
*G05F 1/10* (2006.01)

(52) U.S. Cl. ...................................................... 327/536
(58) Field of Classification Search .................. 327/535, 327/536, 537
See application file for complete search history.

(56) References Cited

U.S. PATENT DOCUMENTS

| | | | |
|---|---|---|---|
| 5,521,547 A | 5/1996 | Tsukada | |
| 5,774,012 A | 6/1998 | Im | |
| 6,107,863 A | 8/2000 | Iwata | |
| 6,605,985 B2 * | 8/2003 | Pagliato et al. | 327/536 |
| 7,432,757 B2 * | 10/2008 | Kimura | 327/537 |
| 7,436,241 B2 * | 10/2008 | Chen et al. | 327/536 |
| 7,855,591 B2 * | 12/2010 | Racape | 327/536 |
| 2004/0027102 A1 | 2/2004 | Kim | |
| 2007/0040825 A1 | 2/2007 | Mamba et al. | |
| 2010/0245327 A1 | 9/2010 | Tsujino et al. | |

FOREIGN PATENT DOCUMENTS

| | | |
|---|---|---|
| JP | 6-014529 | 1/1994 |
| JP | 9-154274 | 6/1997 |
| JP | 10-285911 | 10/1998 |
| JP | 2002-008385 | 1/2002 |
| JP | 2004-096987 | 3/2004 |
| JP | 2006-042015 | 2/2006 |
| JP | 2007-060732 | 3/2007 |

* cited by examiner

*Primary Examiner* — Jeffrey Zweizig
(74) *Attorney, Agent, or Firm* — Harness, Dickey & Pierce, P.L.C.

(57) ABSTRACT

An embodiment of the present invention provides a power supply circuit including a charge-pumping booster section which uses switching elements provided only by N-channel transistors yet does not have a problem of voltage drop by threshold value. When a boosted voltage is obtained at a first terminal of a first capacitor in a booster section, a booster control section supplies this boosted voltage to a third capacitor, to boost the voltage further thereby turning ON a first transistor. When a boosted voltage is obtained at a first terminal of a second capacitor in the booster section, the booster control section supplies this boosted voltage to a fourth capacitor, to boost the voltage further thereby turning ON a second transistor. This arrangement eliminates a problem of voltage drop by threshold value in the first and the second transistors which serve as output-side switching elements.

11 Claims, 24 Drawing Sheets

(A)

(B)

(A)

(B)

|  | φ2 | φ3 | V(N1) (Ideal Values) |
|---|---|---|---|
| TS1 | VSS | VSS | VDD |
| TS2 | VDD | VSS | 2VDD |
| TS3 | VDD | VDD | 3VDD |
| TS4 | VDD | VSS | 2VDD |
| TS5 | VSS | VSS | VDD |
| TS6 | VSS | VDD | VDD |

# POWER SUPPLY CIRCUIT AND DISPLAY DEVICE INCLUDING THE SAME

TECHNICAL FIELD

The present invention relates to power supply circuits, and more specifically to a power supply circuit which includes a charge-pumping booster section for boosting a supply voltage, and to a driver monolithic display device which includes such a power supply circuit.

BACKGROUND ART

Inductance DC-DC converters for boosting supply voltages are already public. A challenge with this type of DC-DC converters, however, is size reduction since the converter requires inductive elements, and it has long been difficult to implement the converter as a semiconductor circuit. For this reason, when supply voltage boosting is required in portable equipment such as mobile telephone terminals or in integrated circuits, the task is accomplished by charge pump circuits (see Patent Document 1 (JP-A H10-285911 Gazette), for example) which are built with capacitors and switching elements.

In liquid crystal display devices incorporated in mobile telephone terminals for example, a charge pump circuit is utilized in order to generate voltages (for application to scanning signal lines for example) to drive the liquid crystal display devices. In cases where such a liquid crystal display device includes thin film transistors (hereinafter abbreviated as "TFT") provided by MOS (Metal Oxide Semiconductor) transistors made of polycrystal silicon, as constituent elements in individual pixel circuits, the charge pump circuit is sometimes formed together with these pixel circuits on the same insulation substrate which is provided by e.g. a glass substrate (see Patent Document 2 (JP-A 2007-60732 Gazette) for example).
Patent Document 1: JP-A H10-285911 Gazette
Patent Document 2: JP-A 2007-60732 Gazette
Patent Document 3: JP-A 2002-8385 Gazette

DISCLOSURE OF THE INVENTION

Problems to be Solved by the Invention

Switching elements for constituting a charge pump circuit are often provided by field effect transistors such as MOS transistors manufactured from monocrystal silicon or polycrystal silicon. In view of manufacturing cost, use of only one type of field effect transistor, i.e. one which has an N-type conductivity channel region or the other which has a P-type conductivity channel region, is preferred.

Also, in active matrix display devices in which display images are formed by a plurality of pixel circuits formed on an insulated substrate (typically on a glass substrate), TFTs of only one type of conductivity channel region, i.e. N-type or P-type, are used as switching elements in individual pixel circuits. Because of this, if at least part of a circuit which drives these pixel circuits is formed on the same insulated substrate using the same manufacturing process as for the TFTs which are formed in the individual pixel circuits, use of the same type of TFT is preferred. Specifically, in cases of driver monolithic display devices, it is preferable that switching elements in the drive circuit formed on the above-described insulated substrate be provided by TFTs which have the same type of conductivity channel region as the other switching elements used in the pixel circuits. For example, when using an N-channel TFT as the switching element in each pixel circuit, it is preferable that only N-channel TFTs are employed as the switching elements in the drive circuit to be formed on the same insulated substrate. Further, in this case, if a charge pump circuit is also formed on the same substrate in the same manufacturing process, it is preferable that only N-channel TFTs are employed as the switching elements in the charge pump circuit, too.

However, such an arrangement that the switching elements in a booster charge pump circuit are solely provided by N-channel transistors (MOS transistor, TFT or the like) has a problem. Specifically, when an electrical charge passes through an ON-state N-channel transistor, there is a voltage drop across the input side of the N-channel transistor and the output side thereof, by an amount just as large as a threshold voltage of the N-channel transistor (this phenomenon is called "voltage drop by threshold value"). Where it happens, the charge pump circuit cannot boost the supply voltage to the target voltage. Hereinafter, this point is elaborated using FIG. 28 which shows a conventional charge pump circuit disclosed in Patent Document 1 (JP-A H10-285911 Gazette), as an example.

This conventional charge pump circuit includes: a main pump which is provided by a booster section 51*a* composed of N-channel transistors (N-channel MOS transistors) Q1 through Q4 serving as switching elements, and capacitors C1, C2; and a sub pump provided by a driver section 51*b* composed of N-channel transistors (N-channel MOS transistors) Q5, Q6 serving as switching elements, and capacitors C3, C4. The circuit has a first and a second input terminals Ti1, Ti2, an output terminal To, and a power supply terminal Tdd. The N-channel transistors Q1 through Q6, the capacitors C1 through C4, the first and the second input terminals Ti1, Ti2, the output terminal To, and the power supply terminal Tdd which constitute the booster section 51*a* and the driver section 51*b* are connected as shown in FIG. 28. The power supply terminal Tdd is supplied with a 5[V] supply voltage VDD, the first input terminal Ti1 is supplied with a first clock signal DCK1 shown in FIG. 29 and the second input terminal Ti2 is supplied with a second clock signal DCK1B shown in FIG. 29. As shown in FIG. 29, the first clock signal DCK1 and the second clock signal DCK1B are pulse signals each having a voltage alternating oppositely to each other between 0[V] and 5[V] (=VDD). Based on the first and the second clock signals DCK1, DCK1B as the above, the supply voltage VDD is boosted to twice as high by using the capacitors C1, C2, and the doubled voltage is outputted as a boosted supply voltage, from the output terminal To via the N-channel transistor Q1 or Q2.

In FIG. 28, each of the N-channel transistors Q1 through Q6 is marked with a cross drawn in broken lines if the transistor is in OFF state. The unmarked transistors are in ON state. Also, a number or a mathematical expression at each point of connection indicates a voltage at the connecting point. With such crosses drawn in broken lines, and numbers and mathematical expressions, FIG. 28(A) shows a state where the first clock signal DCK1 has a voltage of 0[V] while the second clock signal DCK1B has a voltage of 5[V] (namely, during Time Period A in FIG. 29), with an indication of the ON/OFF state for each of the N-channel transistors Q1 through Q6 and a voltage at each point of connection. FIG. 28(B) shows a state where the first clock signal DCK1 has a voltage of 5[V] while the second clock signal DCK1B has a voltage of 0[V] (namely, during Time Period B in FIG. 29), with an indication of the ON/OFF state for each of the N-channel transistors Q1 through Q6 and a voltage at each point of connection. Reference symbols "s", "d" and "g" in FIG. 28 indicate a source terminal, a drain terminal and a gate terminal in each of the transistors Q1 through Q6.

In its steady-state operation, this charge pump circuit repeats an operation in Time Period A in which the circuit assumes the state shown in FIG. 28(A) and an operation in Time Period B in which the circuit assumes the state shown in FIG. 28(B), alternately to each other. In Time Period A, the driver section 51b supplies a voltage of 10[V] to the gate terminals of the N-channel transistors Q2, Q3 as control signals and a voltage of 5[V] to the gate terminals of the N-channel transistors Q1, Q4 as control signals whereas in Time Period B, the driver section 51b supplies a voltage of 5[V] to the N-channel transistors Q2, Q3 as control signals and a voltage of 10[V] to the gate terminals of the N-channel transistors Q1, Q4 as control signals. As a result, the capacitor C1 has its first terminal supplied with the supply voltage VDD (=5[V]) thereby being charged during Time Period A (with the second terminal of the capacitor C1 being supplied with 0[V]), whereas in Time Period B, the second terminal is supplied with the first clock signal DCK1 of 5[V], and therefore the first terminal of the capacitor C1 has a voltage of 10[V]. Likewise, the capacitor C2 has its first terminal supplied with the supply voltage VDD (=5[V]) thereby being charged during Time Period B (with the second terminal of the capacitor C2 being supplied with 0[V]) whereas in Time Period A, the second terminal is supplied with the second clock signal DCK1B of 5[V], and therefore the first terminal of the capacitor C2 then has a voltage of 10[V]. The 10[V] voltage thus obtained is outputted through the N-channel transistor Q2 and then from the output terminal To in Time Period A as a boosted supply voltage whereas in Time Period B, the voltage is outputted through the N-channel transistor Q1 and then from the output terminal To.

However, the voltage which is supplied to the gate terminal of N-channel transistor Q2 in Time Period A and the voltage which is supplied to the gate terminal of N-channel transistor Q1 in Time Period B are both 10[V], i.e. equal to the source terminal voltage of the transistors Q1, Q2, and this results in a voltage drop by threshold value. Consequently, the voltage which is actually outputted from the output terminal To is lower than 10[V] by a threshold voltage Vth of the N-channel transistors Q1, Q2, i.e. 10-Vth [V] (see FIG. 28(A) and FIG. 28(B)).

As described thus far, if switching elements used in a charge pump circuit are provided solely by N-channel transistors, boosting to the target voltage is impossible due to the voltage drop by threshold value. The voltage drop by threshold value is particularly a problem in cases where the switching elements in the charge pump circuit are provided by TFTs, i.e. a type of MOS transistors, since the TFT has a relatively large threshold voltage and the threshold value varies relatively widely. If the threshold voltage is decreased in an attempt to achieve voltage boosting as closely as to the target voltage, the MOS transistors allow charge backflow when they are supposed to be in OFF state, making it impossible to perform stable boosting.

On the other hand, it is not totally impossible to constitute a charge pump circuit in which all of the transistors are N-channel transistors yet the circuit is capable of making a boost to a higher voltage than a desired supply voltage (see Patent Document 3 (JP-A 2002-8385 Gazette) for example). In this case, a boosted voltage is higher than a desired supply voltage even after the voltage drop by threshold value, so it is possible to obtain the desired supply voltage by lowering the boosted voltage. For example, assume that an input supply voltage is VDD; a desired supply voltage is 2VDD; and a charge pump circuit incorporates N-channel transistors having a threshold voltage of Vth, and is capable of outputting a voltage of 3VDD-Vth. Then, it is possible to obtain the desired supply voltage of 2VDD by lowering the voltage of 3VDD-Vth. However, such a configuration requires application of an excessively high voltage to the transistors and is not preferable in view of breakdown voltage of and power consumption by the transistors.

It is therefore an object of the present invention to provide a power supply circuit including a charge-pumping booster section which uses switching elements provided solely by N-channel transistors yet does not have the problem of voltage drop by threshold value. Another object of the present invention is to provide a driver monolithic display device including such a power supply circuit.

Means for Solving the Problems

A first aspect of the present invention provides a charge-pumping power supply circuit for boosting an externally supplied input supply voltage, which includes:

a booster section including a main boosting capacitor and an input-side and an output-side switching elements connected with a first terminal of the main boosting capacitor, for boosting a voltage supplied to the main boosting capacitor via the input-side switching element and outputting a boosted voltage as a boosted supply voltage via the output-side switching element; and a booster control section for causing the input-side and the output-side switching elements to turn on and off oppositely to each other.

Each of the input-side and the output-side switching elements is provided by an N-channel transistor of a positive threshold voltage.

The booster control section boosts the boosted voltage thereby generating a voltage which is higher than the boosted voltage by at least the threshold voltage and supplies the generated voltage to a control terminal of the output-side switching element when turning on the output-side switching element.

A second aspect of the present invention provides the power supply circuit according to the first aspect of the present invention, wherein the booster control section includes: a control-boosting switching element provided by an N-channel transistor of a positive threshold voltage; a control-boosting capacitor having a first terminal connected with the control terminal of the output-side switching element as well as with the first terminal of the main boosting capacitor via the control-boosting switching element; and an internal control section for turning on and off the control-boosting switching element; and boosts the boosted voltage supplied from the main boosting capacitor to the control-boosting capacitor via the control-boosting switching element, thereby supplying the control terminal of the output-side switching element with a voltage which is higher than the boosted voltage by at least the threshold voltage of the output-side switching element, when turning on the output-side switching element.

The internal control section boosts the boosted supply voltage thereby generating a voltage which is higher than the boosted voltage by at least the threshold voltage of the control-boosting switching element and supplying the generated voltage to a control terminal of the control-boosting switching element when there is a supply of the boosted voltage from the main boosting capacitor to the control-boosting capacitor via the control-boosting switching element.

A third aspect of the present invention provides the power supply circuit according to the first aspect of the present invention, wherein the booster section includes:

a power supply terminal for receiving the input supply voltage;

a first and a second input terminals for receiving a first and a second clock signals respectively;

an output terminal for outputting the boosted supply voltage;

a first and a second switching elements each serving as the output-side switching element;

a third and a fourth switching elements each serving as the input-side switching element;

a first capacitor serving as the main boosting capacitor, having a first terminal connected with the power supply terminal via the third switching element as well as with the output terminal via the first switching element, and a second terminal connected with the first input terminal; and a second capacitor serving as the main boosting capacitor, having a first terminal connected with the power supply terminal via the fourth switching element as well as with the output terminal via the second switching element, and a second terminal connected with the second input terminal.

The booster control section includes:

a third input terminal for receiving a third clock signal;

a fifth and a sixth switching elements each serving as the control-boosting switching element and provided by an N-channel transistor;

a third capacitor serving as the control-boosting capacitor, having a first terminal connected with a control terminal of the first switching element as well as with the first terminal of the first capacitor via the fifth switching element, and a second terminal connected with the third input terminal;

a fourth capacitor serving as the control-boosting capacitor, having a first terminal connected with a control terminal of the second switching element as well as with the first terminal of the second capacitor via the sixth switching element, and a second terminal connected with the third input terminal;

a first wire connecting the first terminal of the first capacitor with a control terminal of the fourth switching element; and a second wire connecting the first terminal of the second capacitor with a control terminal of the third switching element.

A fourth aspect of the present invention provides the power supply circuit according to the third aspect of the present invention, wherein the booster control section further includes:

a seventh switching element provided by an N-channel transistor having a control terminal connected with the second wire; and an eighth switching element provided by an N-channel transistor having a control terminal connected with the first wire.

The first terminal of the third capacitor is connected with the power supply terminal via the seventh switching element.

The first terminal of the fourth capacitor is connected with the power supply terminal via the eighth switching element.

A fifth aspect of the present invention provides the power supply circuit according to the third aspect of the present invention, wherein the booster control section further includes an internal control section for turning on and off the control-boosting switching element.

The internal control section boosts the boosted supply voltage thereby generating a voltage which is higher than the boosted voltage by at least the threshold voltage of the control-boosting switching element and supplying the generated voltage to the control terminal of the control-boosting switching element when there is a supply of the boosted voltage from the main boosting capacitor to the control-boosting capacitor via the control-boosting switching element.

A sixth aspect of the present invention provides the power supply circuit according to the fifth aspect of the present invention, wherein the internal control section includes:

a fourth input terminal for receiving a fourth clock signal;

a first and a second internal control switching elements each provided by an N-channel transistors of a positive threshold voltage;

a first internal control capacitor having a first terminal connected with the output terminal via the first internal control switching element as well as connected with a control terminal of the second internal control switching element, and a second terminal connected with the third input terminal; and a second internal control capacitor having a first terminal connected with the output terminal via the second internal control switching element as well as connected with a control terminal of the first internal control switching element, and a second terminal connected with the fourth input terminal.

The first terminal of the second internal control capacitor is connected with control terminals of the fifth and the sixth switching elements.

A seventh aspect of the present invention provides the power supply circuit according to the first aspect of the present invention, wherein the switching elements in the booster section and the booster control section are made of a polycrystal silicon.

An eighth aspect of the present invention provides the power supply circuit according to the first aspect of the present invention, wherein the switching elements in the booster section and the booster control section are provided by N-channel thin film transistors.

A ninth aspect of the present invention provides a driver monolithic display device, in which a plurality of pixel circuits for formation of an image intended to display and at least part of a circuit for driving the pixel circuits are both formed on one substrate. The display device includes:

a display section including the pixel circuits;

the power supply circuit according to one of Claims 1 through 8; and a drive circuit which receives the boosted supply voltage from the power supply circuit and drives the display section;

wherein the substrate is formed thereon with the pixel circuits, at least part of the drive circuit and the power supply circuit.

A tenth aspect of the present invention provides the driver monolithic display device according to the ninth aspect of the present invention, wherein switching elements in the pixel circuits, said at least part of the drive circuit and the power supply circuit formed on the substrate are each provided by an N-channel thin film transistor.

Advantages of the Invention

According to the first aspect of the present invention, when a boosted voltage obtained at the first terminal of the main boosting capacitor is outputted as a boosted supply voltage via the output-side switching element by turning ON the output-side switching element which is provided by an N-channel transistor, the N-channel transistor's control terminal (gate terminal) is supplied with a voltage which is higher than the boosted voltage by at least the threshold voltage of the N-channel transistor. Hence, the N-channel transistor does not have a voltage drop by threshold value, so the boosted voltage is intact when it is outputted as the boosted supply voltage. Therefore, even if the switching elements are solely provided by N-channel transistors, it is now possible to provide a power supply circuit which is capable of outputting a desired boosted supply voltage reliably without being affected by threshold values or variations thereof. The configuration which uses switching elements solely provided by N-channel transistors provides a way to reduce cost through a simplified process of manufacture than necessary for configurations which require both of N-channel transistors and P-channel transistors. When turning ON the output-side switching element, the voltage to be supplied to the control terminal of the switching element is generated by further boosting the boosted voltage that was obtained at the first terminal of the main boosting capacitor. This arrangement eliminates the problem of voltage drop by threshold value, with a relatively simple configuration while all the switching elements are provided by N-channel transistors. Further, since the arrangement does not require application of an excessively high voltage to the transistors in the power supply circuit, the present invention provides advantages over the conventional art which requires generation of a higher output voltage than the desired supply voltage in view of breakdown voltage of and power consumption by the transistors.

According to the second aspect of the present invention, when generating the voltage which is to be supplied to the control terminal of the output-side switching element in order to turn ON the output-side switching element, the boosted voltage is supplied from the main boosting capacitor to the control-boosting capacitor via a control-boosting switching element. In this process, the control terminal of the control-boosting switching element is supplied with a voltage which is higher than the boosted voltage by at least the threshold voltage of the control-boosting switching element. This eliminates voltage drop by threshold value in the control-boosting switching element, and it is now possible to reliably generate a voltage which is higher than the boosted voltage by at least the threshold voltage of the output-side switching element as a voltage that is to be supplied to the control terminal of the output-side switching element when turning ON the output-side switching element. The arrangement more reliably removes influences of voltage drop by threshold value on the boosted supply voltage which is outputted from the power supply circuit.

According to the third aspect of the present invention, two clock signals each having the same amplitude as the other and a voltage alternating oppositely to each other are supplied as the first and the second clock signals to the first and the second input terminals respectively. Along with this, the third input terminal is supplied with the third clock signal which has a voltage alternating between predetermined low and high levels with an amplitude greater than the threshold voltage of the output-side switching element, and is maintained at the high level during its period except for a predetermined time near a time point at which there is a voltage change in the first and the second clock signals. In this arrangement, charging and boosting take place in the first capacitor and the second capacitor alternately and complementary to each other. Specifically, in one operation state a boosted voltage obtained at the first terminal of the first capacitor is outputted via the first switching element; in another operation state a boosted voltage obtained at the first terminal of the second capacitor is outputted via the second switching element; and these two operation states are repeated alternately to each other. While one of the first and the second capacitors is employed in boosting operation, the other is being charged. Such a complementary boosting cycle makes it possible to improve electric current supply capability to a load.

Also according to the third aspect of the present invention, when turning ON the first switching element which serves as the output-side switching element, a boosted voltage obtained at the first terminal of the first capacitor is supplied to the third capacitor and is boosted further by the third clock signal, whereby a voltage which is higher than the originally boosted voltage by at least the threshold voltage of the first switching element is supplied to the control terminal of the first switching element. Likewise, when turning ON the second switching element which serves as the output-side switching element, a boosted voltage obtained at the first terminal of the second capacitor is supplied to the fourth capacitor and is boosted further by the third clock signal, whereby a voltage which is higher than the originally boosted voltage by at least the threshold voltage of the second switching element is supplied to the control terminal of the second switching element. The arrangement ensures that the boosted voltages obtained at the respective first terminals of the first and the second capacitors are outputted as the boosted supply voltage without voltage drop by threshold value in the first and the second switching elements. Therefore, it is possible to output a desired boosted supply voltage reliably without being affected by the threshold voltage of the N-channel transistors or variation thereof even in cases where all of the switching elements in both of the booster section and the booster control section are provided by N-channel transistors.

According to the fourth aspect of the present invention, the third capacitor, which has its first terminal connected with the control terminal of the first switching element serving as the output-side switching element, is connected at its first terminal with the power supply terminal via the seventh switching element. This arrangement ensures that even in a case where the fifth switching element happens to have an unexpectedly large variation in its threshold value so as to be unable to turn ON the first switching element, it is still possible to turn ON the first switching element by boosting a voltage which is supplied to the third capacitor via the seventh switching element. Likewise, the fourth capacitor, which has its first terminal connected with the control terminal of the second switching element serving as the output-side switching element, is connected at its first terminal with the power supply terminal via the eighth switching element. This arrangement ensures that even in a case where the sixth switching element happens to have an unexpectedly large variation in its threshold value so as to be unable to turn ON the second switching element, it is still possible to turn ON the second switching element by boosting a voltage which is supplied to the fourth capacitor via the eighth switching element.

According to the fifth aspect of the present invention, when generating the voltage which is to be supplied to the control terminal of the output-side switching elements (the first and the second switching elements) in order to turn ON these switching elements, the boosted voltage is supplied from the main boosting capacitors (the first and the second capacitors) to the control-boosting capacitors (the third and the fourth capacitors) via the control-boosting switching elements (the fifth and the sixth switching elements). Meanwhile, the control terminal of the respective control-boosting switching elements (the fifth and the sixth switching elements) are supplied with a voltage which is higher than the said boosted voltage by at least the threshold voltage of the control-boosting switching elements. The arrangement makes it possible to reliably generate a voltage which is higher than the boosted voltage by at least the threshold voltage of the output-side switching element as a voltage that is to be supplied to the control terminal of the output-side switching element when turning ON the output-side switching element.

According to the sixth aspect of the present invention, a clock signal of a voltage which changes oppositely to the third clock signal and of an amplitude which is greater at least than a threshold voltage of the fifth and the sixth switching elements serving as the control-boosting switching element is supplied as the fourth clock signal to the fourth input terminal, whereby the control-boosting switching elements have their respective control terminals supplied with a voltage which is higher than the boosted voltage obtained at the first terminal of the main boosting capacitor by at least the threshold voltage of the control-boosting switching element. Specifically, during a steady operation, the boosted supply voltage is held in the first and the second internal control capacitors, and when generating the voltage which is to be supplied to the control terminals of the output-side switching elements in order to turn ON these switching elements, the boosted voltage is supplied from the main boosting capacitors to the control-boosting capacitors via the control-boosting switching elements. In this process, the boosted supply voltage which is obtained at the first terminal of the second internal control capacitor is boosted by the fourth clock signal. Thus, the control terminal of the control-boosting switching element is supplied with a voltage which is higher than the originally boosted voltage by at least the threshold voltage of the control-boosting switching elements. This eliminates voltage drop by threshold value in the control-boosting switching elements, ensuring reliable generation of a voltage which is higher than the boosted voltage by at least the threshold voltage of the output-side switching element as a voltage that is to be supplied to the control terminal of the output-side switching element when turning ON the output-side switching element.

According to the seventh aspect of the present invention, since there is no voltage drop by threshold value in the output-side switching element of the boosting section even if the switching elements are solely provided by N-channel transistors, it is possible to form a power supply circuit which is capable of outputting a desired boosted supply voltage reliably, on an insulated substrate such as a glass substrate, using N-channel transistors made of polycrystal silicon whose threshold value is higher and variation thereof is wider than those made of monocrystal silicon.

According to the eighth aspect of the present invention, since there is no voltage drop by threshold value in the output-side switching element of the boosting section even if the switching elements are solely provided by N-channel transistors, it is possible to form a power supply circuit which is capable of outputting a desired boosted supply voltage reliably, on an insulated substrate such as a glass substrate, using N-channel transistors provided by thin film transistors whose threshold value is higher and variation thereof is wider than those made of monocrystal silicon.

According to the ninth aspect of the present invention, a driver monolithic display device includes a substrate formed thereon with a voltage boosting power supply circuit together with a plurality of pixel circuits and at least part of a driving circuit. In this configuration, the power supply circuit uses N-channel transistors for all of its switching elements, and yet is capable of outputting a desired boosted supply voltage reliably without a voltage drop by threshold value. Thus, the present invention enables size reduction of display devices and cost reduction in the manufacture thereof.

According to the tenth aspect of the present invention, a driver monolithic display device includes a substrate formed thereon with a voltage boosting power supply circuit together with a plurality of pixel circuits and at least part of a driving circuit. In this configuration, the power supply circuit is capable of outputting a desired boosted supply voltage reliably without a voltage drop by threshold value. Further, switching elements constituting these pixel circuits, the part of driving circuit and the power supply circuit which are formed on the same substrate are solely provided by N-channel thin film transistors. This enables simultaneous formation and cost reduction thereby of these circuits, to be achieved through a fewer number of manufacturing steps than necessary for cases which require both N-channel thin film transistors and P-channel thin film transistors.

BRIEF DESCRIPTION OF THE DRAWINGS

FIG. 3(A) is a signal waveform chart; and FIG. 3(B) is a circuit diagram.

FIG. 4(A) is a signal waveform chart; and FIG. 4(B) is a circuit diagram.

FIG. 5(A) is a signal waveform chart; and FIG. 5(B) is a circuit diagram.

FIG. 6(A) is a signal waveform chart; and FIG. 6(B) is a circuit diagram.

FIG. 7(A) is a signal waveform chart; and FIG. 7(B) is a circuit diagram.

FIG. 8(A) is a signal waveform chart; and FIG. 8(B) is a circuit diagram.

FIG. 9(A) is a signal waveform chart; and FIG. 9(B) is a circuit diagram.

FIG. 10(A) is a signal waveform chart; and FIG. 10(B) is a circuit diagram.

FIG. 11(A) is a signal waveform chart; and FIG. 11(B) is a circuit diagram.

FIG. 12(A) is a signal waveform chart; and FIG. 12(B) is a circuit diagram.

FIG. 13(A) is a signal waveform chart; and FIG. 13(B) is a circuit diagram.

FIG. 14(A) is a signal waveform chart; and FIG. 14(B) is a circuit diagram.

FIG. 15(A) is a signal waveform chart; and FIG. 15(B) is a circuit diagram.

FIG. 16(A) is a signal waveform chart; and FIG. 16(B) is a circuit diagram.

FIG. 17(A) is a signal waveform chart; and FIG. 17(B) is a circuit diagram.

FIG. 18(A) is a signal waveform chart; and FIG. 18(B) is a circuit diagram.

FIG. 20(A) is a signal waveform chart; FIG. 20(B) is an equivalent circuit diagram; and FIG. 20(C) is a table which shows a voltage at each node in each period in the equivalent circuit.

LEGEND

10 Thin film transistor (TFT)
11 Power supply circuit
11*a* Booster section
11*b* Booster control section
11*c* Internal control section
100 Liquid crystal panel
110 Pixel array
120 Source driver (data signal line drive circuit)
130 Gate driver (scanning signal line drive circuit)
140 CS driver (auxiliary capacitance line drive circuit)
150 Power supply section
200 Display control circuit
Ti1 First input terminal
Ti2 Second input terminal
Ti3 Third input terminal
Ti4 Fourth input terminal
To Output terminal
Tdd Power supply terminal
C1, C2 First and second capacitors (main boosting capacitors)
C3, C4 Third and fourth capacitors (control-boosting capacitors)
C5, C6 Fifth and sixth capacitors (internal control capacitors)
Q1, Q2 First and second transistors (output-side switching elements)
Q3, Q4 Third and fourth transistors (input-side switching elements)
Q5, Q6 Fifth and sixth transistors (control-boosting switching elements)
Q7, Q8 Seventh and eighth transistors
Q9, Q10 Ninth and tenth transistors (internal control switching elements)
L1, L2 First and second wires
N1 through N6 Nodes
$\phi 1$, $\phi 2$ First and second clock signals
$\phi 3$ Third clock signals
$\phi 4$ Fourth clock signals
VDD Supply voltage (Input supply voltage)
Vout Boosted supply voltage

BEST MODE FOR CARRYING OUT THE INVENTION

Hereinafter, an embodiment of the present invention will be described with reference to the attached drawings.

<1. Configuration>

Figure 1:
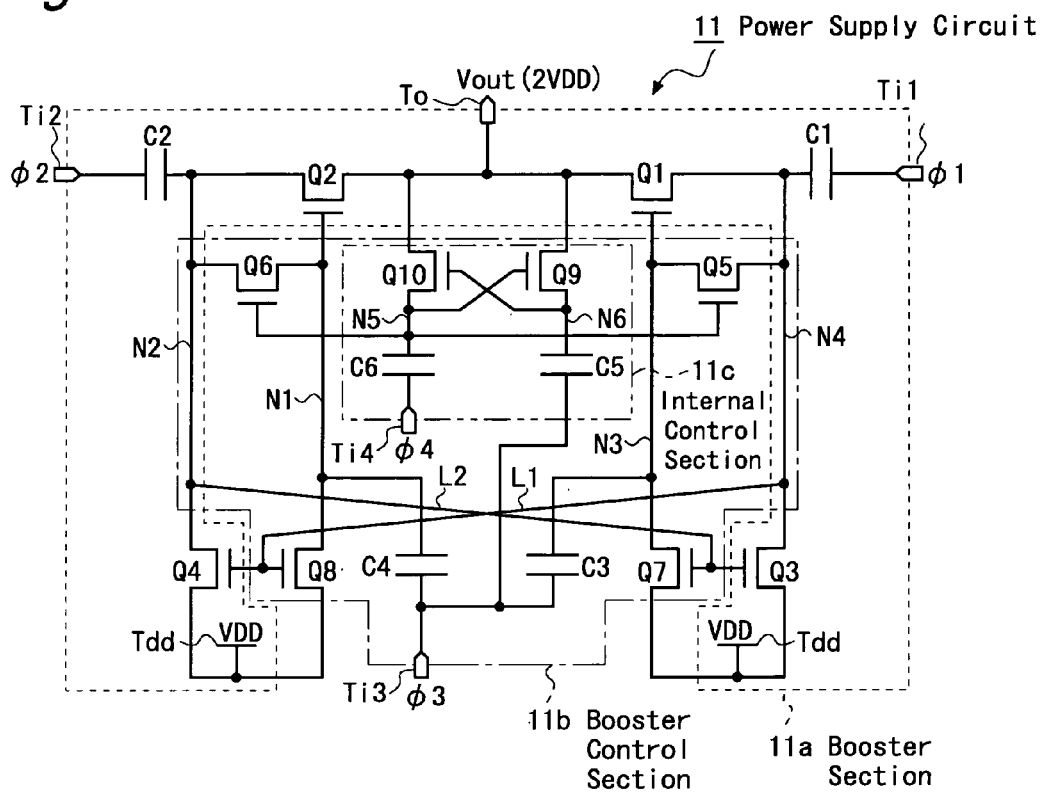
FIG. 1 is a circuit diagram which shows a configuration of a power supply circuit according to an embodiment of the present invention.

FIG. 1 is a circuit diagram which shows a configuration of a power supply circuit according to an embodiment of the present invention. This power supply circuit 11 includes: a booster section 11*a* which boosts an externally supplied input supply voltage VDD (>0) in a complimentary manner thereby generating a boosted supply voltage Vout (=2VDD); and a booster control section 11*b* which supplies the booster section 11*a* with signals for controlling the voltage boosting operation; and has external terminals including: a first and a second input terminals Ti1 and Ti2 for receiving externally supplied first and second clock signals $\phi 1$ and $\phi 2$ respectively; a third input terminals Ti3 for receiving a third clock signal $\phi 3$ for boosting the signals which controls the booster section 11*a*; a fourth input terminals Ti4 for receiving an externally supplied fourth clock signal $\phi 4$ for boosting internal control signal in the booster control section 11*b*; a power supply terminal Tdd for receiving the input supply voltage VDD; and an output terminal To for outputting the boosted supply voltage Vout (=2VDD). It should be noted here that FIG. 1 shows two power supply terminals Tdd for a clarity purpose but electrically they indicate the same, one power supply terminal Tdd.

As shown in FIG. 1, the power supply circuit according to the present embodiment uses N-channel transistors Q1 through Q10 as switching elements; in other words, no P-channel transistors are employed. In the configuration given in FIG. 1, the N-channel switching elements are provided by MOS (Metal Oxide Semiconductor) transistors. However, the switching elements to be used in the present embodiment are not limited to MOS transistors; in other words, the switching elements may be provided by N-channel field effect transistors of a different type as far as they are N-channel transistors which have a positive threshold voltage (hereinafter abbreviated as "N-ch transistor").

The booster section 11a includes: the N-ch transistors Q1, Q2 as output-side switching elements; the N-ch transistors Q3, Q4 as input-side switching elements; and a first and a second capacitors C1, C2 as main boosting capacitors. These constituent components are connected as shown in FIG. 1. Specifically, the capacitor C1 has a first terminal, which is connected with the power supply terminal Tdd via the N-ch transistor Q3 and also connected with the output terminal To via the N-ch transistor Q1. The capacitor C1 has a second terminal, which is connected with the first input terminal Ti1. The capacitor C2 has a first terminal, which is connected with the power supply terminal Tdd via the N-ch transistor Q4 and also connected with the output terminal To via the N-ch transistor Q2. The capacitor C2 has a second terminal, which is connected with the second input terminal Ti2.

The booster control section 11b includes the N-ch transistors Q5 through Q8 as control-boosting switching elements, a third and a fourth capacitors C3, C4 as control-boosting capacitors. These constituent components are connected as shown in FIG. 1. Specifically, the capacitor C3 has a first terminal, which is connected with a gate terminal of the N-ch transistor Q1 which serves as the output-side switching element, and also connected, via the N-ch transistor Q5, with the first terminal of the first capacitor C1, and further connected, via the N-ch transistor Q7, with the power supply terminal Tdd. The capacitor C4 has a first terminal, which is connected with a gate terminal of the N-ch transistor Q2 which serves as the output-side switching element, and also connected, via the N-ch transistor Q6, with the first terminal of the second capacitor C2, and further connected, via the N-ch transistor Q8, with the power supply terminal Tdd. The capacitors C3 and C4 have their respective second terminals connected with the third input terminal Ti3.

The booster control section 11b also includes a first wire L1, which connects the first terminal of the first capacitor C1 of the booster section 11a with the gate terminals of the N-ch transistors Q4 and Q8; and a second wire L2, which connects the first terminal of the second the capacitor C2 of the booster section 11a with the gate terminals of the N-ch transistors Q3 and Q7. Thus, an ON/OFF control signal for the N-ch transistors Q3 and Q7 is provided by a voltage at the first terminal of the main boosting capacitor C2, and an ON/OFF control signal for the N-ch transistors Q4 and Q8 is provided by a voltage at the first terminal of the main boosting capacitor C1.

Further, the booster control section 11b includes an internal control section 11c which generates an internal control signal for controlling ON/OFF operations of the N-ch transistors Q5, Q6. The internal control section 11c includes N-ch transistors Q9, Q10 as internal control switching elements, and a fifth and a sixth capacitors C5, C6 as internal control capacitors. These constituent elements are connected as shown in FIG. 1. Specifically, the capacitor C5 has a first terminal, which is connected with the output terminal To via the N-ch transistor Q9 and with the gate terminal of the N-ch transistor Q10. The capacitor C5 has a second terminal, which is connected with the third input terminal Ti3. The capacitor C6 has a first terminal, which is connected with the output terminal To via the N-ch transistor Q10 and with the gate terminal of the N-ch transistor Q9. The capacitor C6 has a second terminal, which is connected with the fourth input terminal Ti4. Further, the first terminal of the capacitor C6 is connected with the gate terminals of the control-boosting switching elements, i.e. of the N-ch transistors Q5 and Q6. Thus, an ON/OFF control signal for the control-boosting switching elements is provided by a voltage at the first terminal of the capacitor C6.

Figure 2:
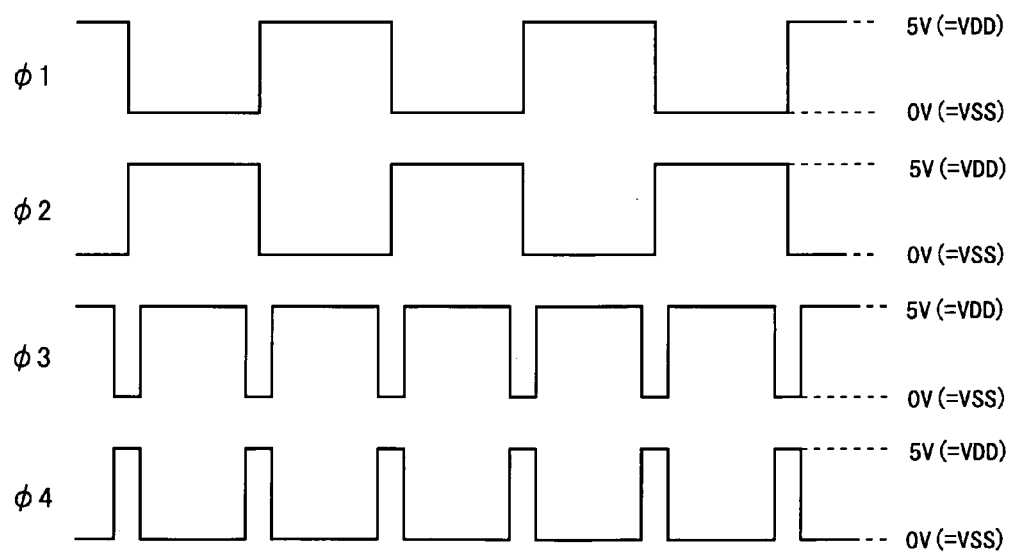
FIG. 2 is a waveform chart of clock signals for driving the power supply circuit according to the embodiment.
Figure 3:
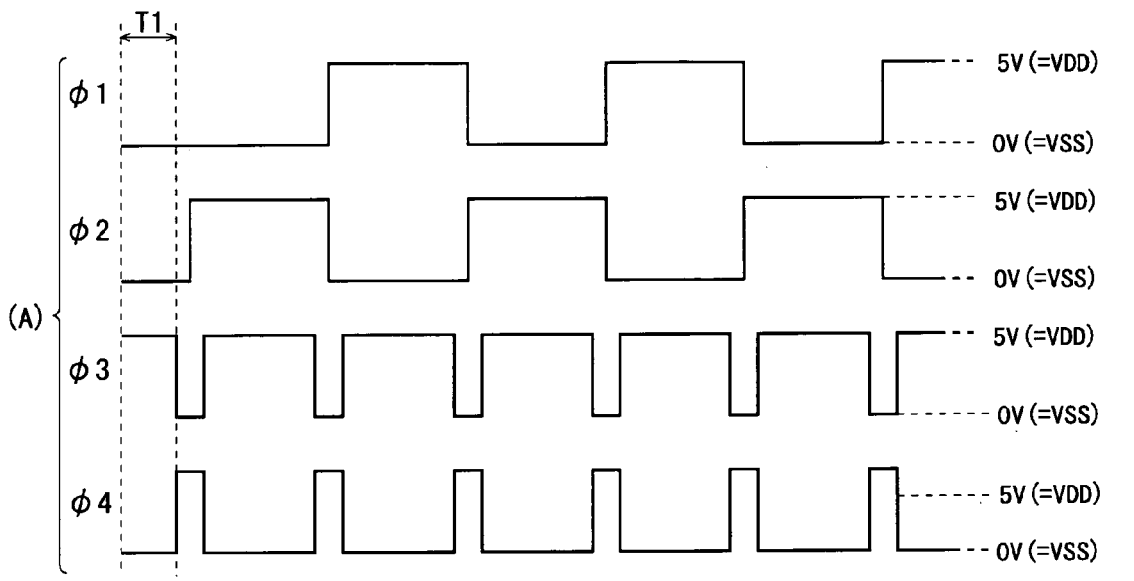
FIG. 3 consists of a chart and a diagram for describing a first operation state of the power supply circuit according to the embodiment.
Figure 3:
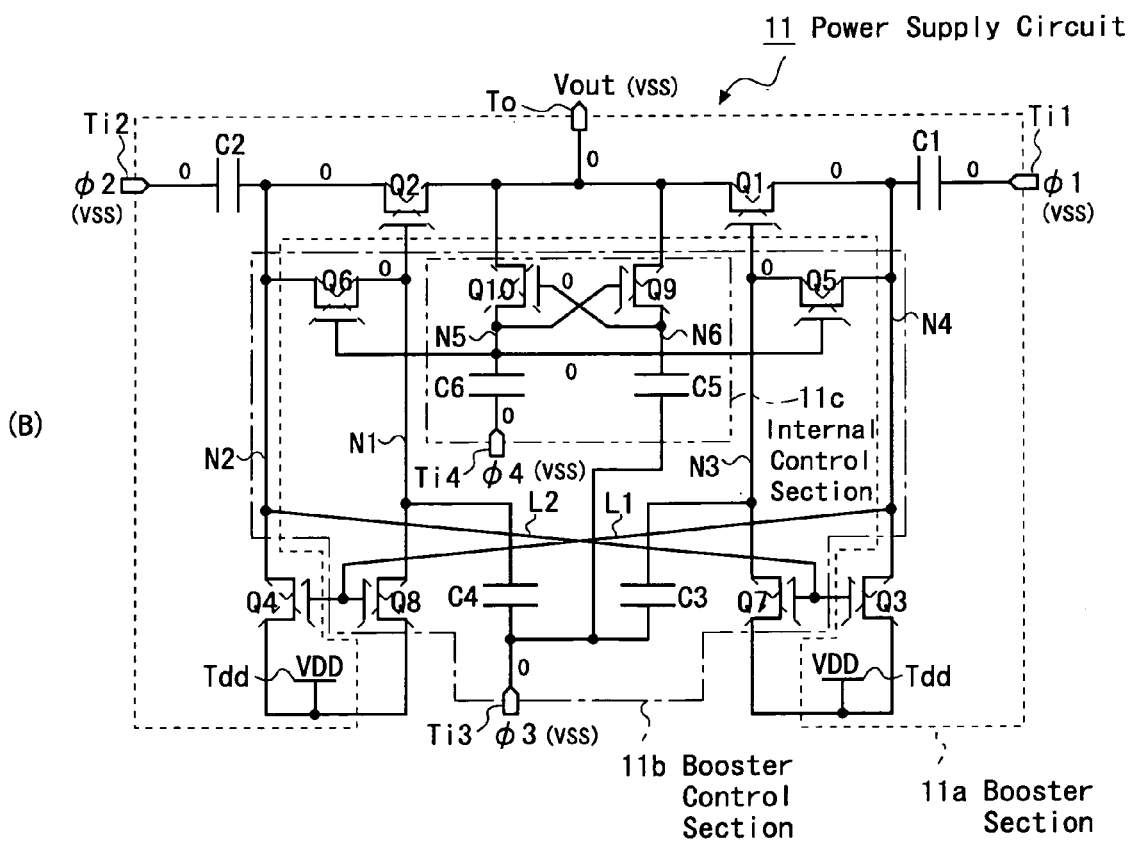
Figure 4:
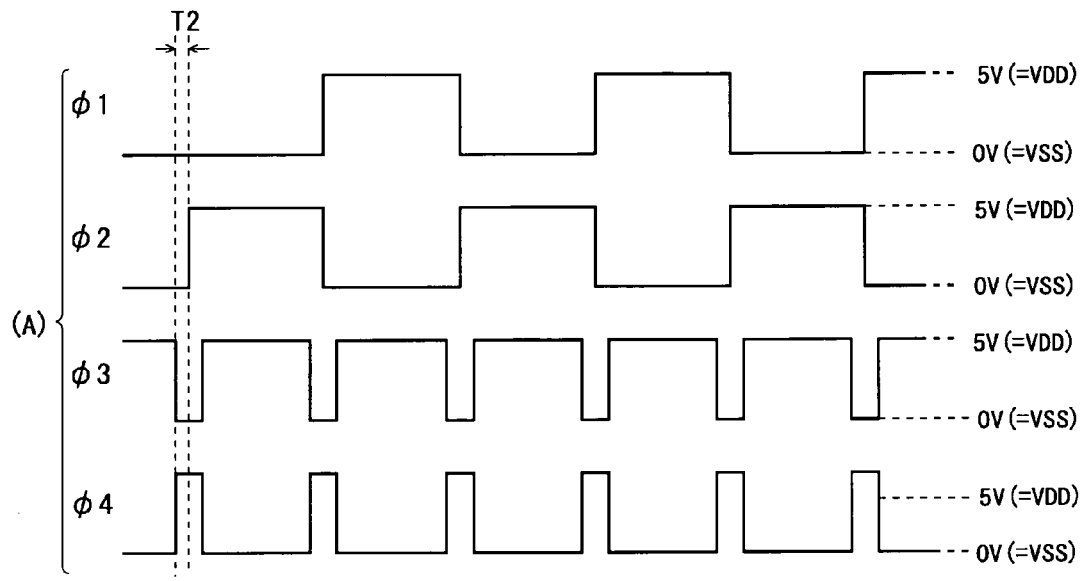
FIG. 4 consists of a chart and a diagram for describing a second operation state of the power supply circuit according to the embodiment.
Figure 4:
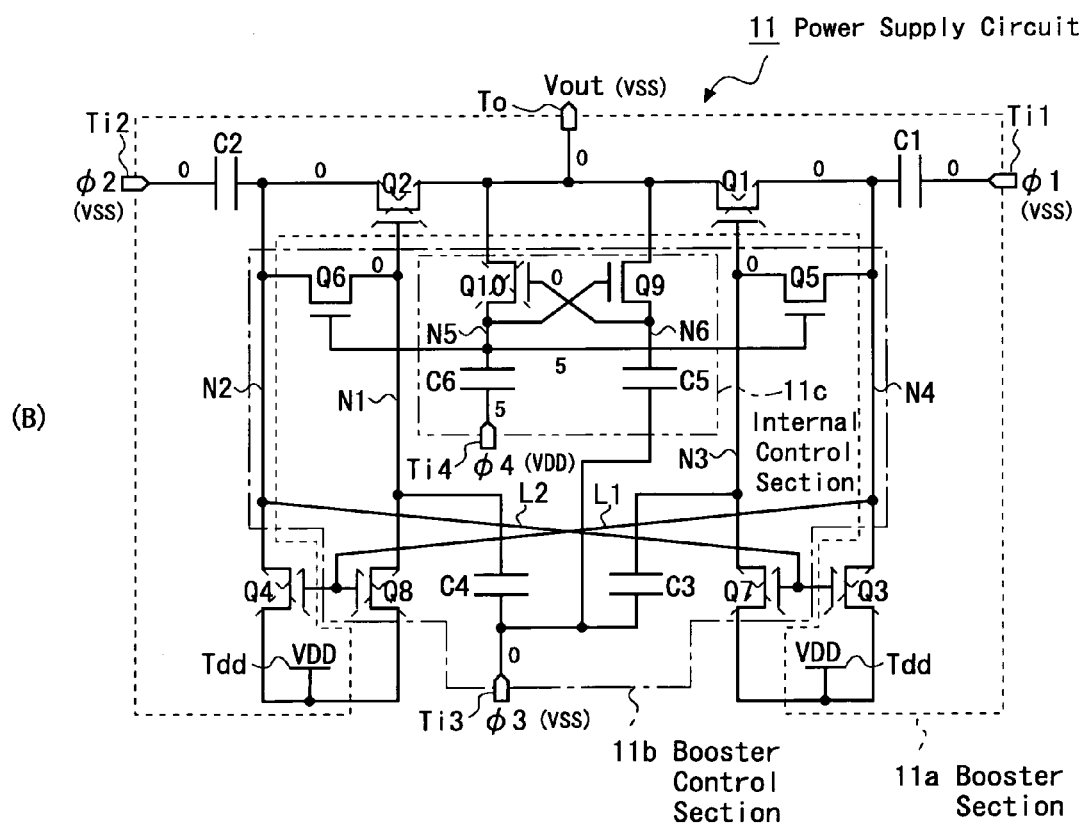
Figure 5:
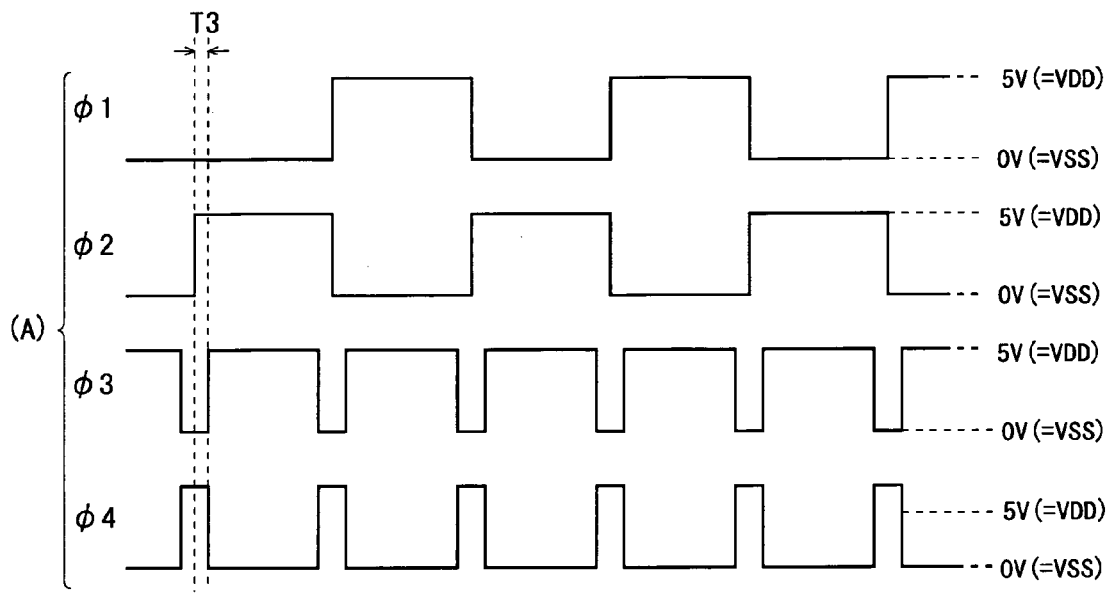
FIG. 5 consists of a chart and a diagram for describing a third operation state of the power supply circuit according to the embodiment.
Figure 5:
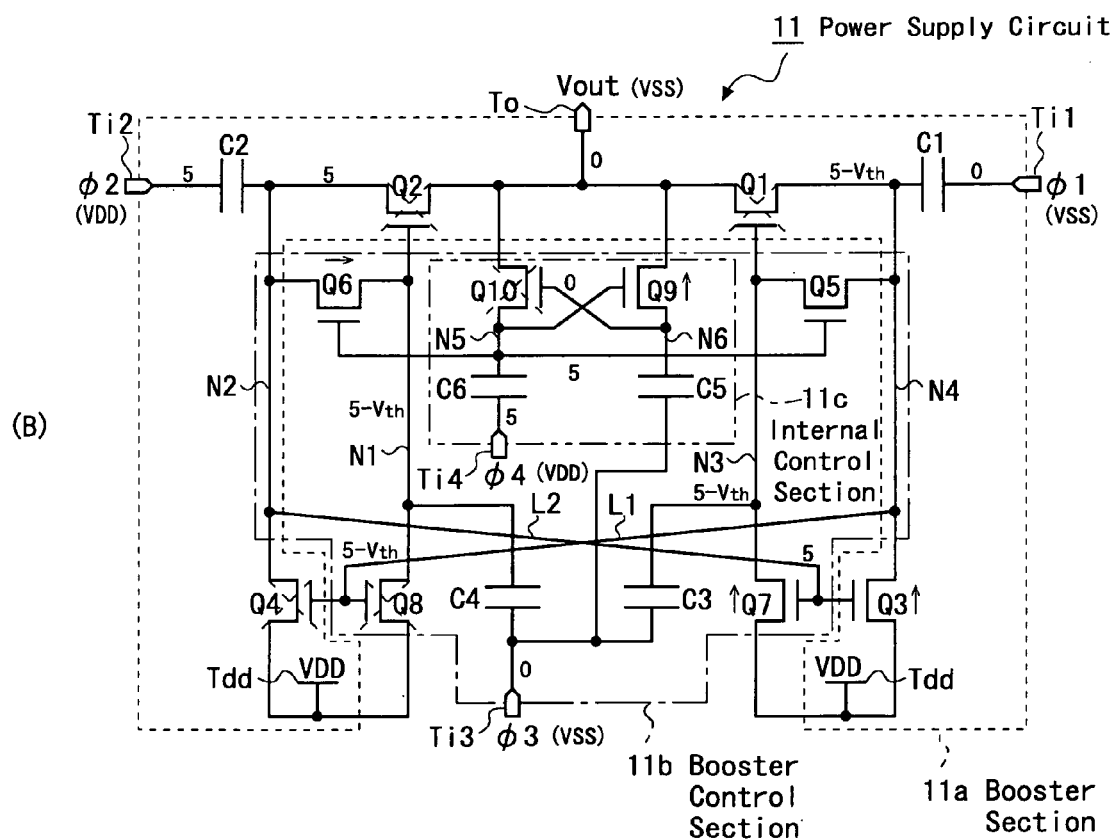
Figure 6:
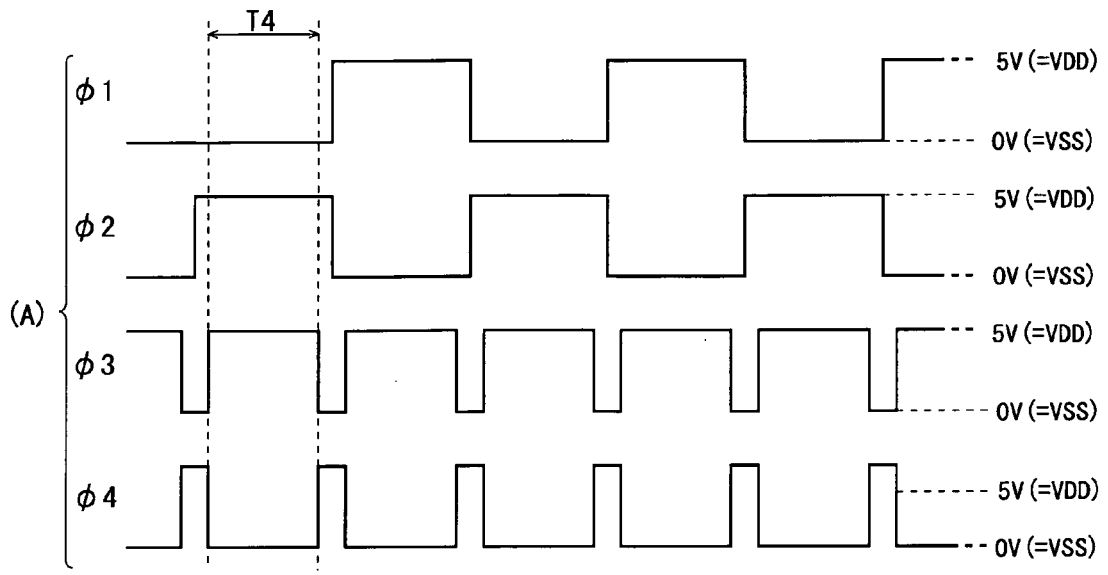
FIG. 6 consists of a chart and a diagram for describing a fourth operation state of the power supply circuit according to the embodiment.
Figure 6:
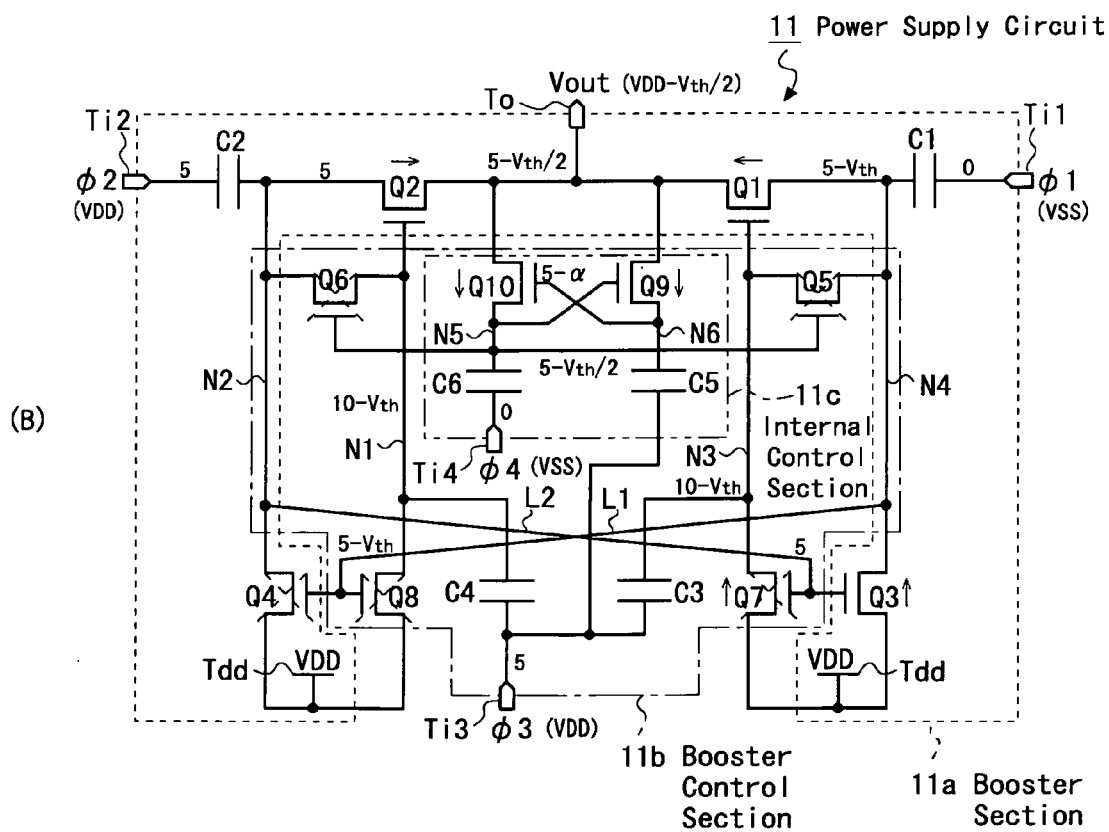
Figure 7:
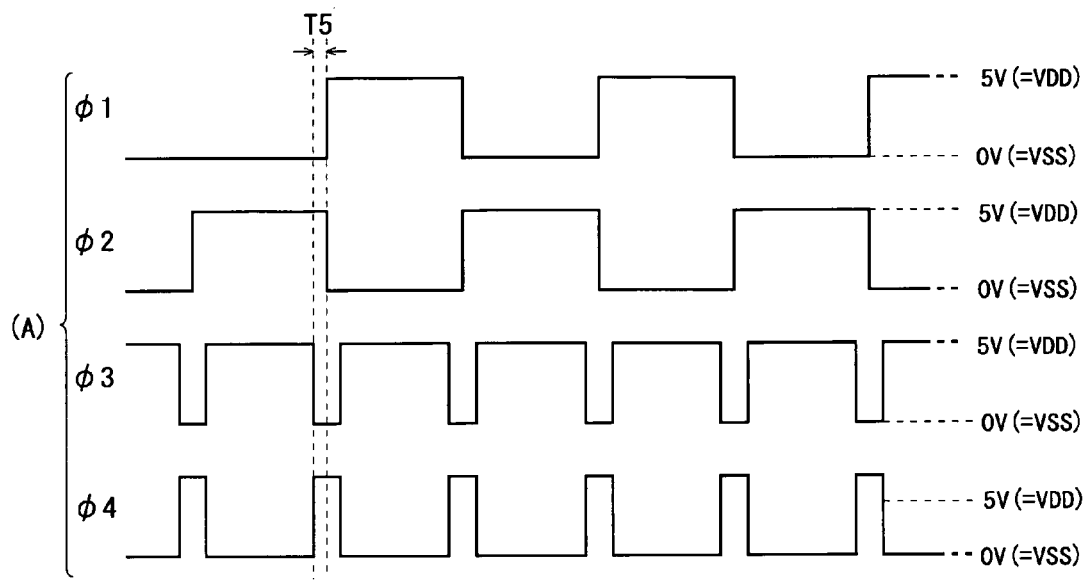
FIG. 7 consists of a chart and a diagram for describing a fifth operation state of the power supply circuit according to the embodiment.
Figure 7:
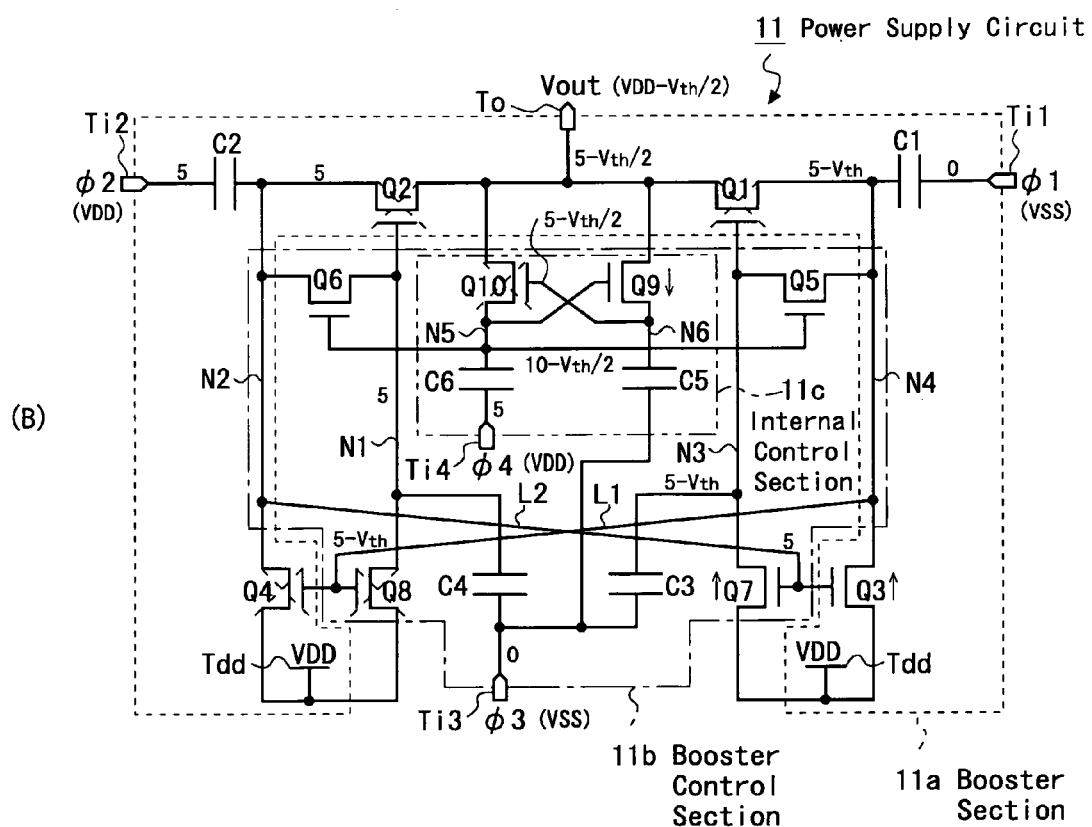
Figure 8:
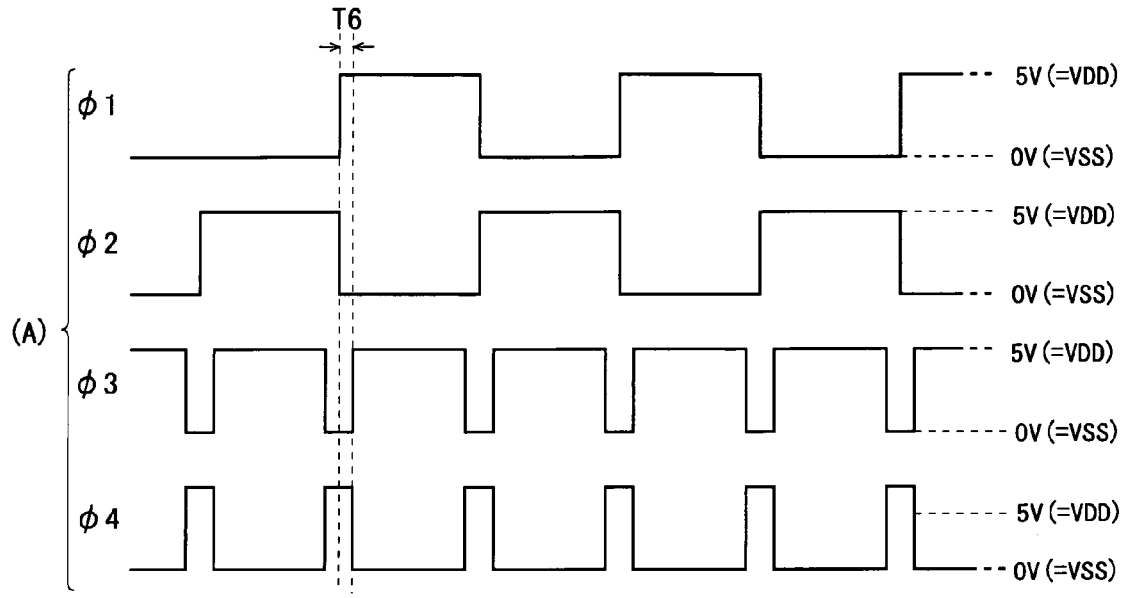
FIG. 8 consists of a chart and a diagram for describing a sixth operation state of the power supply circuit according to the embodiment.
Figure 8:
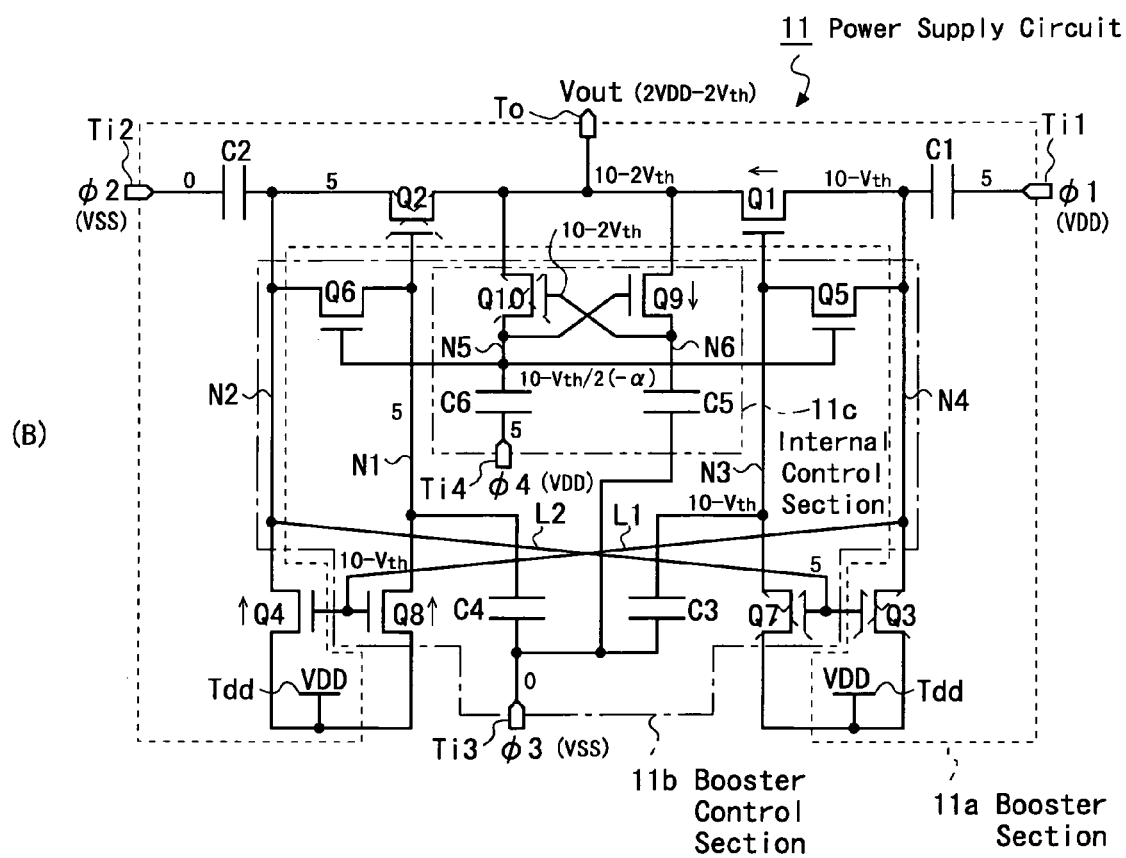
Figure 9:
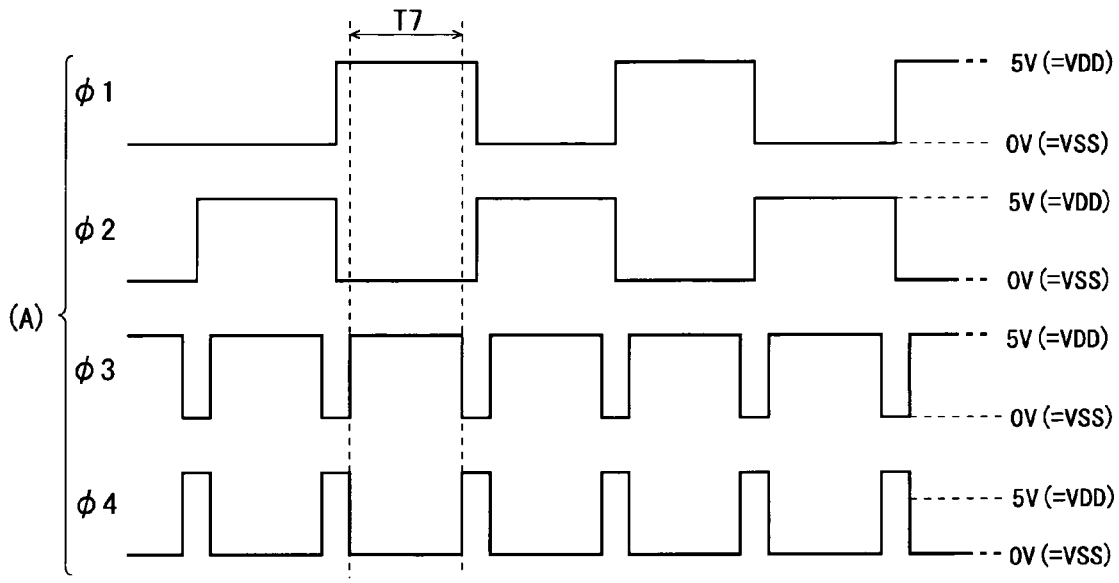
FIG. 9 consists of a chart and a diagram for describing a seventh operation state of the power supply circuit according to the embodiment.
Figure 9:
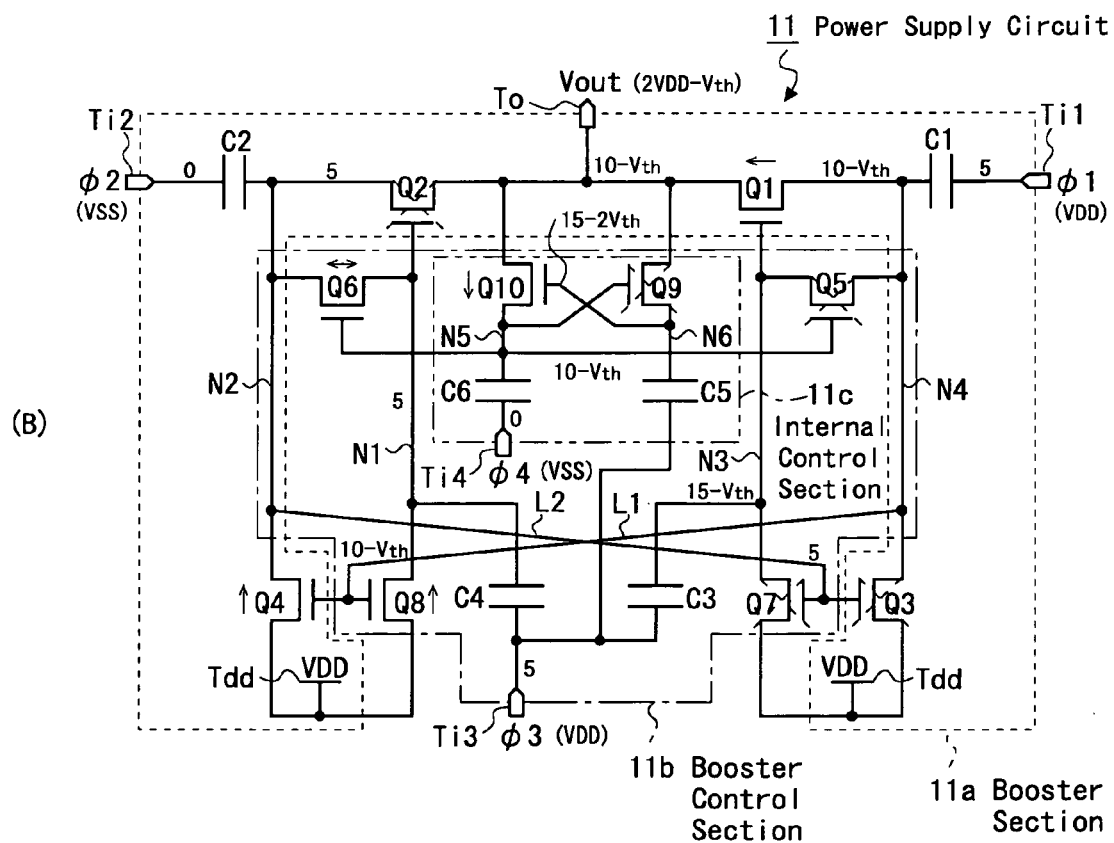
Figure 10:
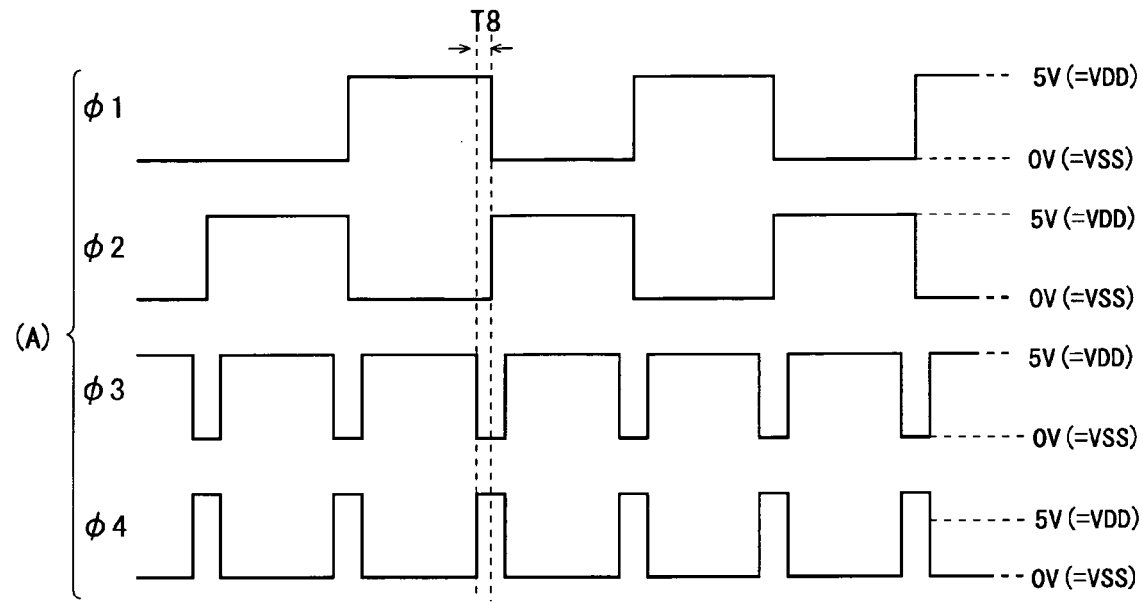
FIG. 10 consists of a chart and a diagram for describing an eighth operation state of the power supply circuit according to the embodiment.
Figure 10:
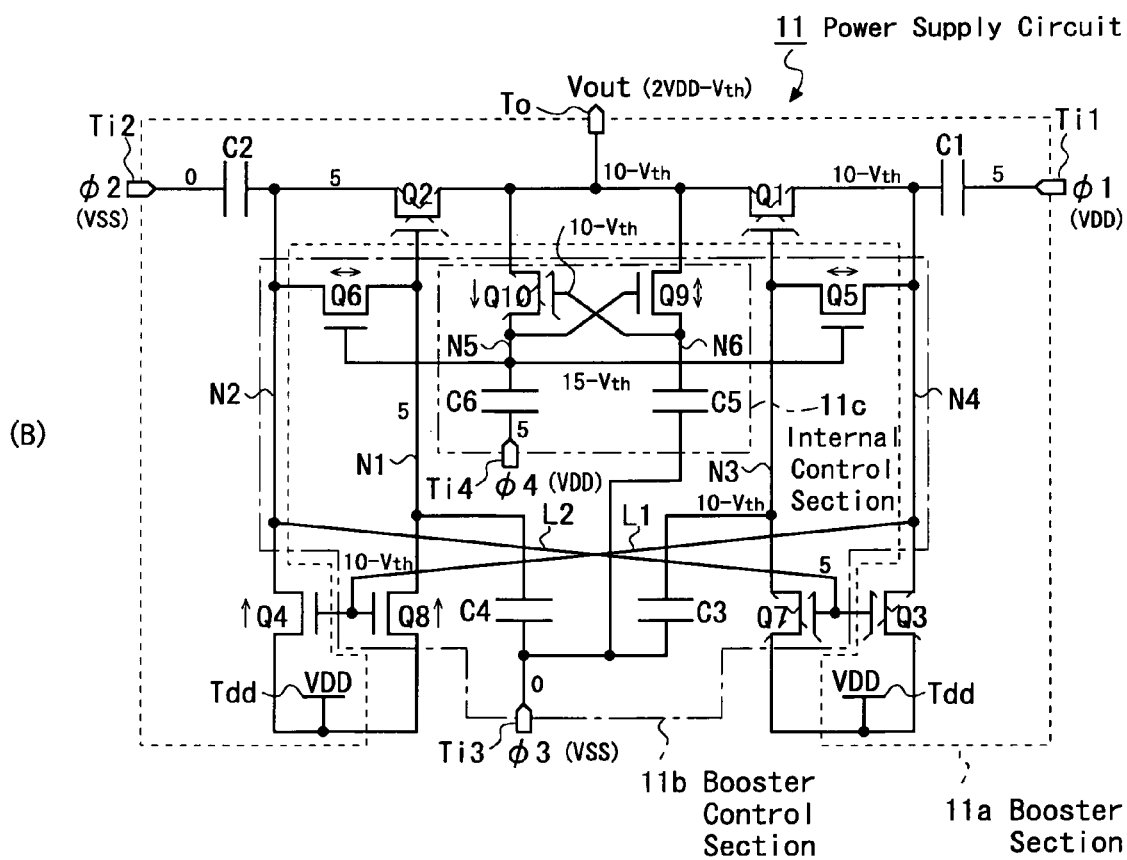
Figure 11:
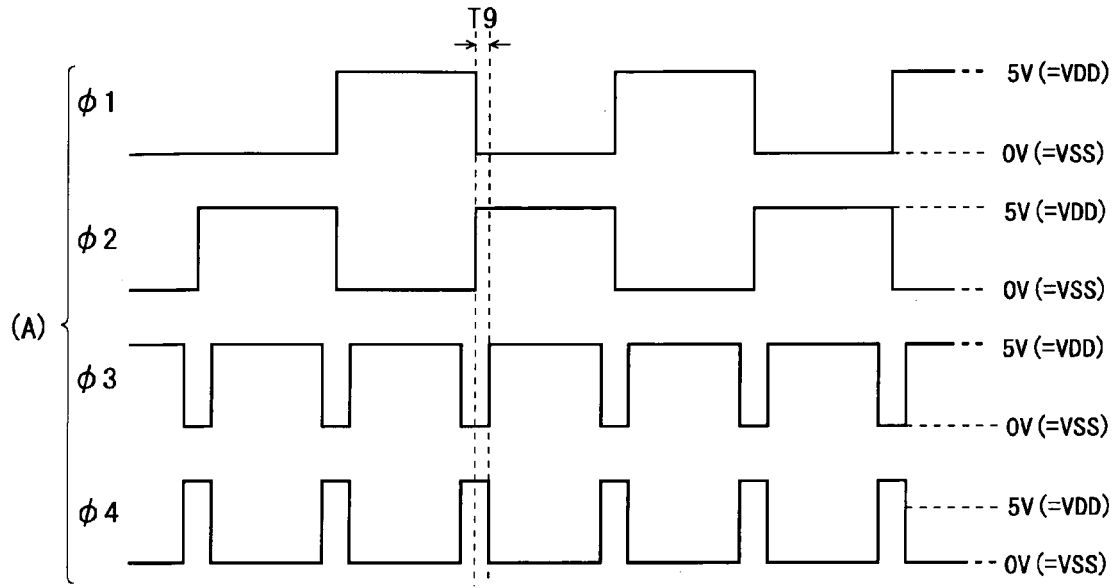
FIG. 11 consists of a chart and a diagram for describing a ninth operation state of the power supply circuit according to the embodiment.
Figure 11:
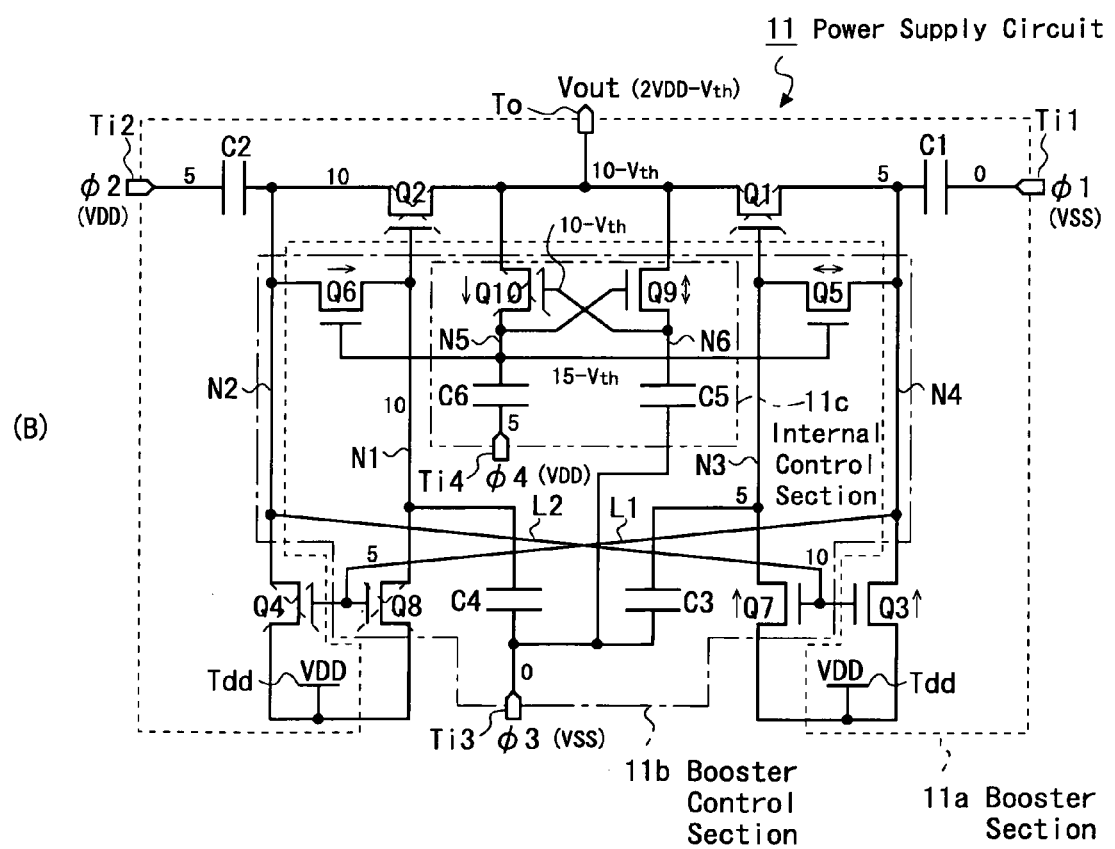
Figure 12:
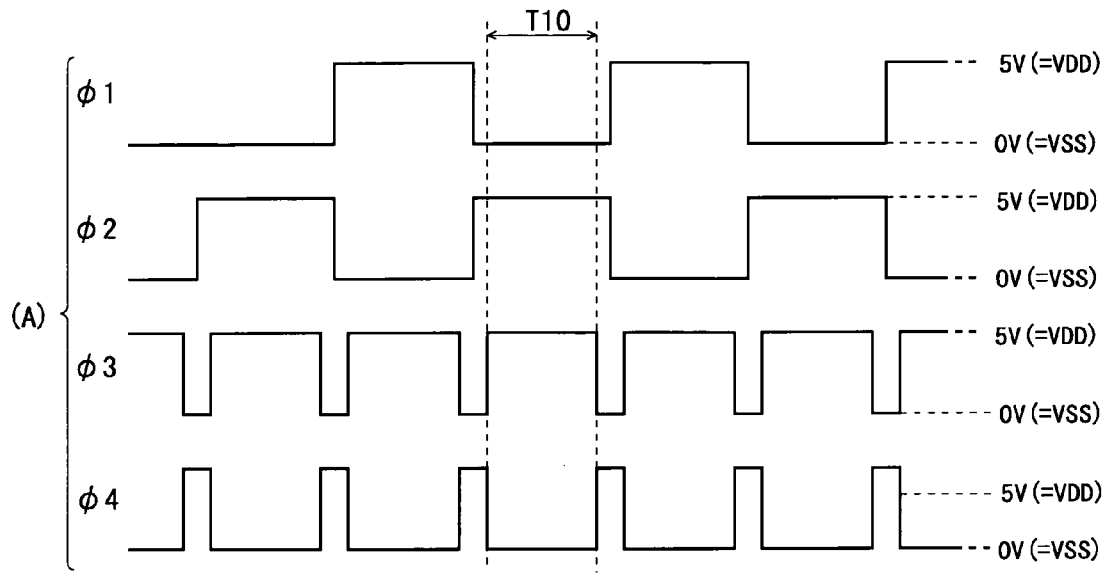
FIG. 12 consists of a chart and a diagram for describing a tenth operation state of the power supply circuit according to the embodiment.
Figure 12:
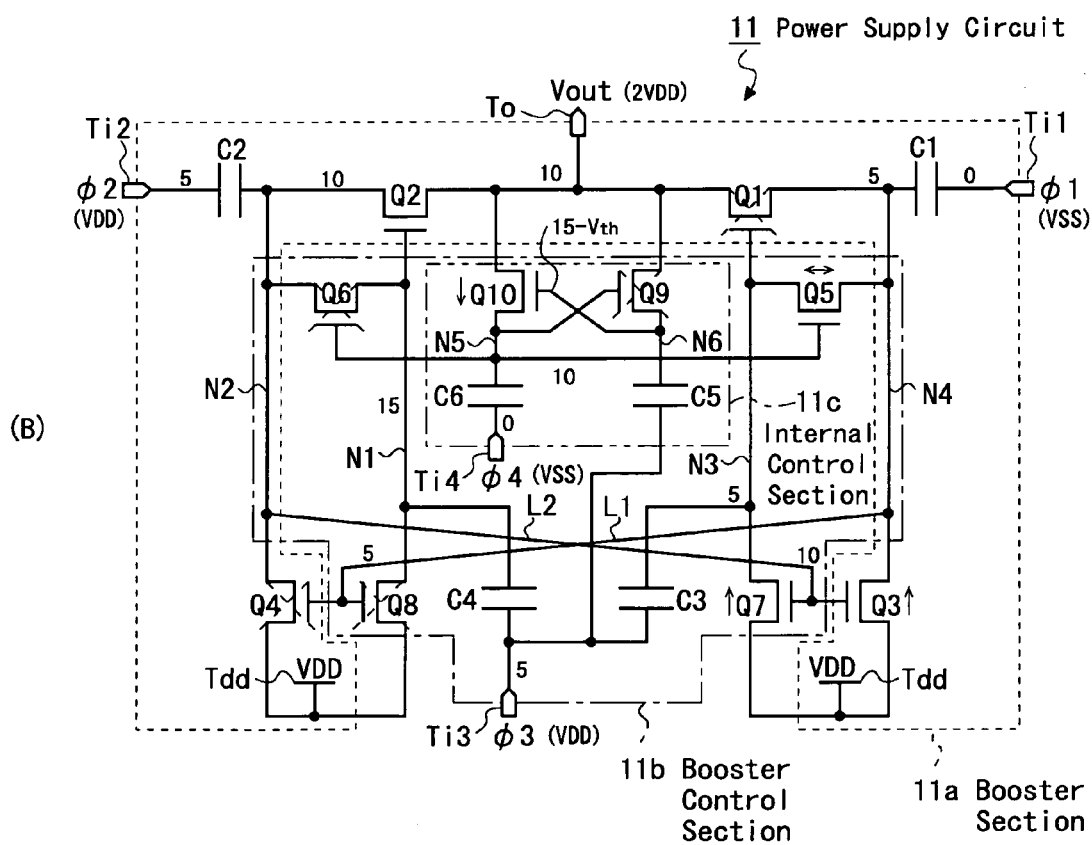

In order to operate the power supply circuit 11 as configured above, the first and the second input terminals Ti1, Ti2 are supplied with two pulse signals as shown in FIG. 2, each having a voltage alternating oppositely to each other between a supply voltage VDD and a grounding voltage VSS, respectively as the first and the second clock signals $\phi 1$, $\phi 2$. Also as shown in FIG. 2, the third input terminal Ti3 is supplied with the third clock signal $\phi 3$ provided by a pulse signal of a voltage which assumes the grounding voltage VSS for a predetermined period near and including a time point where the first and the second clock signals $\phi 1$, $\phi 2$ assume their voltage change, while assuming the supply voltage VDD for the rest of the time. Further as shown in FIG. 2, the fourth input terminal Ti4 is supplied with the fourth clock signal $\phi 4$ provided by a pulse signal which has a voltage alternating oppositely to the third clock signal $\phi 3$.

Of these first through fourth clock signals $\phi 1$ through $\phi 4$, the fourth clock signal $\phi 4$ controls ON/OFF operation of the control-boosting switching elements provided by the N-ch transistors Q5, Q6. The first clock signal $\phi 1$ controls ON/OFF operation of the N-ch transistors Q4, Q8 via the capacitor C1. The second clock signal $\phi 2$ controls ON/OFF operation of the N-ch transistors Q3, Q7, via the capacitor C2. Thus, the control-boosting capacitors C3, C4 undergo a cycle of charging and discharging, and based on the charged voltages in the capacitors C3, C4, the third clock signal controls ON/OFF operation of the output-side switching elements which are provided by the N-ch transistors Q1, Q2. As described, in the booster section 11a, the input-side switching element provided by the N-ch transistor Q3 and the output-side switching element provided by the N-ch transistor Q1 make ON and OFF operations oppositely to each other and in the meantime, the first clock signal $\phi 1$ is supplied to the second terminal of the main boosting the capacitor C1. As a result, the supply voltage VDD is boosted and a boosted voltage 2VDD is outputted as a boosted supply voltage Vout from the output terminal To. Also, the input-side switching element provided by the N-ch transistor Q4 and the output-side switching element provided by the N-ch transistor Q2 make ON and OFF operations oppositely to each other and in the meantime, the second clock signal $\phi 2$ is supplied to the second terminal of the main boosting capacitor C2, thus making another cycle of boosting operation. These two boosting operation cycles are performed in a complimentary manner. Specifically, during the period when the first capacitor C1 is charged with the supply voltage VDD, a voltage at the first terminal of the second capacitor C2 is boosted by the second clock $\phi 2$, and a resulting boosted voltage 2VDD is outputted as the boosted supply voltage Vout; on the other hand, during the period when the second capacitor C2 is being charged with the supply voltage VDD, a voltage at the first terminal of the first capacitor C1 is boosted by the first clock $\phi 1$, and the resulting boosted voltage 2VDD is outputted as the boosted supply voltage Vout.

<2. Operation Details>

Next, reference will be made to FIG. 3 through FIG. 18 to describe an operation of the power supply circuit 11 according to the present embodiment. In FIG. 3 through FIG. 18, each of the N-ch transistors Q1 through Q10 marked with a cross drawn in broken lines indicates that the transistor is in OFF state. Those transistors which are not marked with a cross symbol are in ON state unless otherwise stated. Also, a number such as "0" and "5", or a mathematical expression such as "5-Vth" at each point of connection indicates a voltage at the connecting point. Here, each connection point represents a node in a graph which only reflects a relation of connection in the circuit. Hereinafter, these connection points in the circuit will be called "nodes". Also, the source terminals and drain terminals of the N-ch transistors Q1 through Q10 will be called "conduction terminals" without distinguishing them from each other. Further, note that the description will be made on a premise that the supply voltage VDD is 5[V] and the grounding voltage VSS is 0[V]. Hereinafter, voltages expressed in numbers or in mathematical expressions will appear in the unit of volt but may appear without the unit symbol "[V]" where unnecessary. Further, in the following description, a symbol "Vth" (Vth>0) will be used to indicate threshold voltages of the N-ch transistors which serve as the switching elements in the circuits covered by the description. Assume further, that the capacitor C2 has a sufficiently greater capacitance than the capacitor C4 (C2>>C4), and the capacitor C1 has a sufficiently greater capacitance than the capacitor C3 (C1>>C3) (details will be described later). Symbols "C1" through "C4" also indicate capacitance values of the respective capacitors C1 through C4 (and the same applies hereafter).

First, consideration will be made for a state of the power supply circuit 11 before there is a supply of power (hereinafter called "the first operation state"). The first operation state is the state of operation of the power supply circuit 11 in Time Period T1 indicated in FIG. 3(A), which shows signal waveforms (of the first through the fourth clock signals φ1 through φ4). FIG. 3(B) shows the first state of operation of the power supply circuit 11. Under this state, VDD=VSS=0. The external circuit for generation of the first through the fourth clock signals φ1 through φ4 (hereinafter called "drive clock generation circuit") is not in operation, and all the nodes have a potential of 0[V]. Assume also that none of the capacitors C1 through C6 have a charge. In other words, the present state can be expressed as follows by using the signal symbols such as "φ1" as also indicating their voltages (voltages based on the grounding point as a baseline) at the nodes where the signals are given:

φ1=φ2=φ3=φ4=0, Vout=0

In this initial state, all the transistors Q1 through Q10 are in OFF state.

FIG. 4(B) shows a state of operation of the power supply circuit 11 (hereinafter called "the second operation state") right after power application is made to the power supply circuit 11, which was in the above-described first operation state, and the external drive clock generation circuit has started its operation. In other words, FIG. 4(B) shows a state of operation of the power supply circuit 11 during Time Period T2 indicated in a signal waveform chart in FIG. 4(A). In the second operation state, a voltage of the fourth clock signal φ4, i.e. VDD=5[V], is supplied to the conduction terminal of the transistor Q10 and the gate terminal of the transistor Q9 via the capacitor C6 whereas a voltage of the third clock signal φ3, i.e. VSS=0[V], is supplied to the conduction terminal of the transistor Q9 and the gate terminal of the transistor Q10 via the capacitor C5. Thus, the transistor Q9 assumes ON state, the transistor Q10 assumes OFF state and thus, Vout=0. The transistors Q5, Q6 have their gate terminals supplied with the VDD=5[V] via the capacitor C6 and therefore assume ON state, but the other transistors Q1 through Q4, Q7 and Q8 stay in OFF state.

FIG. 5(B) shows a state of operation of the power supply circuit 11 (hereinafter called "the third operation state") in Time Period T3 indicated in a signal waveform chart in FIG. 5(A). Upon the shift from the second operation state to the third operation state, the voltage of the second clock signal φ2 rises from VSS=0[V] to VDD=5[V], so the node N2 has a voltage of VDD=5[V], the transistors Q3 and Q7 have their gate terminals supplied with 5[V] and assume ON state, and nodes N3 and N4 now have a voltage of 5-Vth [V]. Also, since the transistor Q6 has its gate terminal supplied with 5[V] and is in ON state, the node N1 has a voltage of 5-Vth[V]. In the third operation state as described above, the voltage Vout at the output terminal To stays at VSS=0[V] since the transistors Q1, Q2 stay in OFF state and the transistor Q9 stays in ON state.

FIG. 6(B) shows a state of operation of the power supply circuit 11 (hereinafter called "the fourth operation state") in Time Period T4 indicated in a signal waveform chart in FIG. 6(A). Upon the shift from the third operation state to the fourth operation state, the voltage of the third clock signal φ3 rises from VSS=0[V] to VDD=5[V], so the nodes N1, N3 have a voltage change from 5-Vth [V] to 10-Vth [V] whereas the node N6 has a voltage change from VSS=0[V] to VDD=5 [V]. The transistor Q7, which now has its gate terminal voltage lower than the conduction terminal voltage, is turned OFF. Also upon the shift from the third operation state to the fourth operation state, the voltage of the fourth clock signal φ4 falls from VDD=5[V] to VSS=0[V], so the node N5 has a voltage change from VDD=5[V] to VSS=0[V], bringing the transistors Q5, Q6, Q9 into OFF state. Meanwhile, the transistors Q1, Q2 have their gate terminals supplied with 10-Vth [V], and assume ON state. As a result, the voltage Vout at the output terminal To becomes equal to an average of a voltage at the node N2 and a voltage at the node N4, i.e. 5-Vth/2[V]. On the other hand, the transistor Q10 has its gate terminal supplied with the 5[V] voltage of the node N6, and assumes ON state, causing the voltage at the node N5 to rise from 0[V] to near 5-Vth/2[V]. Influenced by this, the transistor Q9, which was in OFF state, is now brought to a state which is somewhat similar to ON state, and the transistor Q10 has its gate terminal voltage fall slightly from 5[V] to 5-α[V]. The transistors Q5, Q6 stay in OFF state.

FIG. 7(B) shows a state of operation of the power supply circuit 11 (hereinafter called "the fifth operation state") in Time Period T5 indicated in a signal waveform chart in FIG. 7(A). Upon the shift from the fourth operation state to the fifth operation state, the voltage of the fourth clock signal φ4 rises from VSS=0[V] to VDD=5[V], so the node N5 has a voltage change from 5-Vth/2[V] to 10-Vth/2[V], to turn ON the transistors Q5, Q6. Also upon the shift from the fourth operation state to the fifth operation state, the voltage of the third clock signal φ3 falls from VDD=5[V] to VSS=0[V], so the voltage at the nodes N1, N3 falls by 5[V] to 5-Vth/2[V] and this turns OFF the transistors Q1, Q2. The node N6 also has a voltage fall by 5[V] to -α[V] tentatively and this turns OFF the transistor Q10. On the other hand, since the node N5 now has a voltage of 10-Vth/2[V] as described above, the transistors Q5, Q6, Q9 assume ON state, and for this reason the node N6 has a voltage rise from -α[V] to 5-Vth/2[V]. Also, since the transistor Q6 is turned ON as described above, the node N1 is electrically connected with the node N2, so the node N1 has a voltage of 5[V] (C2>>C4). It should be noted here that as the transistor Q5 assumes ON state, the node N3 is electrically connected with the node N4 via the transistor Q5, but neither of the nodes N3, N4 have a voltage change.

FIG. 8(B) shows a state of operation of the power supply circuit 11 (hereinafter called "the sixth operation state") in Time Period T6 indicated in a signal waveform chart in FIG. 8(A). Upon the shift from Time Period T5 to Time Period T6, the voltage of the second clock signal φ2 falls from VDD=5 [V] to VSS=0[V], so the node N2 has a voltage change from 5[V] to 0[V]. However, in the shift from the fifth operation state to the sixth operation state, the voltage of the first clock signal φ1 rises from VSS=0[V] to VDD=5[V], so the node N4 has a voltage change from 5-Vth [V] to 10-Vth [V], to turn ON both of the transistors Q4, Q8. Thus, the supply voltage VDD=5[V] at the power supply terminal Tdd is supplied to the nodes N1, N2. Since the node N5 has a voltage of 10-Vth/2[V], the transistor Q6 assumes ON state, to electrically connect the node N1 with the node N2. Also, the transistor Q5 assumes ON state, to electrically connect the node N3 with node N4, so the node N3 has a voltage change from 5-Vth[V] to 10-Vth[V] (C1>>C3). This turns ON the transistor Q1, but the transistor Q1 has a voltage drop by threshold value and as a result, the voltage Vout at the output terminal To becomes lower than 10-Vth [V] of the node N4 by the threshold voltage, i.e. becomes 10-2Vth [V]. The transistor Q9 has its conduction terminal supplied with a voltage from the output terminal To, i.e. Vout=10-2Vth [V], has its gate terminal supplied with 10-Vth/2[V], and thus assumes ON state. As a result, the voltage of the node N6 becomes equal to Vout=10-2Vth [V] of the output terminal To. Since this voltage at the node N6 is supplied to the gate terminal of the transistor Q10, the transistor Q10, which was in OFF state, now attains a near-ON state. As a result, the node N5 has a slight voltage fall from 10-Vth/2[V] to voltage 10-Vth/2-α[V], and this voltage at the node N5 is supplied to the gate terminal of the transistor Q9. Through the above process, the transistors Q9 and Q10 work in a relationship in which they influence each other in regards to the voltage.

FIG. 9(B) shows a state of operation of the power supply circuit 11 (hereinafter called "the seventh operation state") in Time Period T7 indicated in a signal waveform chart in FIG. 9(A). Upon the shift from Time Period T6 to Time Period T7, the voltage of the third clock signal φ3 rises from VSS=0[V] to VDD=5[V], so node N1 has a voltage change from 5[V] to 10[V], the node N3 has a voltage change from 10-Vth [V] to 15-Vth[V], and the node N6 has a voltage change from 10-2Vth[V] to 15-2Vth[V]. Also upon the shift from Time Period T6 to Time Period T7, the voltage of the fourth clock signal φ4 falls from VDD=5[V] to VSS=0[V], so the node N5 has a voltage change from 10-Vth/2 (-α) [V] to 5-Vth/2 (-α) [V]. However, since the node N4 has a voltage of 10-Vth [V], the transistor Q8 is in ON state, and the voltage of the node N1 returns to VDD=5[V]. Also, the transistor Q1 has its gate terminal supplied with a voltage of the node N3, i.e. 15-Vth [V], so the transistor Q1 does not have a voltage drop by threshold value, and thus the voltage Vout at the output terminal To is 2VDD−Vth=10-Vth [V] (the voltage of the node N4). Further, the transistor Q10, which is connected with the output terminal To, has it gate terminal supplied with the voltage of the node N6, i.e. 15-Vth[V], to assume ON state. As a result, the voltage at the node N5 becomes 10-Vth [V] (the voltage Vout of the output terminal To). This turns ON the transistor Q6, so the nodes N1 and N2 are electrically connected with each other. The transistors Q5, Q9 have their gate terminals supplied with the voltage of node N5 (10-Vth[V]); however, this voltage at the node N5 is not higher than the conduction terminal voltage of the transistors Q5, Q9, so the transistors Q5, Q9 assume OFF state.

FIG. 10(B) shows a state of operation of the power supply circuit 11 (hereinafter called "the eighth operation state") in Time Period T8 indicated in a signal waveform chart in FIG. 10(A). Upon the shift from Time Period T7 to Time Period T8, the voltage of the third clock signal φ3 falls from VDD=5[V] to VSS=0[V], so the node N1 has a voltage change from 5[V] to 0[V], the node N3 has a voltage change from 15-Vth [V] to 10-Vth[V], and the node N6 has a voltage change from 15-2Vth [V] to 10-2Vth [V]. Also upon the shift from Time Period T7 to Time Period T8, the voltage of the fourth clock signal φ4 rises from VSS=0[V] to VDD=5[V], so node N5 has a voltage change from 10-Vth [V] to 15-Vth [V]. However, since the node N4 has a voltage of 10-Vth[V], the transistor Q8 is in ON state and the voltage at the node N1 returns to VDD=5[V]. Also, the transistor Q9, which is connected with the output terminal To, has its gate terminal supplied with the voltage of node N5, i.e. 15-Vth [V], to assume ON state. Thus, the voltage at the node N6 becomes 10-Vth [V] (the voltage Vout of the output terminal To). Also, the transistor Q5 has its gate terminal supplied with the voltage of node N5, i.e. 15-Vth[V], to assume ON state. As a result, the nodes N3 and N4 are electrically connected with each other. The voltage Vout at the output terminal To stays at 2VDD−Vth=10-Vth [V].

FIG. 11(B) shows a state of operation of the power supply circuit 11 (hereinafter called "the ninth operation state") in Time Period T9 indicated in a signal waveform chart in FIG. 11(A). Upon the shift from Time Period T8 to Time Period T9, the voltage of the second clock signal φ2 rises from VSS=0 [V] to VDD=5[V], so the node N2 has a voltage change from 5[V] to 10[V]. Also upon the shift from Time Period T8 to Time Period T9, the voltage of the first clock signal φ1 falls from VDD=5[V] to VSS=0[V], so the node N4 has a voltage change from 10-Vth[V] to 5-Vth[V]. However, since the node N2 now has a voltage of 10[V], the transistors Q3, Q7 assume ON state and the voltage VDD=5[V] at the power supply terminal Tdd is supplied to the nodes N3, N4. Since the node N4 now has a voltage of 5[V], the transistors Q4, Q8 have their gate terminal voltage lower than their conduction terminal voltage, and thus the transistors Q4, Q8 assume OFF state. The transistor Q6 has its gate terminal supplied with 15-Vth [V] and stays in ON state, so thereafter, the voltage of the node N1 rises from 5[V] to 10[V] (the voltage of node N2).

FIG. 12(B) shows a state of operation of the power supply circuit 11 (hereinafter called "the tenth operation state") in Time Period T10 indicated in a signal waveform chart in FIG. 12(A). Upon the shift from Time Period T9 to Time Period T10, the voltage of the third clock signal φ3 rises from VSS=0 [V] to VDD=5[V], so node N1 has a voltage change from 10[V] to 15[V], the node N3 has a voltage change from 5[V] to 10[V], and the node N6 has a voltage change from 10-Vth [V] to 15-Vth[V]. Also upon the shift from Time Period T9 to Time Period T10, the voltage of the fourth clock signal φ4 falls from VDD=5[V] to VSS=0[V], so the node N5 has a voltage change from 15-Vth[V] to 10-Vth[V]. However, since the node N2 has a voltage of 10[V], the transistor Q7 is in ON state and the voltage at the node N3 returns to VDD=5 [V]. Also, since the transistor Q5 has its gate terminal supplied with 10[V] and stays in ON state, the nodes N3 and N4 are electrically connected with each other. Further, the transistor Q2 has its gate terminal supplied with the voltage of node N1, i.e. 15[V], and assumes ON state. Because of this process, the transistor Q2 does not have a voltage drop by threshold value and thus, the voltage at the node N2, i.e. 2VDD=10[V] is outputted from the output terminal To as the boosted supply voltage Vout. Further, the transistor Q10, which is connected with the output terminal To, has its gate terminal supplied with the voltage of node N6, i.e. 15-Vth[V], to assume ON state, and thus the node N5 now has a voltage of 10[V] (the voltage Vout at the output terminal To). This 10[V] voltage at the node N5 is also supplied to the gate terminals of the transistors Q6, Q9, but the voltage is not higher than their conduction terminal voltage, so the transistors Q6, Q9 assume OFF state.

FIG. 13(B) shows a state of operation of the power supply circuit 11 (hereinafter called "the eleventh operation state") in Time Period T11 indicated in a signal waveform chart in FIG. 13(A). Upon the shift from Time Period T10 to Time Period T11, the voltage of the third clock signal φ3 falls from VDD=5[V] to VSS=0[V], so the node N1 has a voltage change from 15[V] to 10[V], the node N3 has a voltage change from 5[V] to 0[V], and the node N6 has a voltage change from 15-Vth[V] to 10-Vth[V]. Also upon the shift from Time Period T10 to Time Period T11, the voltage of the fourth clock signal φ4 rises from VSS=0[V] to VDD=5[V], so the node N5 has a voltage change from 10[V] to 15[V]. However, since the node N2 has a voltage of 10[V], the transistor Q7 is in ON state and the voltage at the node N3 returns to VDD=5[V]. Also, since the transistor Q5 has its gate terminal supplied with 15[V] and stays in ON state, the nodes N3 and N4 are electrically connected with each other. Likewise, the transistor Q6 has its gate terminal supplied with 15[V] and assumes ON state, bringing the node N1 and N2 electrically connected with each other, too. Further, the transistor Q9, which is connected with the output terminal To, has its gate terminal supplied with 15[V] and assumes ON state, so the voltage at the node N6 becomes 10[V] (the voltage Vout of the output terminal To). The transistor Q10 has its gate terminal supplied with the voltage of node N6 (10[V]), to assume OFF state. Further, the transistor Q2 has its gate terminal supplied with 10[V], to assume OFF state. The voltage Vout at the output terminal To stays at 2VDD=10[V].

FIG. 14(B) shows a state of operation of the power supply circuit 11 (hereinafter called "the twelfth operation state") in Time Period T12 indicated in a signal waveform chart in FIG. 12(A). Upon the shift from Time Period T11 to Time Period T12, the voltage of the first clock signal φ1 rises from VSS=0[V] to VDD=5[V], so the node N4 has a voltage change from 5[V] to 10[V]. This turns ON the transistors Q4, Q8, to give the supply voltage VDD=5[V] of the power supply terminal Tdd to the nodes N1, N2. Also upon the shift from Time Period Ti1 to Time Period T12, the voltage of the second clock signal φ2 falls from VDD=5[V] to VSS=0[V], so the node N2 has a voltage change from 10[V] to 5[V], bringing the transistors Q3, Q7 into OFF state. Also, the transistor Q5 has its gate terminal supplied with 15[V], and is in ON state, so the nodes N3 and N4 are electrically connected with each other. Therefore, the voltage at the node N3 changes from voltage 5[V] to 10[V]. The transistors Q1, Q2 are in OFF state, and the voltage Vout at the output terminal To stays at 2VDD=10[V].

FIG. 15(B) shows a state of operation of the power supply circuit 11 (hereinafter called "the thirteenth operation state") in Time Period T13 indicated in a signal waveform chart in FIG. 15(A). Upon the shift from Time Period T12 to Time Period T13, the voltage of the third clock signal φ3 rises from VSS=0[V] to VDD=5[V], so node N1 has a voltage change from 5[V] to 10[V], the node N3 has a voltage change from 10[V] to 15[V], and the node N6 has a voltage change from 10[V] to 15[V]. Also upon the shift from Time Period T12 to Time Period T13, the voltage of the fourth clock signal φ4 falls from VDD=5[V] to VSS=0[V], so the node N5 has a voltage change from 15[V] to 10[V]. However, since the node N4 has a voltage of 10[V], the transistor Q8 is in ON state and the voltage at the node N1 returns to VDD=5[V]. Also, since the transistor Q6 has its gate terminal supplied with 10[V] and thus stays in ON state, the node N1 and N2 are electrically connected with each other. Further, the transistor Q1 has its gate terminal supplied with the voltage of node N3, i.e. 15[V], and assumes ON state. Hence, the transistor Q1 does not have a voltage drop by threshold value, and therefore a voltage at the node N4 is outputted as a boosted supply voltage Vout from the output terminal To. Further, the transistor Q10, which is connected with the output terminal To, has its gate terminal supplied with the voltage of node N6, i.e. 15[V], to assume ON state, and thus the voltage at the node N5 becomes 10[V] (the voltage Vout at the output terminal To). This 10[V] voltage of node N5 is also supplied to the gate terminals of the transistors Q5, Q9, but the voltage is not higher than their conduction terminal voltage, so the transistors Q5, Q9 assume OFF state.

FIG. 16(B) shows a state of operation of the power supply circuit 11 (hereinafter called "the fourteenth operation state") in Time Period T14 indicated in a signal waveform chart in FIG. 16(A). Upon the shift from Time Period T13 to Time Period T14, the voltage of the third clock signal φ3 falls from VDD=5[V] to VSS=0[V], so the node N1 has a voltage change from 5[V] to 0[V], the node N3 has a voltage change from 15[V] to 10[V], and the node N6 has a voltage change from 15[V] to 10[V]. Also upon the shift from Time Period T13 to Time Period T14, the voltage of the fourth clock signal φ4 rises from VSS=0[V] to VDD=5[V], so the node N5 has a voltage change from 10[V] to 15[V]. However, since the node N4 has 10[V], the transistor Q8 is in ON state and the voltage at the node N1 returns to VDD=5[V]. Also, since the transistor Q5 has its gate terminal supplied with 15[V] and assumes ON state, the node N3 and N4 are electrically connected with each other. Likewise, transistor Q6 has its gate terminal supplied with 15[V] and is in ON state, so the node N1 and N2 are electrically connected with each other. Also, the transistor Q9, which is connected with the output terminal To, has its gate terminal supplied with 15[V] and assumes ON state. As a result, the node N6 now has a voltage of 10[V] (the voltage Vout at the output terminal To). The transistor Q10 has its gate terminal supplied with the voltage of node N6 (10[V]) and assumes OFF state. Further, the transistor Q1 has its gate terminal supplied with 10[V] and assumes OFF state. The voltage at the output terminal To stays at 2VDD=10[V].

FIG. 17(B) shows a state of operation of the power supply circuit 11 (hereinafter called "the fifteenth operation state") in Time Period T15 indicated in a signal waveform chart in FIG. 17(A). Upon the shift from Time Period T14 to Time Period T15, the voltage of the first clock signal φ1 falls from VDD=5[V] to VSS=0[V], so the node N4 has a voltage change from 10[V] to 5[V]. This turns OFF the transistors Q4, Q8. Also upon the shift from Time Period T14 to Time Period T15, the voltage of the second clock signal φ2 rises from VSS=0[V] to VDD=5[V], so the node N2 has a voltage change from 5[V] to 10[V]. This turns ON the transistor Q3, Q7, to give Tdd VDD=5[V] of the power supply terminal to the nodes N3, N4. Also, since the transistor Q6 has its gate terminal supplied with 15[V] and is in ON state, the nodes N1 and N2 are electrically connected with each other. Thus, the voltage at the node N1 changes from 5[V] to 10[V] (C2>>C4). Both of the transistors Q1, Q2 are in OFF state, and the voltage Vout at the output terminal To stays at 2VDD=10[V].

FIG. 18(B) shows a state of operation of the power supply circuit 11 (hereinafter called "the sixteenth operation state") in Time Period T16 indicated in a signal waveform chart in FIG. 18(A). Upon the shift from Time Period T15 to Time Period T16, the voltage of the third clock signal φ3 rises from VSS=0[V] to VDD=5[V], so the node N1 has a voltage change from 10[V] to 15[V], the node N3 has a voltage change from 5[V] to 10[V], and the node N6 has a voltage change from 10[V] to 15[V]. Also upon the shift from Time Period T15 to Time Period T16, the voltage of the fourth clock signal φ4 falls from VDD=5[V] to VSS=0[V], so the node N5 has a voltage change from 15[V] to 10[V]. However, since the node N2 has 10[V], the transistor Q7 is in ON state and the voltage at the node N3 returns to VDD=5[V]. Also, since the transistor Q5 has its gate terminal supplied with 10[V] and stays in ON state, the node N3 and N4 are electrically connected with each other. Further, the transistor Q2 has its gate terminal supplied with the voltage of node N1, i.e. 15[V], to assume ON state. Hence, the transistor Q2 does not have a voltage drop by threshold value, and therefore the voltage of node N2, i.e. 2VDD=10[V] is outputted as a boosted supply voltage Vout from the output terminal To. Further, the transistor Q10, which is connected with the output terminal To, has its gate terminal supplied with the voltage of node N6, i.e. 15[V] to assume ON state, and the node N5 now has 2VDD=10[V] (the voltage Vout at the output terminal To). This voltage of node N5 is also supplied to the gate terminals of the transistor Q6, Q9 but the voltage is not higher than the conduction terminal voltage in the transistors Q6, Q9, so both of the transistors Q6, Q9 assume OFF state.

Figure 20:
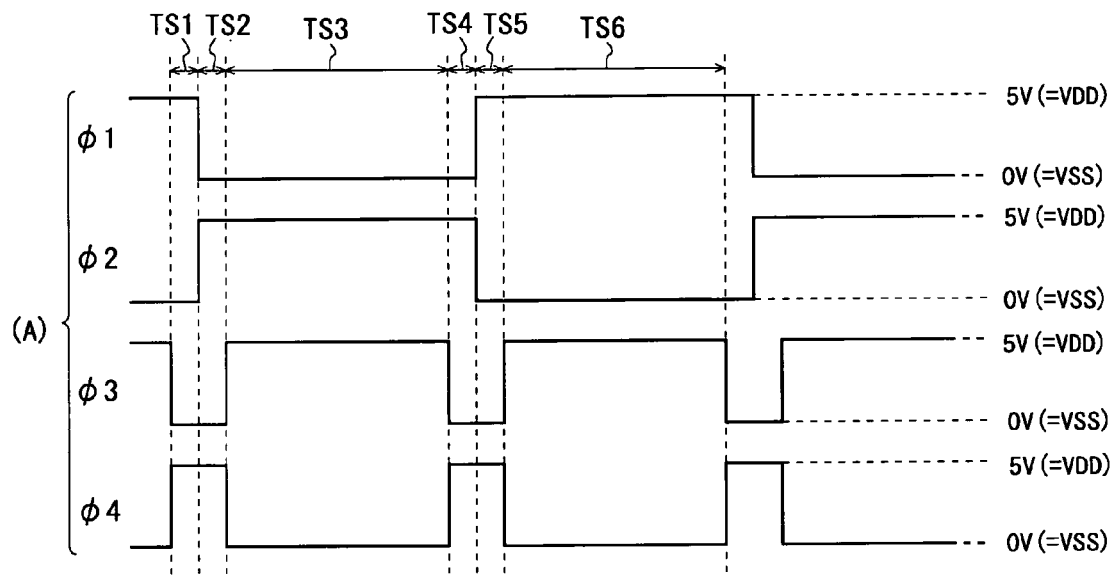
FIG. 20 consists of a chart, a diagram and a table for describing influences of a capacitance ratio on a predetermined node in the power supply circuit according to the embodiment.
Figure 20:
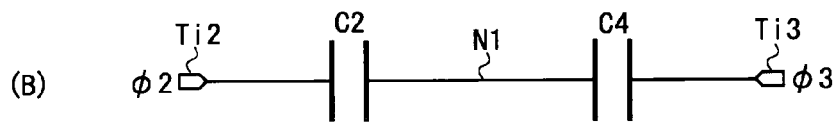

Thereafter, the power supply circuit 11 enters its steady operation in which a cycle of the eleventh through the sixteen operation states in Time Periods T11 through T16 take place repeatedly. Now, these six Time Periods which constitute one cycle in the steady operation will be renamed as a first Time Segment TS1 through a sixth Time Segment TS6 as shown in FIG. 20(A), to describe the steady operation. It should be noted here that the first Time Segment TS1 through the third Time Segment TS3 correspond to the above-described Time Periods T14 through T16 (FIG. 16(A) through FIG. 18(A)) respectively whereas the fourth Time Segment TS4 through the sixth Time Segment TS6 correspond to the above-described Time Periods T11 through T13 (FIG. 13(A) through FIG. 15(A)) respectively.

Figure 16:
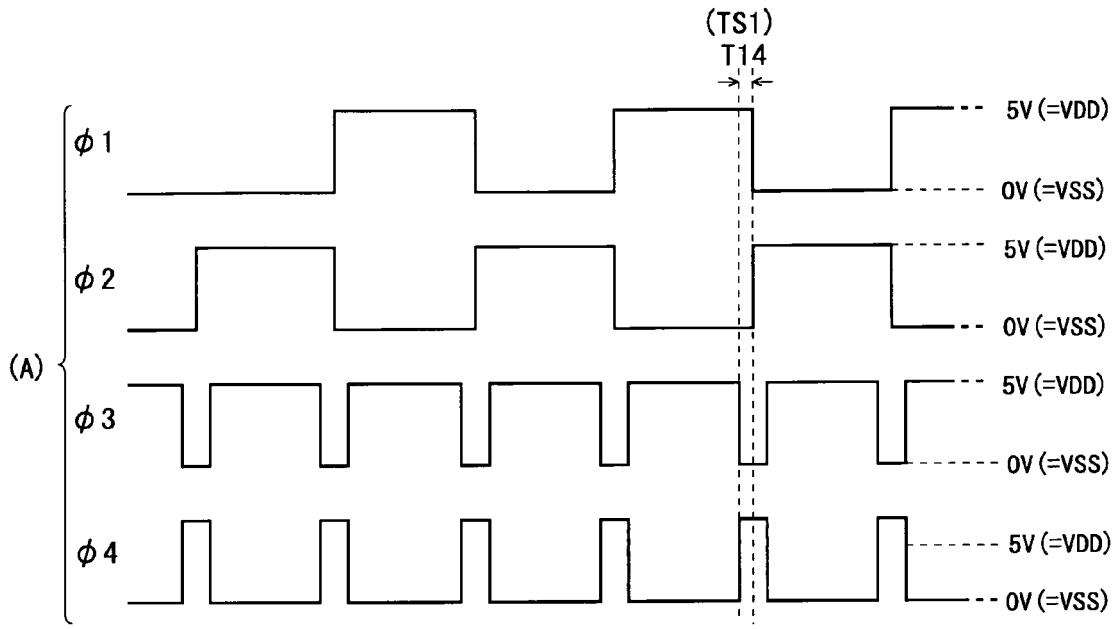
FIG. 16 consists of a chart and a diagram for describing a fourteenth operation state of the power supply circuit according to the embodiment.
Figure 16:
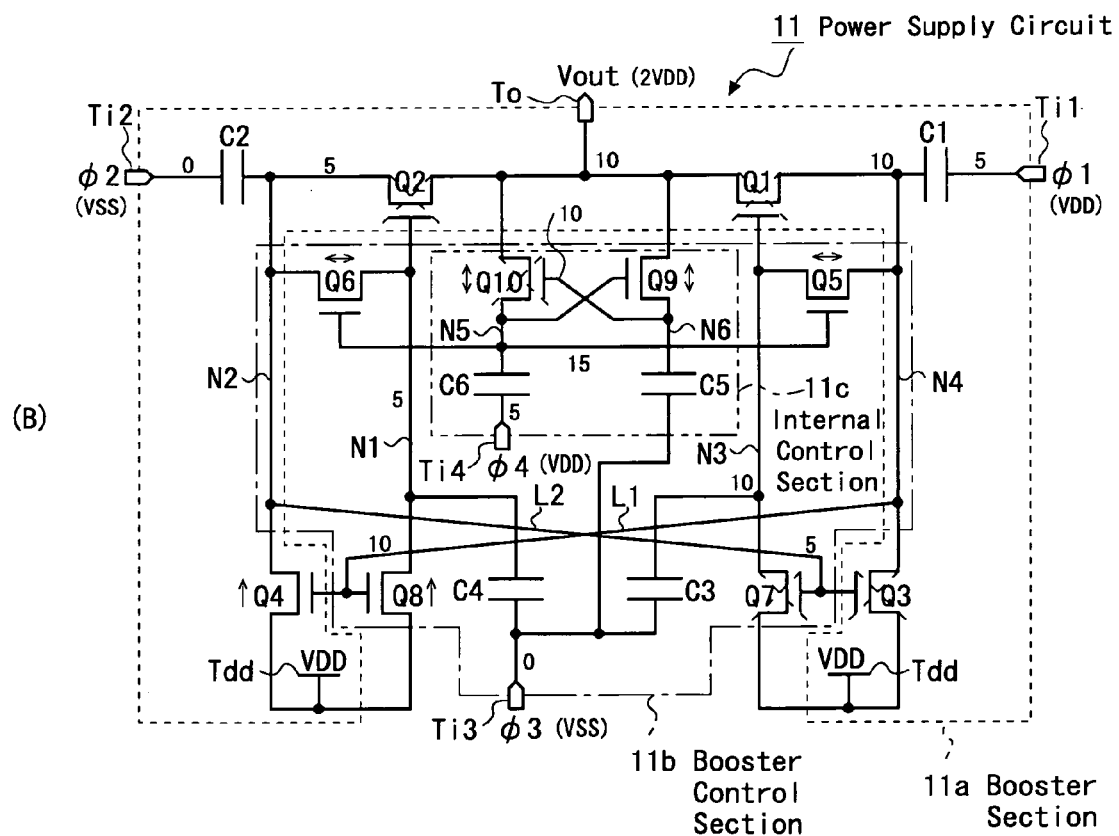

When the operation enters the first Time Segment TS1 (Time Period T14), as shown in FIG. 16, the fourth clock signal φ4, which is supplied to the second terminal (Ti4) of the sixth capacitor C6 serving as an internal control capacitor, rises from VSS=0[V] to VDD=5[V], so the node N5, which includes the first terminal of the capacitor C6, attains 3VDD=15[V]. This turns ON the N-ch transistor Q6 serving as a control-boosting switching element and therefore, the transistor Q6 does not have a voltage drop by threshold value.

Figure 17:
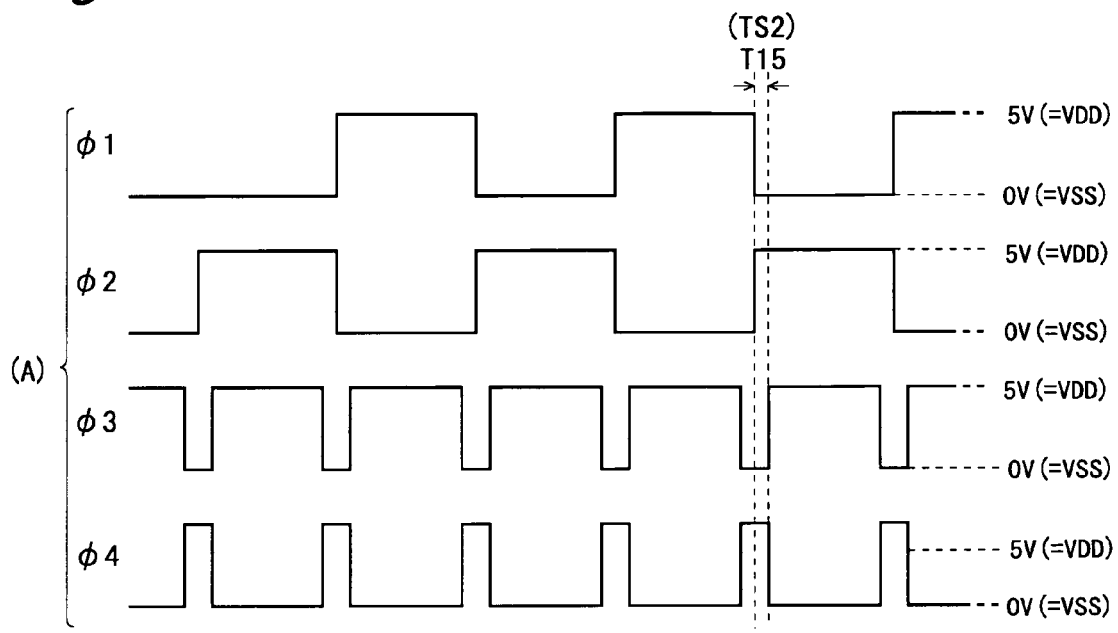
FIG. 17 consists of a chart and a diagram for describing a fifteenth operation state of the power supply circuit according to the embodiment.
Figure 17:
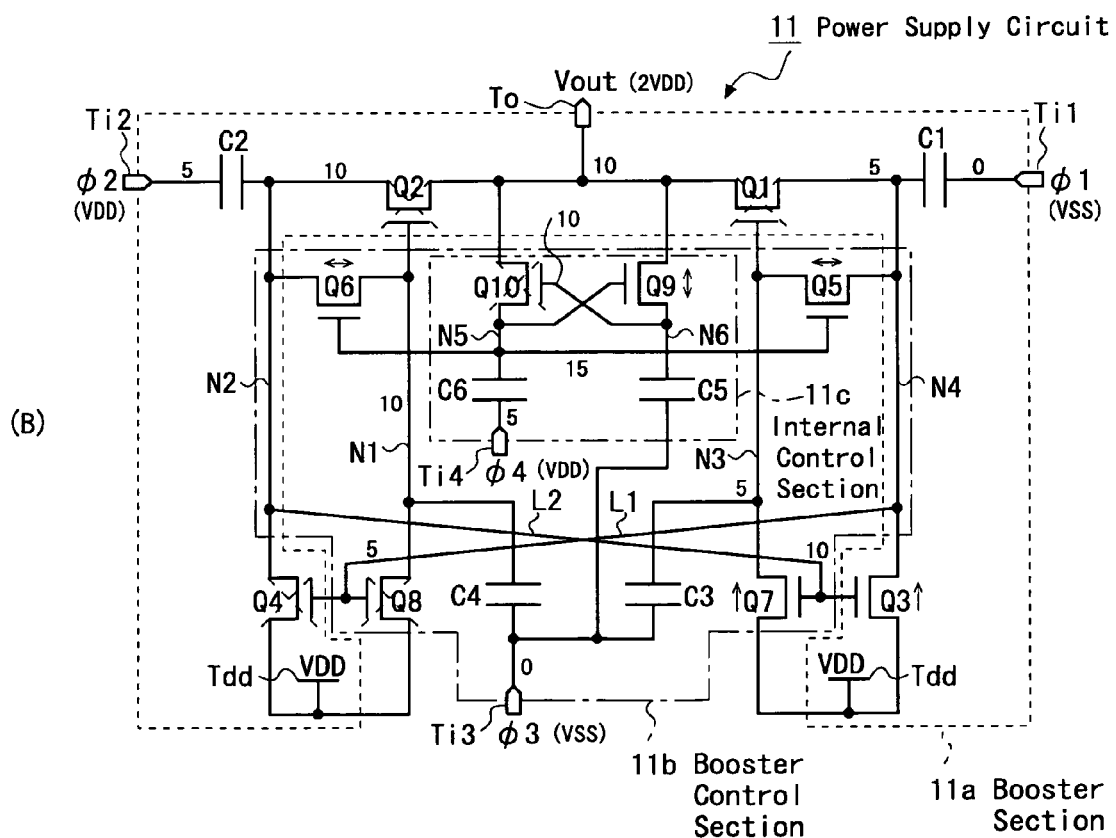

When the operation enters the second Time Segment TS2 (Time Period T15), as shown in FIG. 17, the second clock signal φ2, which is supplied to the second terminal (Ti2) of the second capacitor C2 serving as a main boosting capacitor, rises from VSS=0[V] to VDD=5[V], so the node N2, which includes the first terminal of the capacitor C2, now has a voltage boost from VDD=5[V] to 2VDD=10[V]. The boosted voltage 2VDD=10[V] charges the fourth capacitor C4 which serves as a control-boosting capacitor via the above-mentioned transistor Q6. With a capacitance ratio C2/C4 between the second capacitor C2 and the fourth capacitor C4 being sufficiently large, the voltage at the node N1, which includes the first terminal of the fourth capacitor C4, can be regarded as 2VDD=10[V].

Figure 18:
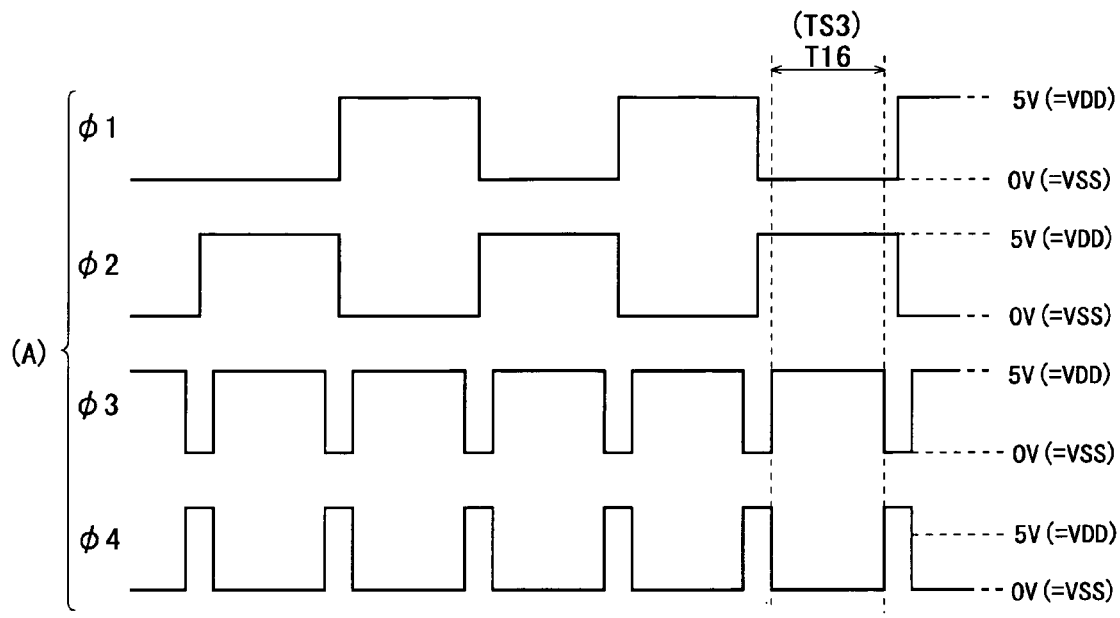
FIG. 18 consists of a chart and a diagram for describing a sixteenth operation state of the power supply circuit according to the embodiment.
Figure 18:
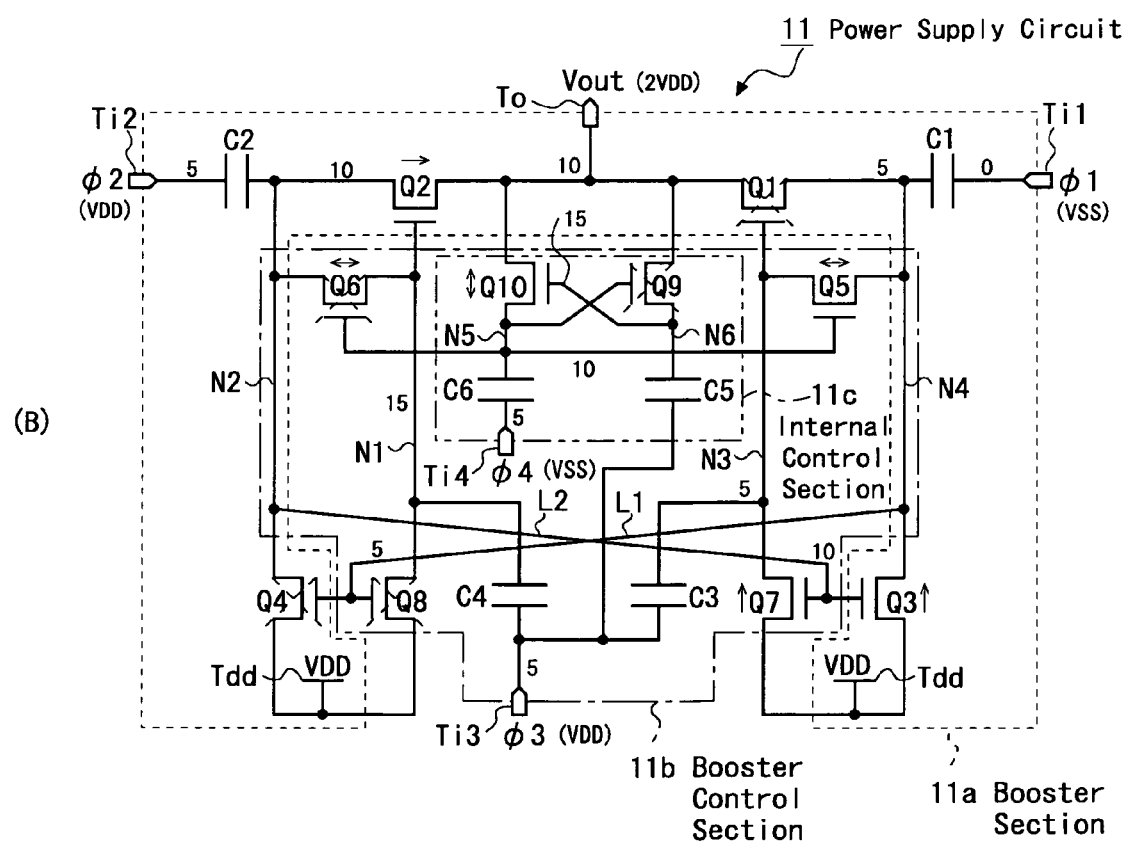

When the operation enters the third Time Segment TS3 (Time Period T16), as shown in FIG. 18, the third clock signal φ3, which is supplied to the second terminal (Ti3) of the fourth capacitor C4, rises from VSS=0[V] to VDD=5[V], so the node N1, which includes the first terminal of this capacitor C4 has a voltage change from 2VDD=10[V] to 3VDD=15 [V], and this 3VDD=15[V] is supplied to the gate terminal of the N-ch transistor Q2 which serves as the main boosting switching element, causing the transistor Q2 to assume ON state. As a result, the above-mentioned boosted voltage 2VDD=10[V] obtained at the first terminal (N4) of the capacitor C2 is outputted as a boosted supply voltage Vout from the output terminal To via the transistor Q2 without voltage drop by threshold value.

Figure 13:
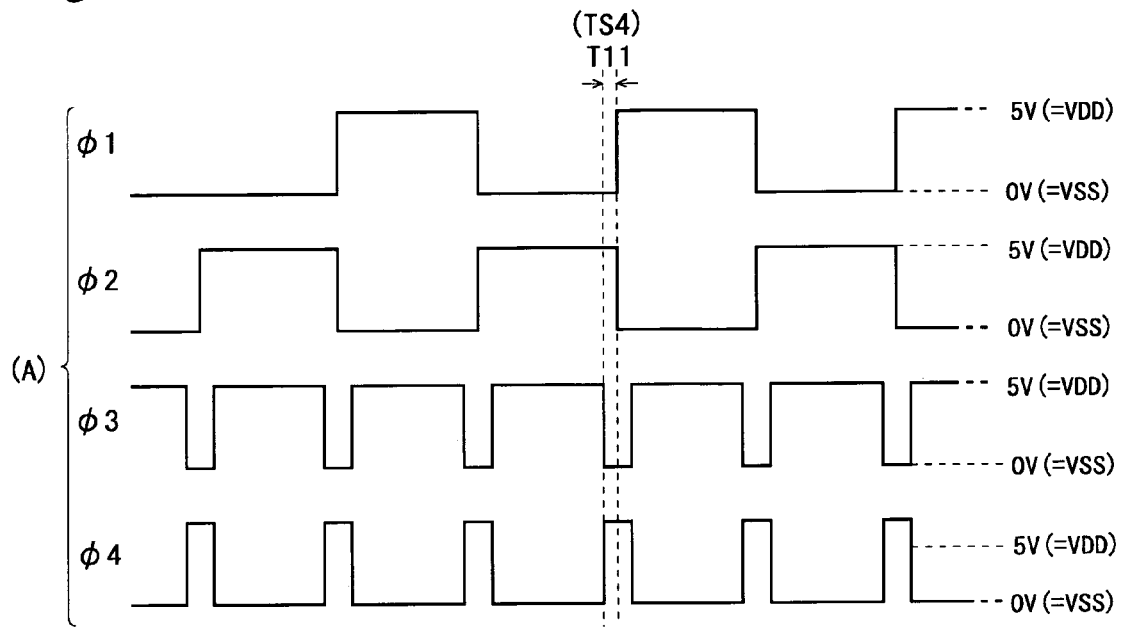
FIG. 13 consists of a chart and a diagram for describing an eleventh operation state of the power supply circuit according to the embodiment.
Figure 13:
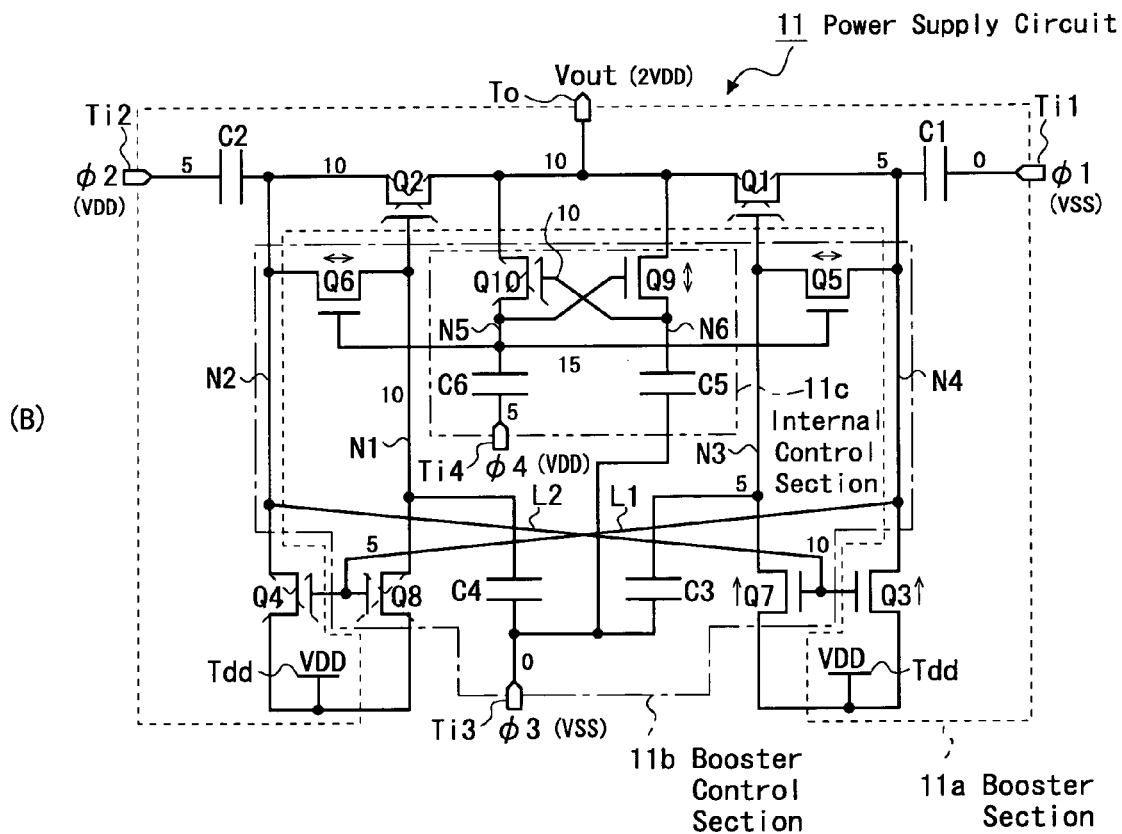

When the operation enters the fourth Time Segment TS4 (Time Period T11), as shown in FIG. 13, the fourth clock signal φ4, which is supplied to the second terminal (Ti4) of the sixth capacitor C6 serving as an internal control capacitor, rises from VSS=0[V] to VDD=5[V], so the node N5, which includes the first terminal of the capacitor C6, attains 3VDD=15[V]. This turns ON the N-ch transistor Q5 serving as a control-boosting switching element and therefore, the transistor Q5 does not have a voltage drop by threshold value.

Figure 14:
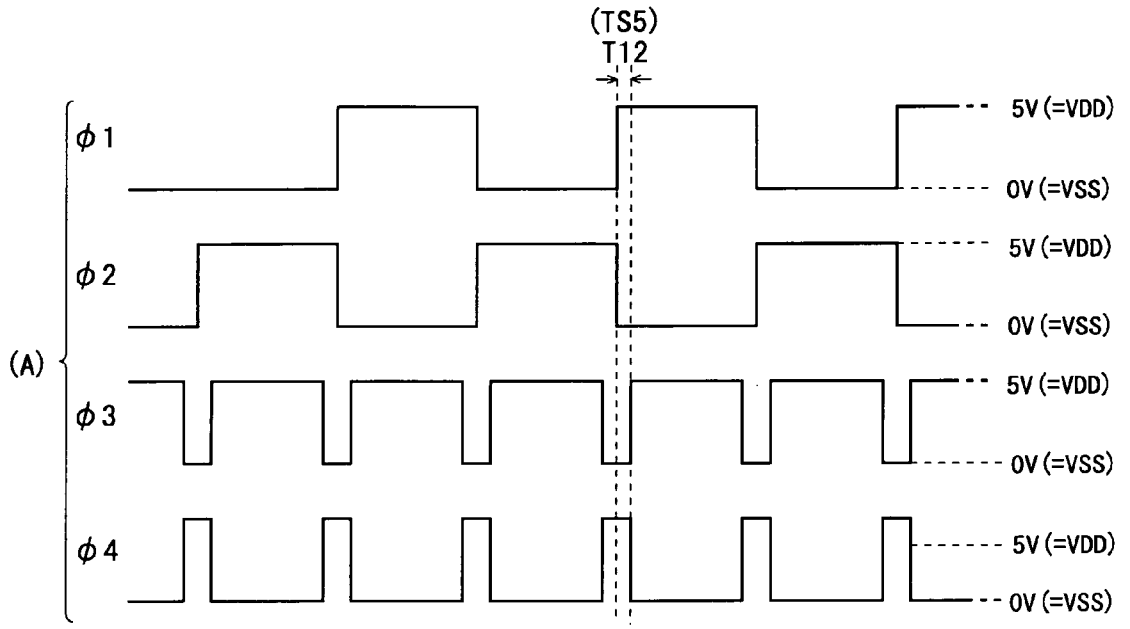
FIG. 14 consists of a chart and a diagram for describing a twelfth operation state of the power supply circuit according to the embodiment.
Figure 14:
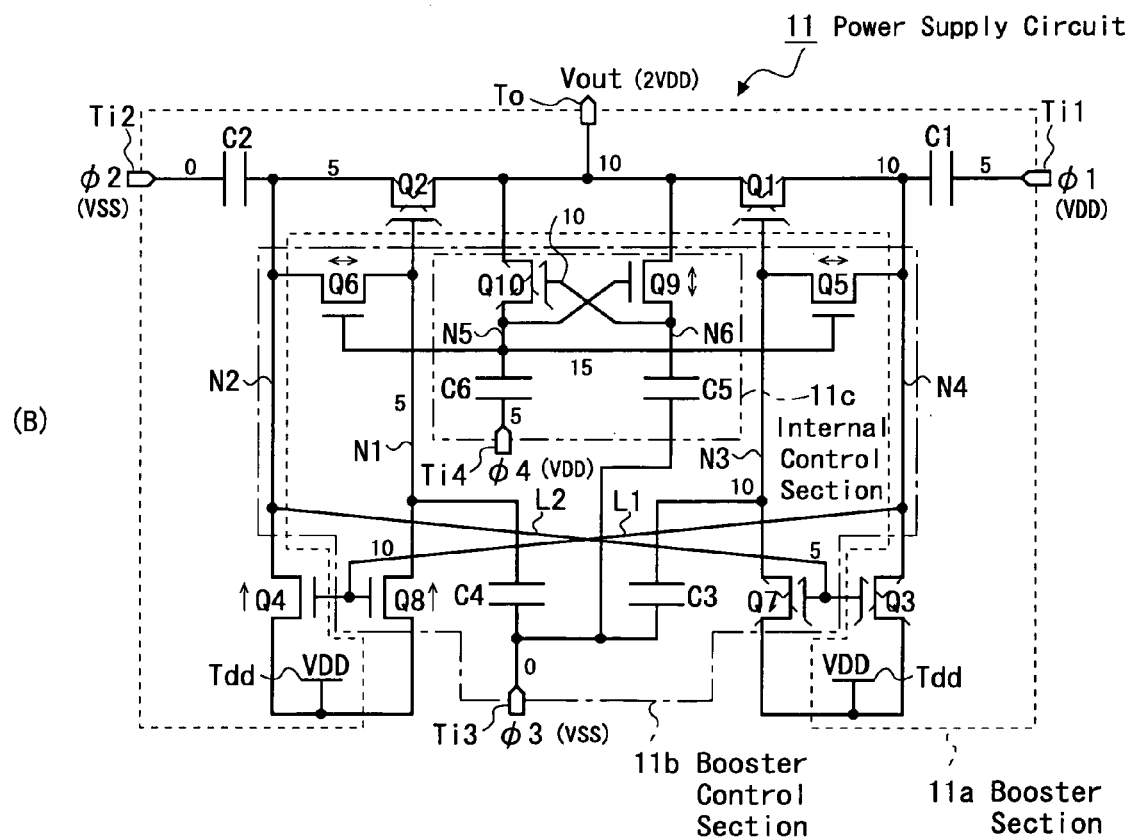

When the operation enters the fifth Time Segment TS2 (Time Period T12), as shown in FIG. 14, the first clock signal φ1, which is supplied to the second terminal (Ti1) of the first capacitor C1 serving as a main boosting capacitor, rises from VSS=0[V] to VDD=5[V], so the node N4, which includes the first terminal of the capacitor C1, now has a voltage boost from VDD=5[V] to 2VDD=10[V]. The boosted voltage 2VDD=10[V] charges the third capacitor C3 which serves as a control-boosting capacitor, via the above-mentioned transistor Q5. With a capacitance ratio C1/C3 between the first capacitor C1 and the third capacitor C3 being sufficiently large, the voltage at the node N3, which includes the first terminal of the fourth capacitor C3, can be regarded as 2VDD=10[V].

Figure 15:
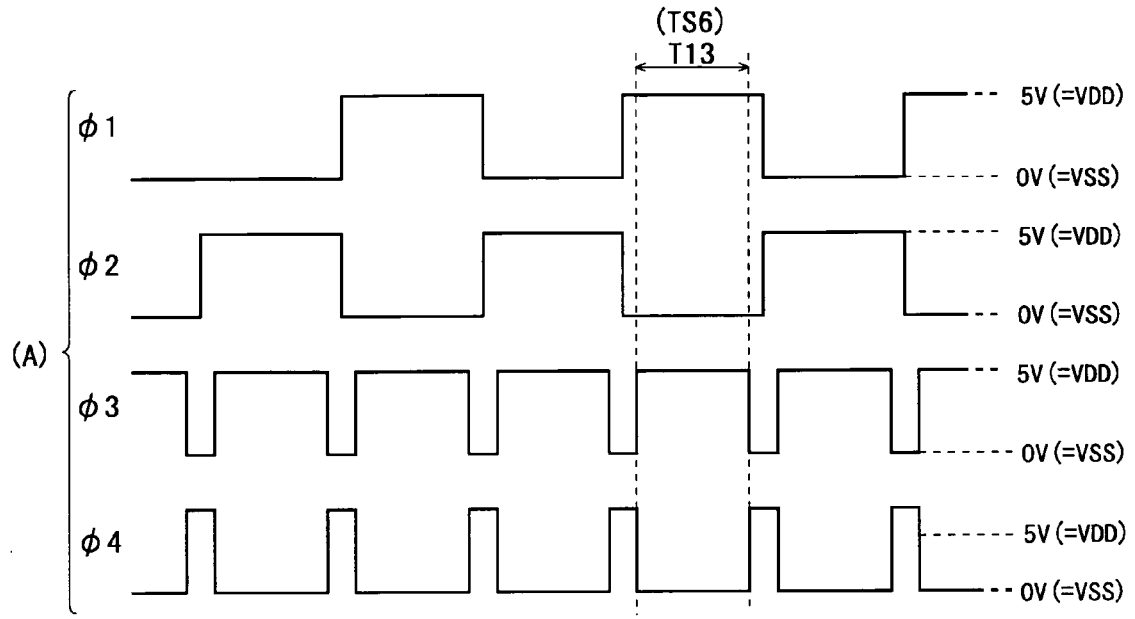
FIG. 15 consists of a chart and a diagram for describing a thirteenth operation state of the power supply circuit according to the embodiment.
Figure 15:
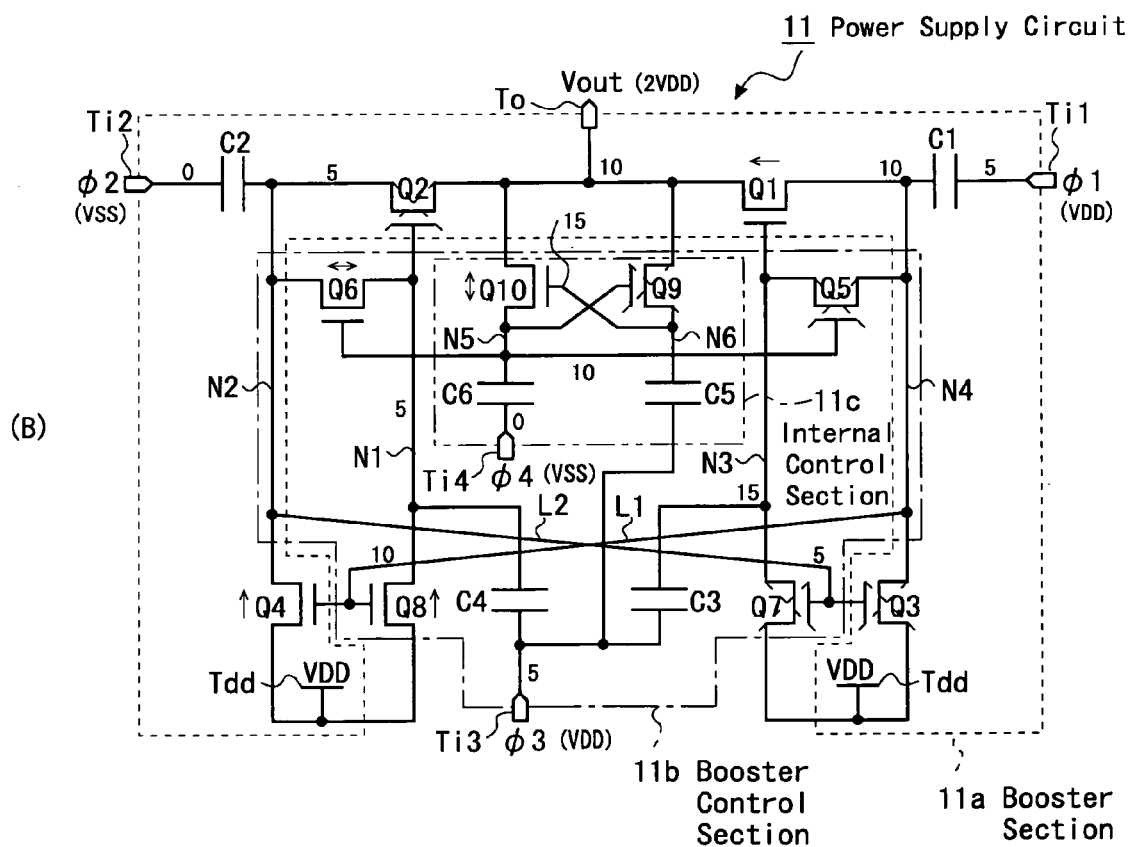

When the operation enters the sixth Time Segment TS6 (Time Period T13), as shown in FIG. 15, the third clock signal φ3, which is supplied to the second terminal (Ti3) of the third capacitor C3, rises from VSS=0[V] to VDD=5[V], so the node N3, which includes the first terminal of this capacitor C3 has a voltage change from 2VDD=10[V] to 3VDD=15[V], and this 3VDD=15[V] is supplied to the gate terminal of the N-ch transistor Q1 which serves as the main boosting switching element, causing the transistor Q1 to assume ON state. As a result, the above-mentioned boosted voltage 2VDD=10[V] obtained at the first terminal of the capacitor C1, is outputted as a boosted supply voltage Vout from the output terminal To via the transistor Q1 without voltage drop by threshold value.

<3. About Capacitance Ratio>

Figure 19:
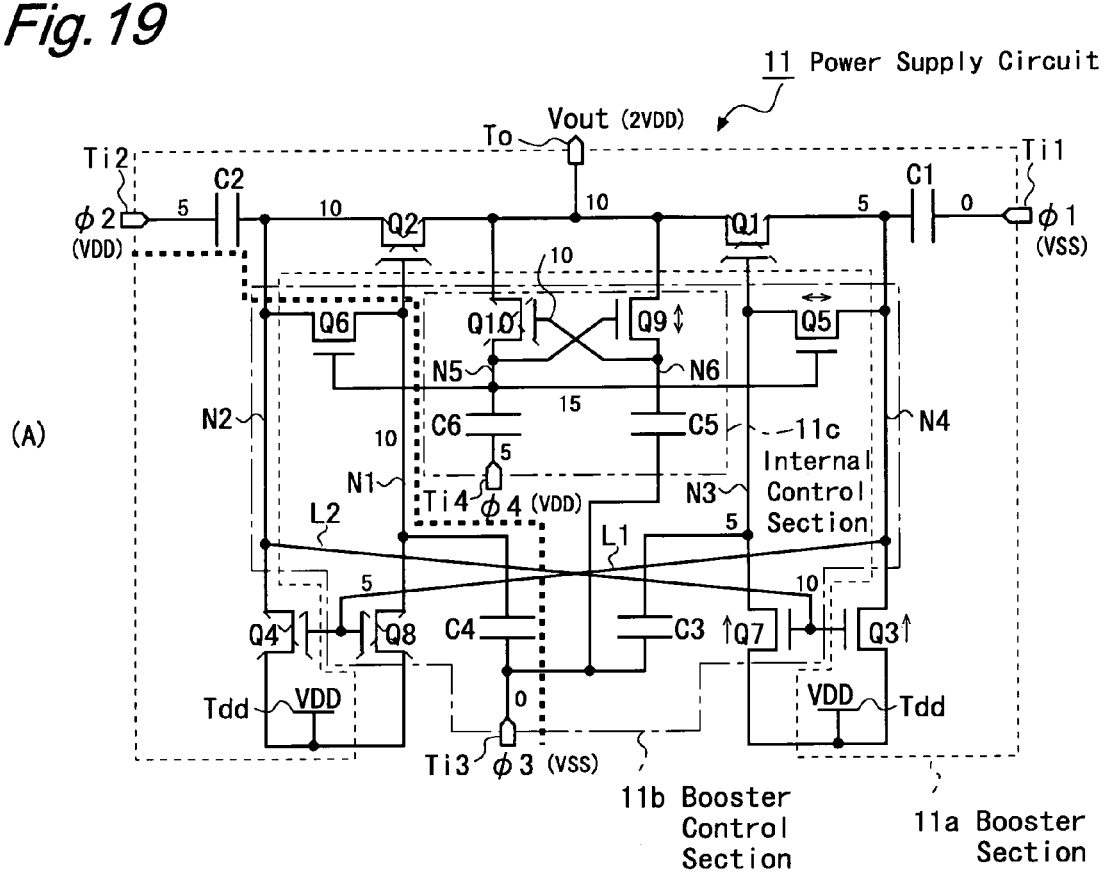
FIG. 19 consists of two diagrams (A and B) for describing influences of a capacitance ratio on the operation of the power supply circuit according to the embodiment.

Attention will now be paid to the second Time Segment TS2 and the fourth Time Segment TS4 out of the entire period of steady operation in the power supply circuit 11, which is composed of Time Segment TS1 through TS6 (Time Periods T14 through T16 and T11 through T13). The states of operation in these Time Segments TS2 and TS4 are as shown in FIG. 17(B) and FIG. 13(B). Under these states, the transistor Q6 is in ON state whereas the transistors Q2, Q4, Q8 are in OFF state, so as shown in bold broken lines in FIG. 19(A), the capacitors C2 and C4 are connected in series, and the circuit including these two series-connected capacitors C2 and C4 has its two circuit ends supplied with the second clock signal φ2 and the third clock signal φ3 respectively. Specifically, the route indicated with the bold broken lines can be represented by an equivalent circuit as shown in FIG. 19(B). This means that a capacitance voltage divider circuit as shown in FIG. 19(B) is formed between the input terminals Ti2 and Ti3 during the second and the fourth Time Segments TS2 and TS4.

In describing the operation states in the second and the fourth Time Segments TS2, TS4 (FIG. 17(B) and FIG. 13(B)) thus far, it was stated that the capacitance ratio C2/C4 between the second capacitor C2 and the fourth capacitor C4 is sufficiently large and the voltage at the node N1 in the second and the fourth Time Segments TS2, TS4 was regarded as 2VDD=10[V]. Actually, however, the voltage at the node N1 is dependent on the capacitance ratio C2/C4, and the voltage at the node N1 is determined by the capacitance ratio C2/C4 and voltages of the second and the third clocks φ2, φ3. Then, the voltage at the node N2, which is electrically connected with the node N1 in the second Time Segment TS2, is outputted as a boosted supply voltage Vout from the output terminal To in the third Time Segment TS3. Hereinafter, description will cover how the capacitance ratio C2/C4 influences the voltage at the node N1 in the second Time Segment TS2.

It should be noted here that similarly to the above, the voltage at the node N3 in the first and the fifth Time Segments TS1, TS5 is dependent on the capacitance ratio C1/C3 between the first capacitor C1 and the third capacitor C3. Since the capacitance ratio C1/C3 influences the voltage at the node N3 in the same way as will be described below, a separate description will not be given. It should also be noted here that during the third and the sixth Time Segments TS3, TS6, the node N1 and node N3 are electrically connected with the power supply terminal VDD, or electrically separated from any other capacitors than the capacitors C4, C3. Therefore, there is no influence from the capacitance ratios C2/C4, C1/C3 to the voltage at the node N1 nor to the voltage at the node N3.

The power supply circuit 11 according to the present embodiment makes the cyclic procedure as described above in its state of steady operation (FIG. 13 through FIG. 18), and the cycle is constituted by the first through the sixth Time Segments TS1 through TS6 as shown in FIG. 20(A). Of these Time Segments, the second Time Segment TS2 is a time when a capacitance voltage divider circuit as shown in FIG. 20(B) is formed between the input terminals Ti2 and Ti3. FIG. 20(C) shows voltages of the second and the third clock signals φ2, φ3 supplied to this capacitance voltage divider circuit, and those at the node N1 between the capacitors C2 and C3 in the above-described first through sixth Time Segments TS1 through TS6. In FIG. 20(C), a symbol "V(N1)" represents the voltage at the node N1. Values given for the voltage V (N1) in FIG. 20(C) are ideal values (values when the capacitance ratios C2/C4 and C1/C3 have infinite values).

Figure 21:
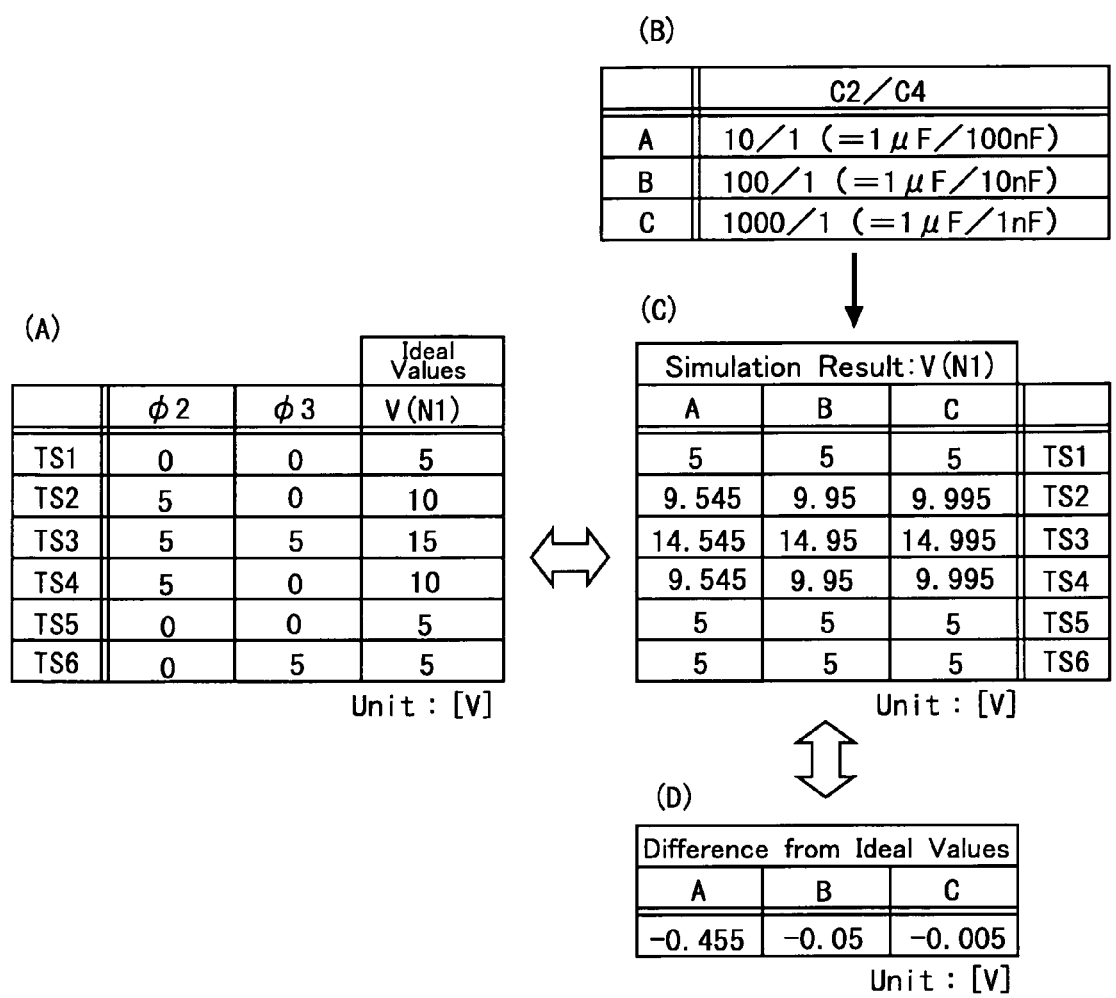
FIG. 21 includes four tables (A through D) for describing influences of the capacitance ratio on voltages at a predetermined node in the power supply circuit according to the embodiment based on a result of simulation.

Since the present embodiment uses the supply voltage VDD=5[V] and the grounding voltage VSS=0[V], the voltages of the second and the third clock signals φ2, φ3 and the voltage V (N1) at the node N1 between the capacitors C2 and C3 will ideally take values as shown in FIG. 21(A) in the above-described first through sixth Time Segments TS1 through TS6. The inventor of the present invention conducted a simulation in order to obtain the voltage V(N1) at the node N1 in the capacitance voltage divider circuit in FIG. 20(B) when the second clock signal φ2 has a voltage change from 0[V] to 5[V] under a condition that both of the second and the third clock signals φ2, φ3 have 0[V], the node N1 is supplied with 5[V] and the capacitors C2, C3 are charged. More specifically, three cases as indicated by A, B and C in FIG. 21(B) were assumed for the capacitance ratio C2/C4 between the second capacitor C2 and the fourth capacitor C4, and the voltage V(N1) at the node N1 in the second Time Segment TS2 was obtained for each of the three cases, from a simulation.

FIG. 21(C) shows values of the voltage V(N1) at the node N1 in Time Segments TS1 through TS6 based on the simulation. According to the simulation result, the voltage V(N1) at the node N1 in the second Time Segment TS2 is 9.545[V] under the condition A (C2/C4=10/1); 9.95[V] under the condition B (C2/C4=100/1), and 9.995[V] under the condition C (C2/C4=1000/1). When the operation state shifts from the second Time Segment TS2 to the third Time Segment TS3, the third clock signal φ3 has a voltage change from 0[V] to 5[V], so the voltage V(N1) at the node N1 makes changes accordingly to its previous value in the second Time Segment TS2 listed above; specifically, a new value is 14.545[V] under the condition A; 14.95[V] under the condition B, and 14.995 [V] under the condition C.

The values of the voltage V (N1) at the node N1 obtained from the simulation were compared to the ideal values listed in FIG. 21(A), and differences are shown in FIG. 21(D): Specifically, the difference is −0.455[V] under the condition A; −0.05[V] under the condition B; and −0.005[V] under the condition C. Therefore, influences of the capacitance ratio C2/C4 on the voltage V(N1) at the node N1 and on the voltage Vout as the outputted will become negligible if the capacitance ratio C2/C4 is sufficiently large. Then, in cases where the switching elements are provided by N-channel thin-film transistors, the capacitance ratio C2/C4 may be set to 10 or a greater value. This setting leads to reduced voltage drop in the boosted supply voltage Vout and improved voltage boosting performance over conventional voltage-boosting power supply circuits which have an inherent problem of the voltage drop by threshold value. Also, in conventional voltage-boosting power supply circuits which use N-channel transistors as switching elements, variation in the threshold voltage Vth among the transistors affects the final output of the boosted supply voltage. Comparatively, variation in the capacitance ratio C2/C4 is sufficiently smaller than the variation in the threshold voltage Vth. Therefore, the arrangement in the present embodiment is advantageous over the above-described conventional voltage-boosting power supply circuits in this aspect, too.

<4. Advantages>

According to the present embodiment as described, when a boosted voltage 2VDD (=10[V]) is outputted from the output terminal To by turning ON the N-ch transistors Q1, Q2 (in the sixth and the third Time Segments TS6, TS3), the transistors' respective gate terminals are supplied with voltages at the nodes N3, N1 respectively, which are generated by the booster control section 11b in the following process: Specifically, first, the capacitors C3, C4 are charged with a boosted voltage 2VDD (=10[V]. Thereafter (in the sixth and the third Time Segment TS6, TS3), the charged voltage is boosted, whereby a voltage of 3VDD (=15[V]) is generated as a voltage at the nodes N3, N1. Then, this voltage of 3VDD is supplied to the gate terminal of the transistor Q1 in the sixth Time Segment TS6 whereas it is supplied to the gate terminal of the transistor Q2 in the third Time Segment TS3. Thus, it is possible to output a boosted voltage 2VDD as a boosted supply voltage Vout from the output terminal To without causing voltage drops by threshold value in the output-side switching elements, i.e. the N-ch transistors Q1, Q2. Specifically, it is possible to boost a supply voltage without causing voltage drops by threshold value even in cases as shown FIG. 1 where all of the switching elements are provided by N-channel transistors. Therefore, it is now possible to provide a power supply circuit which is capable of outputting a desired boosted supply voltage reliably without being affected by threshold values or variations thereof, at a lower manufacturing cost through a simplified process of manufacture than necessary for CMOS (Complementary Metal Oxide Semiconductor) type products which require both of N-channel transistors and P-channel transistors.

Also, according to the embodiment, only one supply voltage VDD is enough as the external supply of supply voltage to meet the generation requirement for the boosted supply voltage (2VDD). In addition, signals which must be supplied externally are only clock signals φ1 through φ4 of a corresponding amplitude to that of the supply voltage VDD. This is an advantage which helps simplify a power supply configuration of the electronic devices that employ a power supply circuit according to the present embodiment.

Further, according to the embodiment, alternate and mutually-complementary charging and boosting take place in the first capacitor C1 and the second capacitor C2. Specifically, in one operation state (the sixth Time Segment TS6), a boosted voltage 2VDD obtained at a first terminal (node N4) of the first capacitor C1 is outputted via the first transistor Q1, and in another operation state (the third Time Segment TS3) a boosted voltage 2VDD obtained at a first terminal (node N2) of the second capacitor C2 is outputted via the second transistor Q2. These two states take place alternately to each other; namely, when one of the first and the second capacitors C1, C2 is employed in boosting operation, the other is being charged. Such a complementary boosting pattern improves electric current supply capability to a load.

Further, according to the embodiment, a voltage of 2VDD (=10[V]) is held in the capacitors C5, C6 of the internal control section 11c during the steady operation. Based on this, turning ON of the transistors Q5, Q6 is accomplished by supplying a voltage of 3VDD (=15[V]) to their respective gate terminals. Therefore, no voltage drop by threshold value takes place in the transistors Q5, Q6 which serve as the control-boosting switching elements, either. This ensures that when the transistors Q1, Q2 in the booster section 11a are turned ON, the booster control section 11b generates a voltage of 3VDD=15[V] as a voltage to be supplied to their respective gate terminals. Thus, influence of the voltage drop by threshold value on the boosted supply voltage Vout outputted from the output terminal To, is removed more reliably.

<5. Variations>
<5.1 First Variation>

In the embodiment described above, a supply voltage VDD which is supplied externally is boosted to twice as high (2VDD), to be a boosted supply voltage Vout, yielding a voltage boost increment which is equal to VDD (=5(V)) with respect to the supply voltage VDD. The increment may be changed to a different amount, however.

Figure 22:
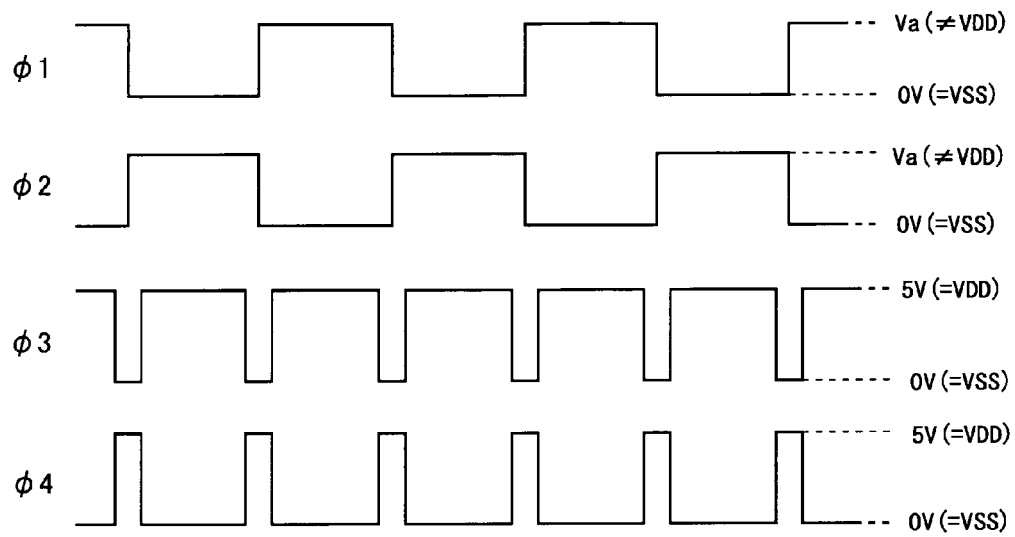
FIG. 22 is a signal waveform chart for describing a first variation of the embodiment.

As understood from FIG. 13 through FIG. 18 which show the operation of the power supply circuit 11, the voltage boost increment is the amplitude of the first and the second clock signals φ1, φ2. Therefore, if the supply voltage VDD is 5[V] and the desired boosted supply voltage is 8[V] for example, a required increment of voltage boost is 3[V], and so the first and the second clock signal φ1, φ2 should simply be changed to have an amplitude of 3[V]. In more general wording, it can be stated that in order to obtain a desired boosted supply voltage of Vout from an input supply voltage VDD, the first and the second clock signals φ1, φ2 should be designed to have an amplitude which is equal to the desired voltage boost increment of Va=Vout−VDD. For example, as shown in FIG. 22, two pulse signals each having a voltage alternating oppositely to each other between the grounding voltage VSS=0[V] and the voltage Va may be supplied as the first and the second clock signals φ1, φ2 to the first and the second input terminals Ti1, Ti2 respectively in the power supply circuit 11 in order to obtain the desired boosted supply voltage Vout=VDD+Va at the output terminal To. It should be noted here that the third and the fourth clock signals φ3, φ4 to be supplied to the third and the fourth input terminals Ti3, Ti4 in the power supply circuit 11 may be as shown FIG. 22, i.e. the same clock signals as used in the embodiment described above, but these third and the fourth clock signals φ3, φ4 are not limited to VDD=5 [V], either (as will be described later in detail).

According to the configuration as described above (the first variation) as well, when turning ON the N-ch transistors Q1, Q2 which serve as the output-side switching elements in the power supply circuit 11, the gate terminal of the one which is to be turned ON is supplied with a voltage which is higher than the boosted voltage VDD Va by the amount of amplitude (VDD=5[V]) in the third and the fourth clock signals φ3, φ4 (see FIG. 17 and FIG. 18 for example), and hence the boosted voltage VDD+Va in the booster section 11a is outputted as the boosted supply voltage Vout from the output terminal To, without voltage drop by threshold value in the transistors Q1, Q2. With the arrangement as described, it is possible to boost the supply voltage VDD without a voltage drop by threshold value even if the incremental amount of boost is different from VDD=5[V].

<5.2 Second Variation>

Figure 23:
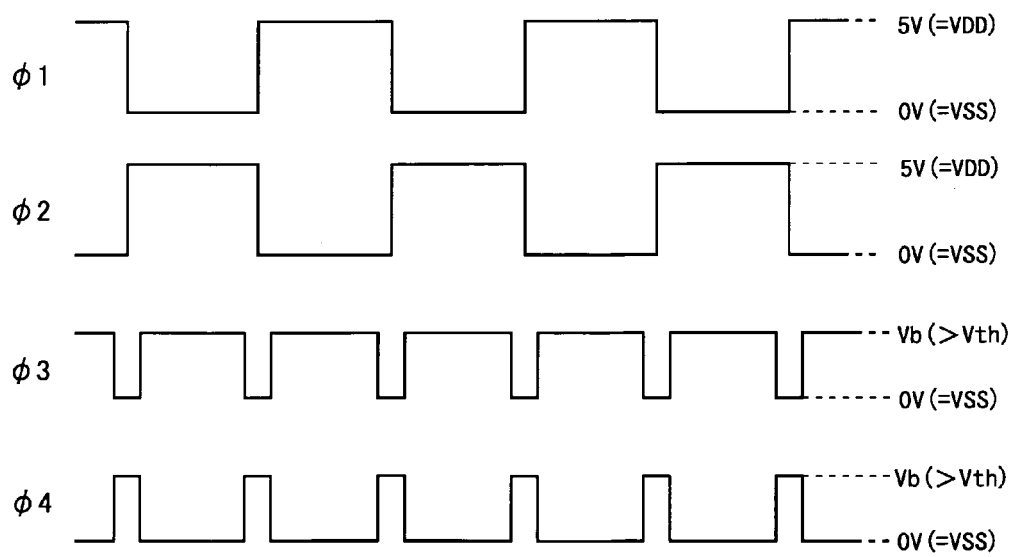
FIG. 23 is a signal waveform chart for describing a second variation of the embodiment.

As understood from the configuration and operation of the booster control section 11b thus far described in the embodiment (see FIG. 17, FIG. 18 for example), when turning ON the N-ch transistors Q1, Q2 which serve as the output-side switching elements in the power supply circuit 11, the gate terminal of the one which is to be turned ON is supplied with a voltage which is obtained by boosting the boosted voltage 2VDD (the voltage at the node N2 or N4) supplied to the control-boosting capacitor C4 or C3, by the amplitude of the third clock. Therefore, the output-side switching elements, i.e. the N-ch transistors Q1, Q2 will not have a voltage drop by threshold value if the third clock signal φ3 has an amplitude which is greater than the threshold voltage of the N-ch transistor Q1, Q2. For example, the third and the fourth input terminals Ti3, Ti4 in the power supply circuit 11 may be supplied with a third and a fourth clock signals φ3, φ4 as shown in FIG. 23, which are two pulse signals each having a voltage alternating oppositely to each other between the grounding voltage VSS=0[V]) and a voltage Vb that is greater than the above-mentioned threshold voltage Vth (in more accurate wording, the third clock signal φ3 should be designed to have a greater amplitude than the threshold voltage of the transistors Q1, Q2 which serve as the output-side switching element whereas the fourth clock signal φ4 should be designed to have a greater amplitude than the threshold voltage of the transistors Q5, Q6 which serve as the control-boosting switching elements). It should be noted here that in cases where the boosted supply voltage Vout is 2VDD, the first and the second clock signals φ1, φ2 as shown in FIG. 23, i.e. the same signals as used in the above-described embodiment, may be supplied to the first and the second input terminals Ti1, Ti2 in the power supply circuit.

It should be noted here that as shown in FIG. 2 and other figures, the embodiment differs from the first and the second variations in that all of the first through the fourth clock signals φ1 through φ4 are pulse signals each having a voltage alternating oppositely to the other in the pair, between the grounding voltage VSS (=0) and the supply voltage VDD. Therefore, only a single external supply voltage VDD is enough to obtain a boosted supply voltage Vout (=2VDD).

<5.3 Third Variation>

In the embodiment, when turning ON the N-ch transistors Q5, Q6 which serve as the control-boosting switching elements in the booster control section 11b, their gate terminal of the one which is to be turned ON is supplied with a voltage 3VDD (=15[V]) which is generated by the internal control section 11c. However, the voltage to be supplied to the gate terminal of these transistors in order to turn them ON is not limited to this voltage. Also, these transistors may have a voltage drop by threshold value when they are turned ON as far as the output-side switching elements in the booster section 11a, i.e. the N-ch transistors Q1, Q2 do not have a voltage drop by threshold value when they are turned ON.

Figure 24:
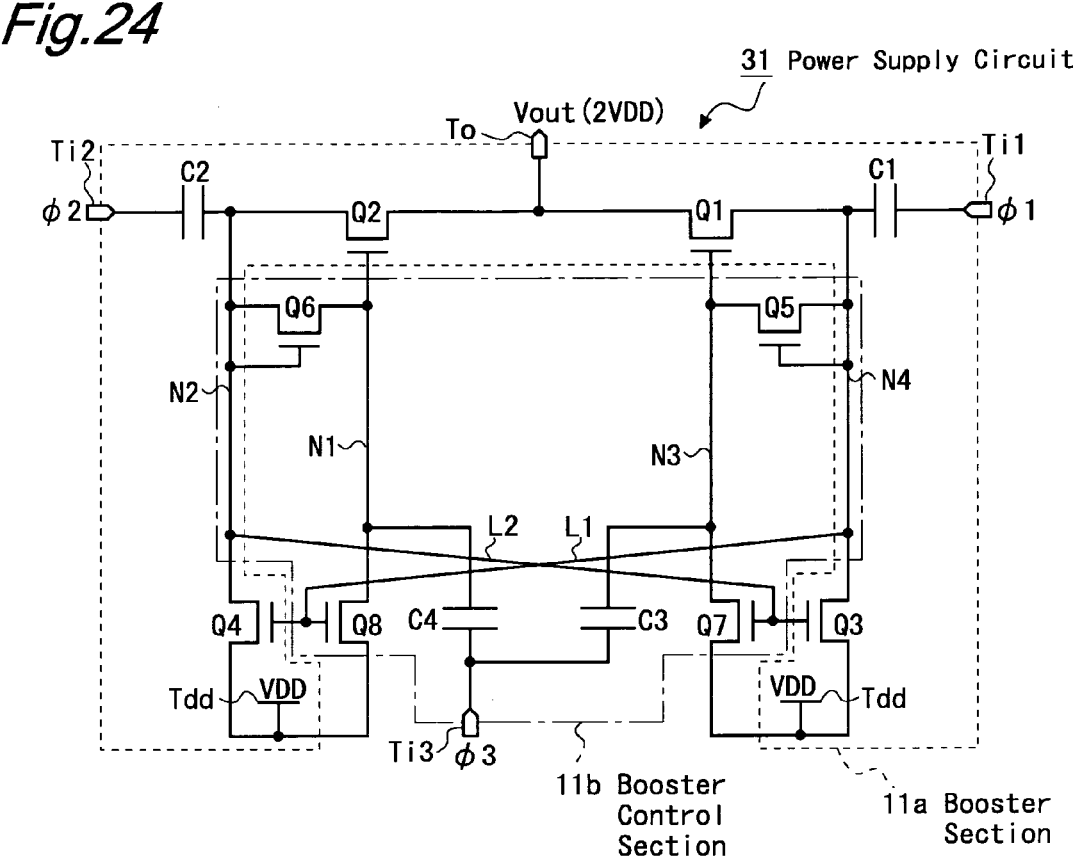
FIG. 24 is a circuit diagram which shows a configuration of a third variation of the embodiment.

For example, as shown in FIG. 24, the power supply circuit 11 shown in FIG. 1 may be varied by removing the internal control section 11c, and connecting the gate terminal of the N-ch transistor Q5 with the node N4 while connecting the gate terminal of the N-ch transistor Q6 with the node N2. In a power supply circuit 31 (the third variation) which has the above-described configuration, the control-boosting switching elements provided by the N-ch transistors Q5, Q6 have a voltage drop by threshold value. As a result, when the booster section 11a turns ON its output-side switching elements provided by the N-ch transistors Q1, Q2, a voltage to be supplied to the gate terminal of the one which is to be turned ON has a voltage decrease by the threshold voltage Vth, to become:

$$3VDD-Vth=2VDD+(VDD-Vth)$$

However, normally, N-ch transistors' threshold voltage Vth is lower than the supply voltage VDD (=5[V]), and the following relationship is true: VDD−Vth>Vth. Hence, when turning ON the N-ch transistors Q1, Q2, the voltage which is supplied to the gate terminal of the one which is to be turned ON is higher than the boosted supply voltage Vout=2VDD by at least the threshold voltage Vth. Therefore, in this case too, the output-side switching elements, i.e. the N-ch transistors Q1, Q2, do not have a voltage drop by threshold value.

<5.4 Fourth Variation>

Figure 25:
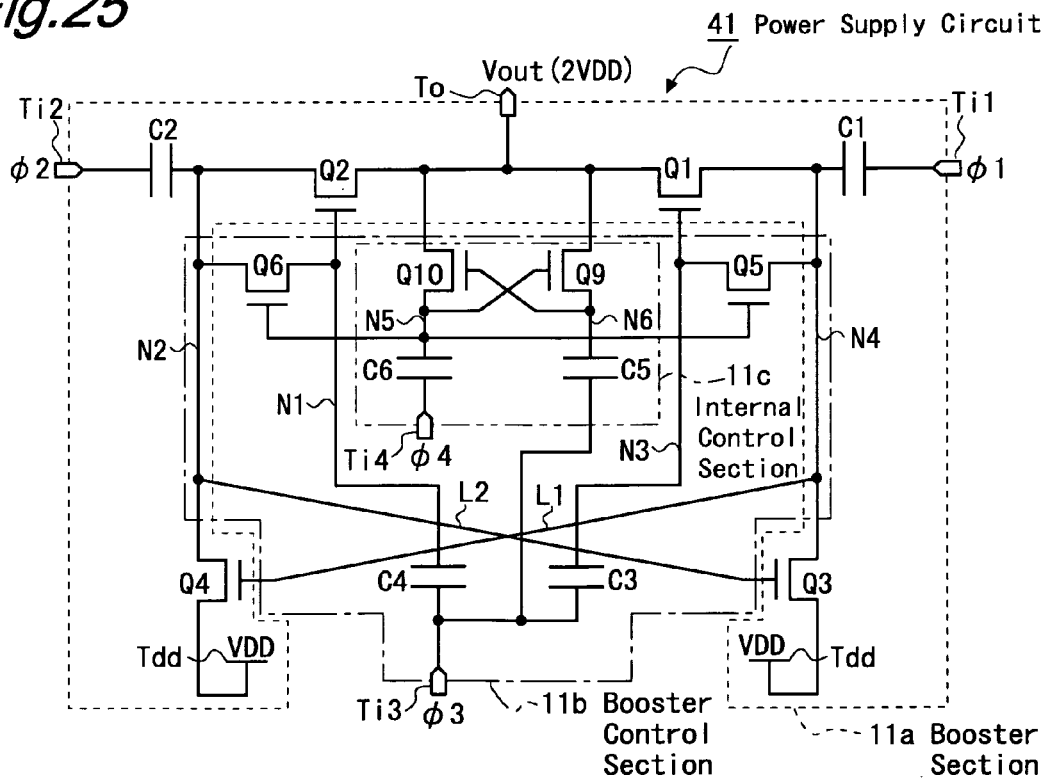
FIG. 25 is a circuit diagram which shows a configuration of a fourth variation of the embodiment.

In the embodiment, the booster control section 11b includes an N-ch transistor Q8 as a switching element for controlling a supply of the supply voltage VDD to the capacitor C4; and further includes an N-ch transistor Q7 as a switching element for controlling a supply of the supply voltage VDD to the capacitor C3. However, as understood from FIG. 3 through FIG. 18, when the transistor Q7 is in ON state, transistors Q3, Q5 are also in ON state whereas when the transistor Q8 is in ON state, the transistors Q4, Q6 are also in ON state. Therefore, as shown in FIG. 25, the transistors Q7, Q8 may be removed from the power supply circuit 11 in FIG. 1. In this case, when supplying the capacitor C3 with the supply voltage VDD, the supply voltage VDD from the power supply terminal Tdd is routed via the transistors Q3, Q5 whereas when supplying the capacitor C4 with the supply voltage VDD, the supply voltage VDD from the power supply terminal Tdd is routed via the transistors Q4, Q6. Therefore, according to the power supply circuit 41 which has a configuration shown in FIG. 25, it is also possible, as is the above-described embodiment, to output a boosted supply voltage VDD without causing a voltage drop by threshold value in the output-side switching elements provided by the N-ch transistors Q1, Q2.

<5.5 Fifth Variation>

As explained already, in the embodiment, a capacitance voltage divider circuit (see FIG. 17(B) and FIG. 19(B)) is formed in the second Time Segment TS2 by the capacitors C2 and C4, whereas a capacitance voltage divider circuit (see FIG. 14(B)) is formed in the fifth Time Segment TS5 by the capacitors C1 and C3. With this in mind, the embodiment is based on an arrangement that a capacitance ratio C2/C4 and a capacitance ratio C1/C3 have sufficiently large values, so that influences from these capacitance ratios C2/C4 and C1/C3 on the performance of power supply circuit 11 or on the boosted supply voltage Vout can be negligible or does not matter at all. However, these capacitance ratios C2/C4 and C1/C3 may be regarded as design parameters and may be used in determining a target output value of the boosted supply voltage Vout. Specifically, the boosted supply voltage Vout, which is twice the input supply voltage, i.e. 2VDD, in the above-described embodiment, may be set to a different value other than 2VDD by appropriately manipulating these capacitance ratios C2/C4 and C1/C3. Preferably, however, the size of the N-channel transistors Q5, Q6 should be sufficiently large so that the boosted supply voltage Vout outputted from the output terminal To will not be affected by the ON-resistance of these transistors Q5, Q6.

For example, if a desired output of the boosted supply voltage Vout is 1.6 VDD (=8[V]), a required capacitance ratio settings are C2/C4=C1/C3=3/2. The capacitance ratio variation caused by manufacturing process is relatively small, so setting the boosted supply voltage Vout by means of the capacitance ratio will not cause variation problems in the actual output of the boosted supply voltage Vout.

<5.6 Other Variations>

In the above-described embodiment and variations, the booster section 11a makes a voltage boosting operation in a complementary manner (FIG. 13 through FIG. 18) However, the present invention is not limited to such a configuration; the present invention requires an arrangement which includes a charge-pumping configuration for boosting a supply voltage, with at least one main boosting capacitor which has its terminal connected with an input-side and an output-side switching elements each provided by an N-channel transistor.

<6. Application to Driver Monolithic Display Devices>

Figure 26:
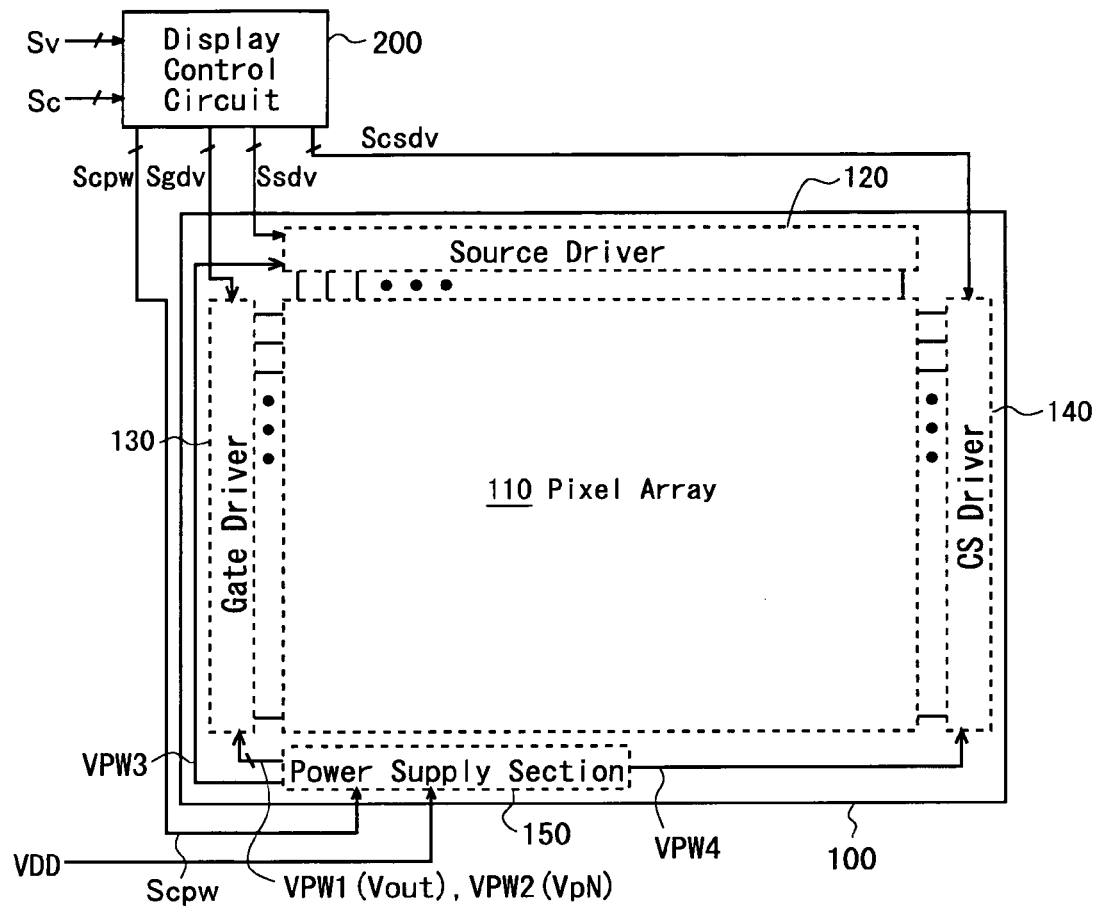
FIG. 26 is a block diagram which shows a configuration of a driver monolithic liquid crystal display device including a power supply circuit according to the embodiment.

Next, description will cover a case where a power supply circuit according to the present invention is utilized in a liquid crystal display device. FIG. 26 is a block diagram which shows a configuration of such a liquid crystal display device. This liquid crystal display device is a driver monolithic display device which includes a liquid crystal panel 100 and a display control circuit 200. The liquid crystal panel 100 has a TFT substrate and an opposed substrate sandwiching a liquid crystal layer therebetween.

The TFT substrate in the liquid crystal panel 100 includes an insulated substrate made of glass for example, which is formed thereon with a plurality of data signal lines and a plurality of scanning signal lines crossing therewith in a grid pattern. Each of the scanning signal lines is paralleled by an auxiliary capacitance line serving as an auxiliary electrode. A plurality of pixel circuits (pixel formation portions) each corresponding to one of the intersections made by the data signal lines and the scanning signal lines are formed in a matrix pattern (Hereinafter, these pixel circuits formed in a matrix pattern will be called "pixel array"). The TFT substrate further includes a source driver 120 as a data signal line drive circuit, a gate driver 130 as a scanning signal line drive circuit, a CS driver 140 as an auxiliary capacitance line drive circuit, and a power supply section 150 which includes a power supply circuit (FIG. 1) according to the foregoing embodiment. These source driver 120, gate driver 130, CS driver 140 and power supply section 150 are formed simultaneously in a process of forming the pixel circuits. Note that switching elements and other active elements formed to build the above-mentioned drive circuits 120 through 140 and power supply section 150 on the liquid crystal panel 100 are solely provided by N-channel TFTs formed of a polycrystal silicon.

The opposed substrate in the liquid crystal panel 100 is an insulated transparent substrate made of glass for example, which has a surface entirely formed thereon with a layer of a common electrode Ecom and a layer of an alignment film laminated thereon.

Figure 27:
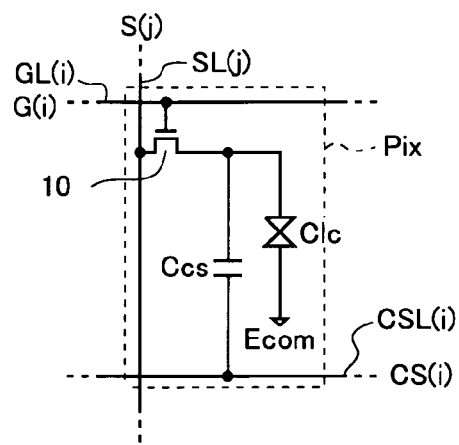
FIG. 27 is a circuit diagram which shows an electric configuration of a pixel formation portion in the driver monolithic liquid crystal display device.
Figure 28:
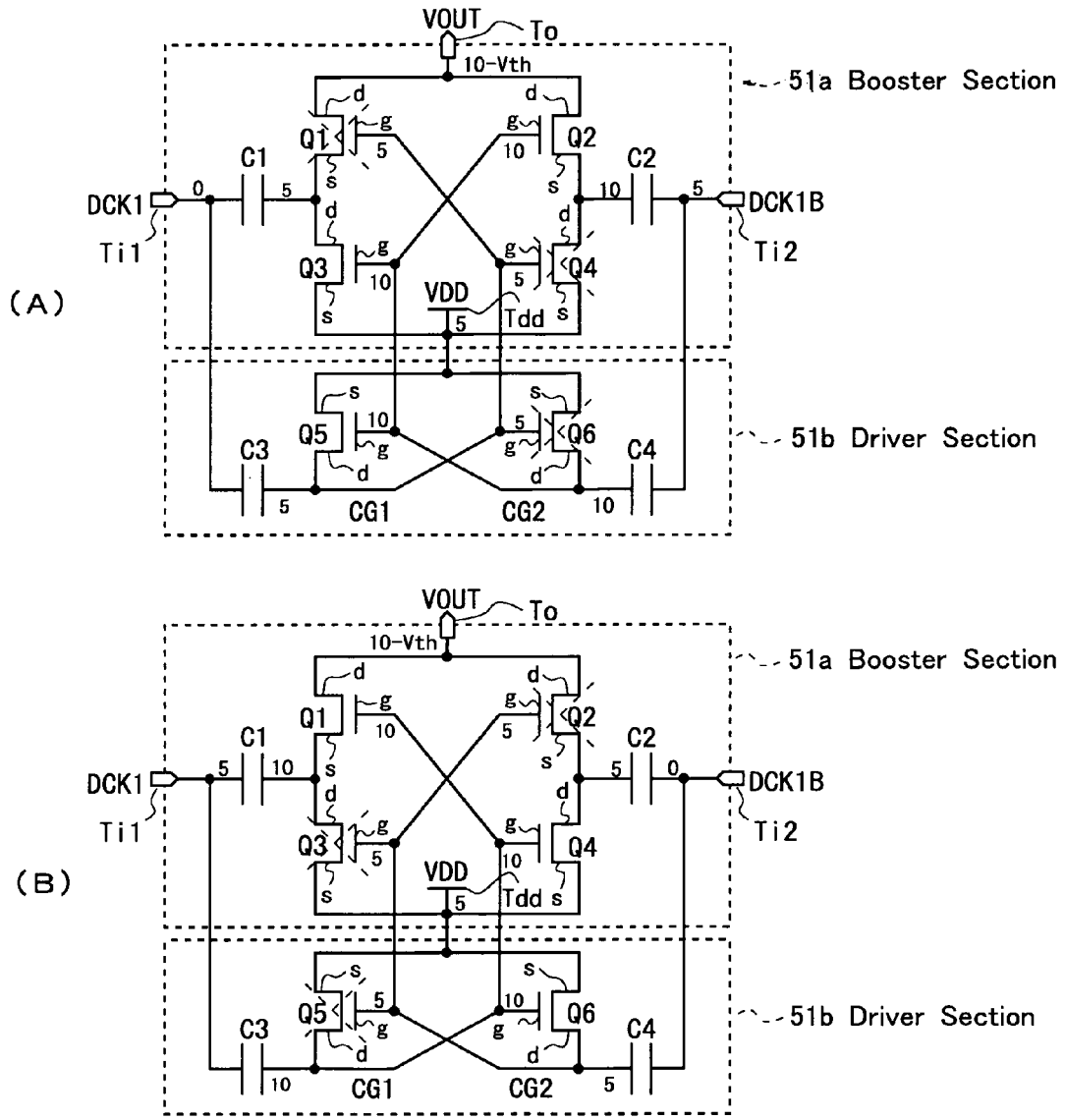
FIG. 28 consists of two circuit diagrams (A and B) which show a configuration and an operation of a conventional charge-pumping power supply circuit.
Figure 29:
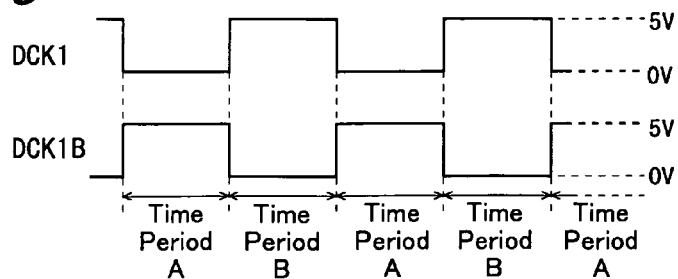
FIG. 29 is a waveform chart of clock signals for driving the conventional power supply circuit.

FIG. 27 is a circuit diagram which shows an electric configuration of a pixel formation portion Pix for constituting a pixel required to display an intended image in the liquid crystal panel 100. Each pixel formation portion Pix is constituted by one of the pixel circuits in the pixel array 110, and common elements, i.e. the liquid crystal layer and the common electrode Ecom which are formed commonly to all of the pixel circuits. Electrically, each pixel formation portion Pix has a configuration shown in FIG. 27, including: a switching element provided by an N-channel TFT 10 having a source terminal connected with a corresponding one of the data signal lines SL(j) and a gate terminal connected with a corresponding one of the scanning signal lines GL(i); a liquid crystal capacitance Clc formed by a pixel electrode connected with a drain terminal of the TFT 10, the liquid crystal layer and the common electrode Ecom; and an auxiliary capacitance Ccs formed by the pixel electrode and the auxiliary capacitance line CSL(i) which corresponds to the scanning signal line GL(i).

The display control circuit 200 generates the following signals based on an image signal Sv and a control signal Sc supplied from an external signal source (not illustrated): a drive control signal (including image signals for supplying each pixel electrode with a voltage which indicates a pixel value) Ssdv for operation of the source driver 120; a drive control signal Sgdv for operation of the gate driver 130; a drive control signal Scsdv for operation of the CS driver 140; and a power supply control signal Scpw which contains a clock signal to be described later and other signals for operation of the power supply section 150. The display control circuit 200 also generates a signal for operation of a common electrode drive circuit (not illustrated) which generates a common voltage Vcom for driving the common electrode Ecom.

Based on the drive control signal Sgdv, the gate driver 130 generates scanning signals G(1) through G(m) (a letter m indicates the quantity of scanning signal lines) and applies the generated signals to the scanning signal lines so that the scanning signal lines will be sequentially supplied with a voltage for turning ON the TFTs 10. The source driver 120 generates data signals S(1) through S(n) and applies the generated signals to the data signal lines for displaying an image in the liquid crystal panel 100, based on the drive control signals Ssdv. The CS driver 140 generates CS signals CS(1) through CS(m) and applies the generated signals to the auxiliary capacitance lines for a control of pixel electrode potential via the auxiliary capacitance Ccs, based on the drive control signals Scsdv.

The power supply section 150 generates, based on the power supply control signal Scpw and from a supply voltage VDD (not illustrated) supplied to the liquid crystal panel 100, power supply voltages VPW1, VPW2 to be supplied to the gate driver 130, a power supply voltage VPW3 to be supplied to the source driver 120, and a supply voltage VPW4 to be supplied to the CS driver 140. As described earlier, the power supply section 150 includes a power supply circuit 11 (FIG. 1) according to the foregoing embodiment. The power supply circuit 11 which outputs a boosted supply voltage Vout, which is supplied as the supply voltages VPW1, to the gate driver 130. Further, the power supply section 150 also includes a negative power supply circuit for an output of a negative power supply voltage VpN, which is also supplied to the gate driver 130 as the supply voltages VPW2. The other supply voltages VPW3, VPW4 are generated by a power supply circuit according to the above-described embodiment or one of the first through the fifth variations. In cases where VPW3 and VPW4 have the same voltage as VPW1, the output Vout from the power supply circuit 11 may be supplied as VPW1, VPW3 and VPW4 to the gate driver 130, the source driver 120 and the CS driver 140 respectively.

According to the driver monolithic liquid crystal display device as described above, switching elements and other active elements in the pixel array 110, the source driver 120, the gate driver 130, and the CS driver 140, are solely provided by N-channel TFTs, and no P-channel TFTs are utilized. Therefore, it is possible to reduce cost by employing a simpler process of manufacture than in cases where both of the N-channel TFTs and the P-channel TFTs are utilized. Further, since the power supply section 150 includes a power supply circuit according to the foregoing embodiment or a variation thereof, there is no voltage drop by the threshold value when generating the supply voltages VPW1 through VPW4 for supplying to the source driver 120, the gate driver 130 and the CS driver 140. As a note, in the liquid crystal display device illustrated in FIG. 26, the power supply section 150 is implemented with the use of TFTs which are made of a polycrystal silicon. When compared to cases where the switching elements are made of a monocrystal silicon, the switching elements provided by these N-channel transistors (TFTs) have a greater threshold value and the threshold value varies in a wider range, yet the circuit device is capable of providing a stable voltage boosting operation and outputting a desired boosted supply voltage reliably since there is no voltage drop by threshold value as described above.

INDUSTRIAL APPLICABILITY

The present invention is applicable to power supply circuits which include a charge-pumping booster section for boosting a supply voltage, and to driver monolithic display devices which include such a power supply circuit.

The invention claimed is:

1. A charge-pumping power supply circuit for boosting an input supply voltage from outside, comprising:
   a booster section including a first main boosting capacitor and a first input-side and a first output-side switching elements connected with a first terminal of the first main boosting capacitor, for boosting a voltage supplied to the first main boosting capacitor via the first input-side switching element and outputting a boosted voltage as a boosted supply voltage via the first output-side switching element; and
   a booster control section for causing the first input-side and the first output-side switching elements to turn on and off oppositely to each other, the booster control section including a first control-boosting switching element provided by an N-channel transistor of a positive threshold voltage; a first control-boosting capacitor having a first terminal connected with the control terminal of the first output-side switching element, as well as with the first terminal of the first main boosting capacitor via the first control-boosting switching element;
   wherein each of the first input-side and the first output-side switching elements is provided by an N-channel transistor of a positive threshold voltage, and
   wherein the booster control section boosts the boosted voltage supplied from the first main boosting capacitor to the first control-boosting capacitor via the first control-boosting switching element, thereby supplying the control terminal of the first output-side switching element with a voltage which is higher than the boosted voltage by at least the threshold voltage of the first output-side switching element, when turning on the first output-side switching element.

2. The power supply circuit according to claim 1, wherein the booster control section
   includes: an internal control section for turning on and off the control-boosting switching element;

the internal control section boosting the boosted supply voltage thereby generating a voltage which is higher than the boosted voltage by at least the threshold voltage of the first control-boosting switching element and supplying the generated voltage to a control terminal of the first control-boosting switching element upon a supply of the boosted voltage from the first main boosting capacitor to the first control-boosting capacitor via the first control-boosting switching element.

3. The power supply circuit according to claim 1, wherein the booster section further includes a second main boosting capacitor and a second input-side and a second output-side switching elements connected with a first terminal of the second main boosting capacitor, and boosts a voltage supplied to the second main boosting capacitor via the second input-side switching element and outputting a boosted voltage as a boosted supply voltage via the second output-side switching element, wherein the booster control section
further includes a second control-boosting switching element provided by an N-channel transistor of a positive threshold voltage, a second control-boosting capacitor having a first terminal connected with the control terminal of the second output-side switching element as well as with the first terminal of the second main boosting capacitor via the second control-boosting switching element,
causes the second input-side and the second output-side switching elements to turn on and off oppositely to each other as well as causes the first output-side and the second output-side switching elements to turn on alternately, and
boosts the boosted voltage supplied from the second main boosting capacitor to the second control-boosting capacitor via the second control-boosting switching element, thereby supplying the control terminal of the second output-side switching element with a voltage which is higher than the boosted voltage by at least the threshold voltage of the second output-side switching element, when turning on the second output-side switching element.

4. The power supply circuit according to claim 3, wherein the booster section includes:
a power supply terminal for receiving the input supply voltage;
a first and a second input terminal for receiving a first and a second clock signals respectively;
an output terminal for outputting the boosted supply voltage;
a first switching element serving as the first output-side switching element;
a second switching element serving as the second output-side switching element;
a third switching element serving as the first input-side switching element;
a fourth switching element serving as the second input-side switching element;
a first capacitor serving as the first main boosting capacitor, having a first terminal connected with the power supply terminal via the third switching element as well as with the output terminal via the first switching element, and a second terminal connected with the first input terminal; and a second capacitor serving as the second main boosting capacitor, having a first terminal connected with the power supply terminal via the fourth switching element as well as with the output terminal via the second switching element, and a second terminal connected with the second input terminal; and the booster control section includes:
a third input terminal for receiving a third clock signal;
a fifth switching element serving as the first control-boosting switching element;
a sixth switching element serving as the second control-boosting switching element;
a third capacitor serving as the first control-boosting capacitor, having a first terminal connected with a control terminal of the first switching element as well as with the first terminal of the first capacitor via the fifth switching element, and a second terminal connected with the third input terminal;
a fourth capacitor serving as the second control-boosting capacitor, having a first terminal connected with a control terminal of the second switching element as well as with the first terminal of the second capacitor via the sixth switching element, and a second terminal connected with the third input terminal;
a first wire connecting the first terminal of the first capacitor with a control terminal of the fourth switching element; and
a second wire connecting the first terminal of the second capacitor with a control terminal of the third switching element.

5. The power supply circuit according to claim 4, wherein the booster control section further includes:
a seventh switching element provided by an N-channel transistor having a control terminal connected with the second wire; and
an eighth switching element provided by an N-channel transistor having a control terminal connected with the first wire;
the first terminal of the third capacitor being connected with the power supply terminal via the seventh switching element;
the first terminal of the fourth capacitor being connected with the power supply terminal via the eighth switching element.

6. The power supply circuit according to claim 4, wherein the booster control section further includes an internal control section for turning on and off the first and second control-boosting switching elements,
the internal control section boosting the boosted supply voltage thereby generating a voltage which is higher than the boosted voltage by at least the threshold voltage of the first control-boosting switching element and supplying the generated voltage to the control terminal of the first control-boosting switching element upon a supply of the boosted voltage from the first main boosting capacitor to the first control-boosting capacitor via the control-boosting switching element, and
the internal control section boosting the boosted supply voltage thereby generating a voltage which is higher than the boosted voltage by at least the threshold voltage of the second control-boosting switching element and supplying the generated voltage to the control terminal of the second control-boosting switching element upon a supply of the boosted voltage from the second main boosting capacitor to the second control-boosting capacitor via the second control-boosting switching element.

7. The power supply circuit according to claim 6, wherein the internal control section includes:
a fourth input terminal for receiving a fourth clock signal;
a first and a second internal control switching elements each provided by an N-channel transistors of a positive threshold voltage;

a first internal control capacitor having a first terminal connected with the output terminal via the first internal control switching element as well as connected with a control terminal of the second internal control switching element, and a second terminal connected with the third input terminal; and a second internal control capacitor having a first terminal connected with the output terminal via the second internal control switching element as well as connected with a control terminal of the first internal control switching element, and a second terminal connected with the fourth input terminal;

the first terminal of the second internal control capacitor being connected with control terminals of the fifth and the sixth switching elements.

8. The power supply circuit according to claim 1, wherein the switching elements in the booster section and the booster control section are made of a polycrystal silicon.

9. The power supply circuit according to claim 1, wherein the switching elements in the booster section and the booster control section are provided by N-channel thin film transistors.

10. A driver monolithic display device, in which a plurality of pixel circuits for formation of an image intended to display and at least part of a circuit for driving the pixel circuits are both formed on one substrate, the display device comprising:

a display section including the pixel circuits;

the power supply circuit according to claim 1; and a drive circuit which receives the boosted supply voltage from the power supply circuit and drives the display section;

wherein the substrate is formed thereon with the pixel circuits, at least part of the drive circuit and the power supply circuit.

11. The driver monolithic display device according to claim 10, wherein switching elements in the pixel circuits, said at least part of the drive circuit and the power supply circuit formed on the substrate are each provided by an N-channel thin film transistor.

* * * * *